US010389792B2

(12) United States Patent
Doi et al.

(10) Patent No.: US 10,389,792 B2
(45) Date of Patent: Aug. 20, 2019

(54) OUTPUT FUNCTION DIVIDING SYSTEM

(71) Applicant: NIPPON TELEGRAPH AND TELEPHONE CORPORATION, Chiyoda-ku, Tokyo (JP)

(72) Inventors: Shinichi Doi, Musashino (JP); Hiroyuki Tanaka, Musashino (JP); Eiji Kobayashi, Musashino (JP); Mika Ishizuka, Musashino (JP); Miki Kitabata, Musashino (JP); Keiichiro Kashiwagi, Musashino (JP); Ryosuke Kurebayashi, Yokosuka (JP)

(73) Assignee: NIPPON TELEGRAPH AND TELEPHONE CORPORATION, Chiyoda-ku, Tokyo (JP)

( * ) Notice: Subject to any disclaimer, the term of this patent is extended or adjusted under 35 U.S.C. 154(b) by 472 days.

(21) Appl. No.: 14/766,672

(22) PCT Filed: Feb. 10, 2014

(86) PCT No.: PCT/JP2014/053097
§ 371 (c)(1),
(2) Date: Aug. 7, 2015

(87) PCT Pub. No.: WO2014/126069
PCT Pub. Date: Aug. 21, 2014

(65) Prior Publication Data
US 2016/0142466 A1     May 19, 2016

(30) Foreign Application Priority Data

Feb. 12, 2013  (JP) ................................ 2013-024265
Oct. 15, 2013  (JP) ................................ 2013-214357
Dec. 13, 2013  (JP) ................................ 2013-258618

(51) Int. Cl.
G06F 3/0484       (2013.01)
H04L 29/08        (2006.01)
(Continued)

(52) U.S. Cl.
CPC ............ *H04L 67/02* (2013.01); *G06F 3/0481* (2013.01); *G06F 3/0484* (2013.01);
(Continued)

(58) Field of Classification Search
CPC ....... G06F 3/0484; G06F 3/0481; H04L 67/02
See application file for complete search history.

(56) References Cited

U.S. PATENT DOCUMENTS 6,108,703 A       8/2000 Leighton et al.
2003/0137522 A1*  7/2003 Kaasila ............. G06F 17/30905
                                               345/619

(Continued)

FOREIGN PATENT DOCUMENTS

EP     1049031 A2    11/2000
EP     1202188 A2     5/2002
(Continued)

OTHER PUBLICATIONS

Extended European Search Report dated Mar. 30, 2017 from corresponding European Patent Application No. 17157948.5, 13 pages.

(Continued)

*Primary Examiner* — Andrea C Leggett
(74) *Attorney, Agent, or Firm* — Ohlandt, Greeley, Ruggiero & Perle, L.L.P.

(57) ABSTRACT

A Web browser capable of providing an equivalent quality of user experience to a user even with respect to access of devices differing in processing performance. The web browsing system comprises a Web browser function which is divided between a browsing client unit and a browsing
(Continued)

server unit, wherein the browsing client unit notifies a content input to the user terminal to the browsing server unit and displays a Web page on a user terminal by using information supplied from the browsing server unit, and wherein the browsing server unit supplies information necessary for displaying the Web page to the user terminal to the browsing client unit according to the content input to the user terminal notified from the browsing client unit.

20 Claims, 30 Drawing Sheets

(51) Int. Cl.
    *G06F 3/0481*     (2013.01)
    *H04L 29/06*     (2006.01)
    *G06F 16/957*     (2019.01)
(52) U.S. Cl.
    CPC .......... *G06F 16/9577* (2019.01); *H04L 67/42* (2013.01); *G09G 2370/022* (2013.01); *G09G 2370/027* (2013.01)

(56) References Cited

U.S. PATENT DOCUMENTS

| | | | |
|---|---|---|---|
| 2008/0222273 | A1 | 9/2008 | Lakshmanan et al. |
| 2009/0182803 | A1* | 7/2009 | Barton .............. G06F 17/30905 709/203 |
| 2011/0066678 | A1 | 3/2011 | Yano |
| 2012/0192080 | A1* | 7/2012 | Lloyd .............. G06F 17/30905 715/744 |

FOREIGN PATENT DOCUMENTS

| | | |
|---|---|---|
| JP | 2004-070517 | 3/2004 |
| JP | 2006-524367 | 10/2006 |
| JP | 2009-064442 | 3/2009 |
| JP | 2010-087625 | 4/2010 |
| JP | 2011-511974 | 4/2011 |
| WO | 00/11850 A1 | 3/2000 |
| WO | 2004051430 | 6/2004 |
| WO | 2009090176 | 7/2009 |
| WO | 2012-062382 | 5/2012 |
| WO | 2012062382 | 5/2012 |

OTHER PUBLICATIONS

Extended European Search Report dated Oct. 28, 2016 from corresponding European Patent Application No. 14752227.0, 9 pages.
European Office Action in the corresponding European Patent Application No. 14752227.0, dated Jun. 20, 2017, 8 pages.
http://www.openmobilealliance.org/Technical/wapindex.aspx WAP Architecture Version Jul. 12, 2001, WAP-210-WAPArch-20010712.
Takahiro Orito and Hideya Iwasaki, "Hiding Source Code of Web Application on Client Browser", Information Processing Society of Japan Journal, Programming vol. 3, No. 4, (Sep. 16-26, 2010) with a partial English Translation.
http://www.cairographics.org/ "cairo".
http://docs.oracle.com/javase/jp/6/api/java/awt/Graphics.html "Class Graphics" with a partial English Translation.
http://www.w3.org/TR/CSS2/visuren.html#propdef-position "9 Visual formatting model".
http://www.useit.com/papers/responsetime.html "Response Times: The 3 Important Limits".
http://asatani.cc.kogakuin.ac.jp/acheivement/2008/NSyokou_takita_090209.pdf "A New Method Using RTT to Estimate Available Bandwidth of Bottleneck-Links" with a partial English Translation.
http://www.cisco.com/cisco/web/support/JP/100/1008/1008129_ttcp-j.html "test of throughput using Test TCP (TTCP) with a partial English Translation".
International Search Report dated Mar. 11, 2014 corresponding to International PCT Application No. PCT/JP2014/053097; 2 pages.
International Preliminary Report on Patentability dated Aug. 27, 2015 corresponding to International PCT Application No. PCT/JP2014/053097; 9 pages.
European Office Action in the corresponding European Patent Application No. 14752227.0, dated Dec. 20, 2017, 7 pages.
Summons to Attend Oral Proceedings pursuant to Rule 115(1) EPC dated Jul. 5, 2018 from corresponding European Patent Application 14752227.0, 8 pages.
European Office Action dated Apr. 1, 2019 in corresponding European Patent Application No. 17157948.5, 7 pages.

* cited by examiner

Fig.5

```
<HTML>
<HEAD>
<TITLE>SAMPLE</TITLE>
</HEAD>
<BODY>
<SCRIPT type="text/javascript">
<!--
function setPicture(target){
    document.images["focused"].src = target;
}
//-->
</SCRIPT>
<P>IF SMALL IMAGE IS TOUCHED, IMAGE IS SWITCHED TO LARGE IMAGE</P>
<TABLE>
<TBODY>
<TR>
<TD>
    <IMG src="./1.jpg" width="100" onmouseover="setPicture('./1.jpg')">
</TD>
<TD>
    <IMG src="./2.jpg" width="100" onmouseover="setPicture('./2.jpg')">
</TD>
<TD>
    <IMG src="./3.jpg" width="100" onmouseover="setPicture('./3.jpg')">
</TD>
</TR>
<TR>
<TD colspan="3" align="center">
    <IMG src="./1.jpg" width="300" name="focused">
</TD>
</TR>
</TBODY>
</TABLE>
</BODY>
</HTML>
```

Fig.27

| OUTPUT FUNCTION DIVISION SYSTEM | Web BROWSING SYSTEM | ONLINE GAME SYSTEM |
|---|---|---|
| APPLICATION EXECUTION CLIENT UNIT 91 | BROWSING CLIENT UNIT 91 | GAME CLIENT UNIT 91 |
| MAIN PROCESS: PRESENTATION OF APPLICATION OUTPUT INFORMATION AND RECEPTION OF USER MANIPULATION | MAIN PROCESS: PRESENTATION OF SCREEN AS Web BROWSER AND RECEPTION OF USER MANIPULATION | MAIN PROCESS: PRESENTATION OF SCREEN AS GAME AND RECEPTION OF USER MANIPULATION |
| ENTRY 971 | URL ENTRY 971 | URL ENTRY 971 |
| APPLICATION OUTPUT UNIT 972 | Web VIEW DISPLAY UNIT 972 | GAME VIEW DISPLAY UNIT 972 |
| MANIPULATION EVENT FILTER UNIT 31 | MANIPULATION EVENT FILTER UNIT 31 | MANIPULATION EVENT FILTER UNIT 31 |
| MANIPULATION EVENT EVALUATION UNIT 32 | MANIPULATION EVENT EVALUATION UNIT 32 | MANIPULATION EVENT EVALUATION UNIT 32 |
| MANIPULATION EVENT FILTER SETTING | MANIPULATION EVENT FILTER SETTING | MANIPULATION EVENT FILTER SETTING |
| APPLICATION OUTPUT CONFIGURATION UNIT 33 | LAYOUT UNIT 33 | LAYOUT UNIT 33 |
| OUTPUT GENERATION UNIT 34 | DRAWING UNIT 34 | DRAWING UNIT 34 |
| TRANSMISSION UNIT 35 | URL TRANSMISSION UNIT 35 | URI TRANSMISSION UNIT 35 |
| APPLICATION EXECUTION SERVER UNIT 93 | BROWSING SERVER UNIT 93 | GAME SERVER UNIT 93 |
| MAIN PROCESS: APPLICATION EXECUTION ENGINE | MAIN PROCESS: BROWSER ENGINE | MAIN PROCESS: GAME ENGINE |
| MANIPULATION EVENT EVALUATION UNIT 46 | MANIPULATION EVENT EVALUATION UNIT 46 | MANIPULATION EVENT EVALUATION UNIT 46 |
| SCRIPT EVALUATION UNIT 47 | SCRIPT EVALUATION UNIT 47 | SCRIPT EVALUATION UNIT 47 |
| REQUEST TRANSMISSION UNIT 41 | REQUEST TRANSMISSION UNIT 41 | REQUEST TRANSMISSION UNIT 41 |
| RESPONSE RECEPTION UNIT 42 | RESPONSE RECEPTION UNIT 42 | RESPONSE RECEPTION UNIT 42 |
| APPLICATION OUTPUT DESCRIPTION LANGUAGE ANALYSIS UNIT 43 | HTML ANALYSIS UNIT 43 | SCREEN DESCRIPTION ANALYSIS UNIT 43 |
| IN APPLICATION OUTPUT DESCRIPTION LANGUAGE ANALYSIS UNIT 43, PROCESS OF NORMAL APPLICATION OUTPUT DESCRIPTION LANGUAGE ANALYSIS UNIT 13 ADDED WITH: TRANSMISSION OF MANIPULATION EVENT FILTER SETTING TO APPLICATION EXECUTION CLIENT UNIT 91 | IN HTML ANALYSIS UNIT 43, PROCESS OF NORMAL HTML ANALYSIS UNIT 13 ADDED WITH: TRANSMISSION OF MANIPULATION EVENT FILTER SETTING TO BROWSING CLIENT UNIT 91 | IN SCREEN DESCRIPTION ANALYSIS UNIT 43, PROCESS OF NORMAL SCREEN DESCRIPTION ANALYSIS UNIT 13 ADDED WITH TRANSMISSION OF MANIPULATION EVENT FILTER SETTING TO GAME CLIENT UNIT 91 |
| APPLICATION OUTPUT CONFIGURATION UNIT 33 | LAYOUT UNIT 33 | LAYOUT UNIT 33 |
| OUTPUT GENERATION UNIT 45 | DRAWING UNIT 45 | DRAWING UNIT 45 |
| APPLICATION CONTENT SERVER 96 | Web SERVER 96 | GAME SERVER 96 |
| WITH RESPECT TO REQUEST RECEIVED FROM SERVER UNIT 93, RETURN RESOURCES ASSOCIATED WITH POSITION (URI ETC.) ON NETWORK AS RESPONSE | WITH RESPECT TO HTTP REQUEST RECEIVED FROM BROWSING SERVER UNIT 93, RETURN RESOURCES ASSOCIATED WITH URL AS HTTP RESPONSE | WITH RESPECT TO REQUEST RECEIVED FROM GAME SERVER UNIT 93, RETURN RESOURCES ASSOCIATED WITH URI AS RESPONSE |
| MANAGEMENT SERVER 92 | MANAGEMENT SERVER 92 | MANAGEMENT SERVER 92 |
| MAIN PROCESS: FUNCTION AS DNS SERVER MANAGING DOMAIN OF APPLICATION EXECUTION CLIENT UNIT 91 | MAIN PROCESS: FUNCTION AS DNS SERVER MANAGING DOMAIN OF BROWSING CLIENT UNIT 91 | MAIN PROCESS: FUNCTION AS DNS SERVER MANAGING DOMAIN OF GAME CLIENT UNIT 91 |

Fig.28

| OUTPUT FUNCTION DIVISION SYSTEM | Web BROWSING SYSTEM | ONLINE GAME SYSTEM |
|---|---|---|
| MAIN PROCESS: FUNCTION AS DNS SERVER MANAGING DOMAIN OF APPLICATION EXECUTION CLIENT UNIT 91 | MAIN PROCESS: FUNCTION AS DNS SERVER MANAGING DOMAIN OF BROWSING CLIENT UNIT | MAIN PROCESS: FUNCTION AS DNS SERVER MANAGING DOMAIN OF GAME CLIENT UNIT 91 |
| NOTIFICATION PROCEDURE (APPLICATION EXECUTION CLIENT UNIT NOTIFIES CONTENT INPUT TO USER TERMINAL TO APPLICATION EXECUTION SERVER UNIT) | NOTIFICATION PROCEDURE (BROWSING CLIENT UNIT NOTIFIES CONTENT INPUT TO USER TERMINAL TO BROWSING SERVER UNIT) | NOTIFICATION PROCEDURE (GAME CLIENT UNIT NOTIFIES CONTENT INPUT TO USER TERMINAL TO GAME SERVER UNIT) |
| SUPPLYING PROCEDURE (SUPPLYING INFORMATION NECESSARY FOR SUPPLYING OUTPUT TO USER TERMINAL TO APPLICATION EXECUTION CLIENT UNIT ACCORDING TO CONTENT INPUT TO USER TERMINAL NOTIFIED FROM APPLICATION EXECUTION CLIENT UNIT) | SUPPLYING PROCEDURE (SUPPLYING INFORMATION NECESSARY FOR DISPLAYING Web PAGE ON USER TERMINAL TO BROWSING CLIENT UNIT ACCORDING TO CONTENT INPUT TO USER TERMINAL NOTIFIED FROM BROWSING CLIENT UNIT) | SUPPLYING PROCEDURE (SUPPLYING INFORMATION NECESSARY FOR DISPLAYING GAME SCREEN ON USER TERMINAL TO GAME CLIENT UNIT ACCORDING TO CONTENT INPUT TO USER TERMINAL NOTIFIED FROM GAME CLIENT UNIT) |
| OUTPUT PROCEDURE (APPLICATION EXECUTION CLIENT UNIT SUPPLIES APPLICATION OUTPUT TO USER TERMINAL BY USING INFORMATION SUPPLIED FROM APPLICATION EXECUTION SERVER UNIT) | DISPLAY PROCEDURE (BROWSING CLIENT UNIT DISPLAYS Web PAGE ON USER TERMINAL BY USING INFORMATION SUPPLIED FROM BROWSING SERVER UNIT) | DISPLAY PROCEDURE (GAME CLIENT UNIT DISPLAYS GAME SCREEN ON USER TERMINAL BY USING INFORMATION SUPPLIED FROM GAME SERVER UNIT) |
| APPLICATION EXECUTION SERVER UNIT SELECTION PROCEDURE | BROWSING SERVER UNIT SELECTION PROCEDURE | GAME SERVER UNIT SELECTION PROCEDURE |
| CONTENT INPUT TO USER TERMINAL | CONTENT INPUT TO USER TERMINAL | CONTENT INPUT TO USER TERMINAL |
| SUPPLY APPLICATION OUTPUT | DISPLAY Web PAGE | DISPLAY GAME SCREEN |
| INFORMATION NECESSARY FOR SUPPLYING APPLICATION OUTPUT | INFORMATION NECESSARY FOR DISPLAYING Web PAGE | INFORMATION NECESSARY FOR DISPLAYING GAME SCREEN |
| INFORMATION SUPPLIED FROM SERVER UNIT | INFORMATION SUPPLIED FROM BROWSING SERVER UNIT | INFORMATION SUPPLIED FROM GAME SERVER UNIT |
| APPLICATION OUTPUT DESCRIPTION DATA | LAYOUT DATA | LAYOUT DATA |
| APPLICATION OUTPUT STRUCTURE DATA | DOM TREE | SCREEN STRUCTURE DATA |
| SPECIFIC CONTENT OF MANIPULATION EVENT FILTER SETTING: IF ANY MANIPULATION EVENT OCCURS IN ANY AREA ON APPLICATION OUTPUT, NOTIFICATION TO APPLICATION SERVER UNIT 93 IS NECESSARY (OR NOT NECESSARY) | SPECIFIC CONTENT OF MANIPULATION EVENT FILTER SETTING: IF ANY MANIPULATION EVENT OCCURS IN ANY AREA ON Web VIEW, NOTIFICATION TO BROWSING SERVER UNIT 93 IS NECESSARY (OR NOT NECESSARY) | SPECIFIC CONTENT OF MANIPULATION EVENT FILTER SETTING: IF ANY MANIPULATION EVENT OCCURS IN ANY AREA ON GAME SCREEN, NOTIFICATION TO GAME SERVER UNIT 93 IS NECESSARY (OR NOT NECESSARY) |
| INSTRUCT APPLICATION OUTPUT UPDATING | INSTRUCT SCREEN UPDATING | INSTRUCT SCREEN UPDATING |
| RECONSTRUCTION OF APPLICATION OUTPUT STRUCTURE DATA | RECONSTRUCTION OF DOM TREE | RECONSTRUCTION OF SCREEN STRUCTURE DATA |
| RE-EVALUATION OF APPLICATION OUTPUT CONFIGURATION | RE-EVALUATION OF LAYOUT | RE-EVALUATION OF LAYOUT |
| OCCURRENCE OF CONTENT TRANSITION OR MANIPULATION EVENT | OCCURRENCE OF PAGE TRANSITION OR MANIPULATION EVENT | OCCURRENCE OF PAGE TRANSITION OR MANIPULATION EVENT |

| E-BOOK SYSTEM | SCREEN DISPLAY SYSTEM | AUDIO OUTPUT SYSTEM |
|---|---|---|
| E-BOOK CLIENT UNIT 91 | APPLICATION EXECUTION CLIENT UNIT 91 | APPLICATION EXECUTION CLIENT UNIT 91 |
| MAIN PROCESS: PRESENTATION OF SCREEN AS E-BOOK READER AND RECEPTION OF USER MANIPULATION | MAIN PROCESS: PRESENTATION OF APPLICATION SCREEN INFORMATION AND RECEPTION OF USER MANIPULATION | MAIN PROCESS: PRESENTATION OF APPLICATION AUDIO OUTPUT INFORMATION AND RECEPTION OF USER MANIPULATION |
| URI ENTRY 971 | URI ENTRY 971 | URI ENTRY 971 |
| E-BOOK VIEW DISPLAY UNIT 972 | APPLICATION VIEW DISPLAY UNIT 972 | APPLICATION VIEW DISPLAY UNIT 972 |
| MANIPULATION EVENT FILTER UNIT 31 | MANIPULATION EVENT FILTER UNIT 31 | MANIPULATION EVENT FILTER UNIT 31 |
| MANIPULATION EVENT EVALUATION UNIT 32 | MANIPULATION EVENT EVALUATION UNIT 32 | MANIPULATION EVENT EVALUATION UNIT 32 |
| MANIPULATION EVENT FILTER SETTING | MANIPULATION EVENT FILTER SETTING | MANIPULATION EVENT FILTER SETTING |
| LAYOUT UNIT 33 | LAYOUT UNIT 33 | AUDIO OUTPUT CONFIGURATION UNIT 33 |
| DRAWING UNIT 34 | DRAWING UNIT 34 | AUDIO OUTPUT GENERATION UNIT 34 |
| URI TRANSMISSION UNIT 35 | URI TRANSMISSION UNIT 35 | URI TRANSMISSION UNIT 35 |
| E-BOOK SERVER UNIT 93 | APPLICATION EXECUTION SERVER UNIT 93 | APPLICATION EXECUTION SERVER UNIT 93 |
| MAIN PROCESS: E-BOOK ENGINE | MAIN PROCESS: APPLICATION EXECUTION ENGINE | MAIN PROCESS: APPLICATION EXECUTION ENGINE |
| MANIPULATION EVENT EVALUATION UNIT 46 | MANIPULATION EVENT EVALUATION UNIT 46 | MANIPULATION EVENT EVALUATION UNIT 46 |
| SCRIPT EVALUATION UNIT 47 | SCRIPT EVALUATION UNIT 47 | SCRIPT EVALUATION UNIT 47 |
| REQUEST TRANSMISSION UNIT 41 | REQUEST TRANSMISSION UNIT 41 | REQUEST TRANSMISSION UNIT 41 |
| RESPONSE RECEPTION UNIT 42 | RESPONSE RECEPTION UNIT 42 | RESPONSE RECEPTION UNIT 42 |
| SCREEN DESCRIPTION DATA ANALYSIS UNIT 43 | SCREEN DESCRIPTION DATA ANALYSIS UNIT 43 | AUDIO DESCRIPTION DATA ANALYSIS UNIT 43 |
| IN SCREEN DESCRIPTION DATA ANALYSIS UNIT 43, PROCESS OF NORMAL SCREEN DESCRIPTION DATA ANALYSIS UNIT 13 ADDED WITH: TRANSMISSION OF MANIPULATION EVENT FILTER SETTING TO E-BOOK CLIENT UNIT 91 | IN SCREEN DESCRIPTION DATA ANALYSIS UNIT 43, PROCESS OF NORMAL SCREEN DESCRIPTION DATA ANALYSIS UNIT 13 ADDED WITH: TRANSMISSION OF MANIPULATION EVENT FILTER SETTING TO APPLICATION EXECUTION CLIENT UNIT 91 | IN AUDIO DESCRIPTION DATA ANALYSIS UNIT 43, PROCESS OF NORMAL AUDIO DESCRIPTION DATA ANALYSIS UNIT 13 ADDED WITH: TRANSMISSION OF MANIPULATION EVENT FILTER SETTING TO APPLICATION EXECUTION CLIENT UNIT 91 |
| LAYOUT UNIT 33 | LAYOUT UNIT 33 | AUDIO OUTPUT CONFIGURATION UNIT 33 |
| DRAWING UNIT 45 | DRAWING UNIT 45 | AUDIO OUTPUT GENERATION UNIT 45 |
| E-BOOK SERVER 96 | APPLICATION CONTENT SERVER 96 | APPLICATION CONTENT SERVER 96 |
| WITH RESPECT TO REQUEST RECEIVED FROM E-BOOK SERVER UNIT 93, RETURN RESOURCES ASSOCIATED WITH URI AS RESPONSE | WITH RESPECT TO REQUEST RECEIVED FROM APPLICATION EXECUTION SERVER UNIT 93, RETURN RESOURCES ASSOCIATED WITH POSITION (URI, ETC.) ON NETWORK AS RESPONSE | WITH RESPECT TO REQUEST RECEIVED FROM APPLICATION EXECUTION SERVER UNIT 93, RETURN RESOURCES ASSOCIATED WITH POSITION (URI, ETC.) ON NETWORK AS RESPONSE |
| MANAGEMENT SERVER 92 | MANAGEMENT SERVER 92 | MANAGEMENT SERVER 92 |
| MAIN PROCESS: FUNCTION AS DNS SERVER MANAGING DOMAIN OF E-BOOK CLIENT UNIT 91 | MAIN PROCESS: FUNCTION AS DNS SERVER MANAGING DOMAIN OF APPLICATION EXECUTION CLIENT UNIT 91 | MAIN PROCESS: FUNCTION AS DNS SERVER MANAGING DOMAIN OF APPLICATION EXECUTION CLIENT UNIT 91 |

Fig.29

| E-BOOK SYSTEM | SCREEN DISPLAY SYSTEM | AUDIO OUTPUT SYSTEM |
|---|---|---|
| MAIN PROCESS: FUNCTION AS DNS SERVER MANAGING DOMAIN OF E-BOOK CLIENT UNIT 91 | MAIN PROCESS: FUNCTION AS DNS SERVER MANAGING DOMAIN OF APPLICATION EXECUTION CLIENT UNIT 91 | MAIN PROCESS: FUNCTION AS DNS SERVER MANAGING DOMAIN OF APPLICATION EXECUTION CLIENT UNIT 91 |
| NOTIFICATION PROCEDURE (E-BOOK CLIENT UNIT NOTIFIES CONTENT INPUT TO USER TERMINAL TO E-BOOK SERVER UNIT) | NOTIFICATION PROCEDURE (APPLICATION EXECUTION CLIENT UNIT NOTIFIES CONTENT INPUT TO USER TERMINAL TO APPLICATION EXECUTION SERVER UNIT) | NOTIFICATION PROCEDURE (APPLICATION EXECUTION CLIENT UNIT NOTIFIES CONTENT INPUT TO USER TERMINAL TO APPLICATION EXECUTION SERVER UNIT) |
| SUPPLYING PROCEDURE (SUPPLYING INFORMATION NECESSARY FOR DISPLAYING E-BOOK SCREEN ON USER TERMINAL TO E-BOOK CLIENT UNIT ACCORDING TO CONTENT INPUT TO USER TERMINAL NOTIFIED FROM E-BOOK CLIENT UNIT) | SUPPLYING PROCEDURE (SUPPLYING INFORMATION NECESSARY FOR DISPLAYING APPLICATION SCREEN ON USER TERMINAL TO APPLICATION EXECUTION CLIENT UNIT ACCORDING TO CONTENT INPUT TO USER TERMINAL NOTIFIED FROM APPLICATION EXECUTION CLIENT UNIT) | SUPPLYING PROCEDURE (SUPPLYING INFORMATION NECESSARY FOR SUPPLYING AUDIO OUTPUT TO USER TERMINAL TO APPLICATION EXECUTION CLIENT UNIT ACCORDING TO CONTENT INPUT TO USER TERMINAL NOTIFIED FROM APPLICATION EXECUTION CLIENT UNIT) |
| DISPLAY PROCEDURE (E-BOOK CLIENT UNIT DISPLAYS E-BOOK SCREEN ON USER TERMINAL BY USING INFORMATION SUPPLIED FROM E-BOOK SERVER UNIT) | DISPLAY PROCEDURE (APPLICATION EXECUTION CLIENT UNIT DISPLAYS APPLICATION SCREEN ON USER TERMINAL BY USING INFORMATION SUPPLIED FROM APPLICATION EXECUTION SERVER UNIT) | OUTPUT PROCEDURE (APPLICATION EXECUTION CLIENT UNIT SUPPLIES AUDIO OUTPUT TO USER TERMINAL BY USING INFORMATION SUPPLIED FROM APPLICATION EXECUTION SERVER UNIT) |
| E-BOOK SERVER UNIT SELECTION PROCEDURE | APPLICATION EXECUTION SERVER UNIT SELECTION PROCEDURE | APPLICATION EXECUTION SERVER UNIT SELECTION PROCEDURE |
| CONTENT INPUT TO USER TERMINAL | CONTENT INPUT TO USER TERMINAL | CONTENT INPUT TO USER TERMINAL |
| DISPLAY E-BOOK SCREEN | DISPLAY APPLICATION SCREEN | SUPPLY AUDIO OUTPUT |
| INFORMATION NECESSARY FOR DISPLAYING E-BOOK SCREEN | INFORMATION NECESSARY FOR DISPLAYING APPLICATION SCREEN | INFORMATION NECESSARY FOR SUPPLYING AUDIO OUTPUT |
| INFORMATION SUPPLIED FROM E-BOOK SERVER UNIT | INFORMATION SUPPLIED FROM APPLICATION EXECUTION SERVER UNIT | INFORMATION SUPPLIED FROM APPLICATION EXECUTION SERVER UNIT |
| LAYOUT DATA | LAYOUT DATA | AUDIO OUTPUT DESCRIPTION DATA |
| SPECIFIC CONTENT OF MANIPULATION EVENT FILTER SETTING: IF ANY MANIPULATION EVENT OCCURS IN ANY AREA ON E-BOOK SCREEN, NOTIFICATION TO E-BOOK SERVER UNIT 93 IS NECESSARY (OR NOT NECESSARY) | SPECIFIC CONTENT OF MANIPULATION EVENT FILTER SETTING: IF ANY MANIPULATION EVENT OCCURS IN ANY AREA ON DISPLAY SCREEN, NOTIFICATION TO APPLICATION EXECUTION SERVER UNIT 93 IS NECESSARY (OR NOT NECESSARY) | SPECIFIC CONTENT OF MANIPULATION EVENT FILTER SETTING: IF ANY MANIPULATION EVENT OCCURS IN ANY AREA ON AUDIO OUTPUT, NOTIFICATION TO APPLICATION EXECUTION SERVER UNIT 93 IS NECESSARY (OR NOT NECESSARY) |
| INSTRUCT SCREEN UPDATING | INSTRUCT SCREEN UPDATING | INSTRUCT OUTPUT UPDATING |
| RECONSTRUCTION OF SCREEN STRUCTURE DATA | RECONSTRUCTION OF SCREEN STRUCTURE DATA | RECONSTRUCTION OF AUDIO OUTPUT STRUCTURE DATA |
| RE-EVALUATION OF LAYOUT | RE-EVALUATION OF LAYOUT | RE-EVALUATION OF AUDIO OUTPUT DESCRIPTION DATA |
| OCCURRENCE OF PAGE TRANSITION OR MANIPULATION EVENT | OCCURRENCE OF SCREEN TRANSITION OR MANIPULATION EVENT | OCCURRENCE OF CONTENT TRANSITION OR MANIPULATION EVENT |

Fig. 30

OUTPUT FUNCTION DIVIDING SYSTEM

BACKGROUND

1. Field of the Disclosure

The present disclosure relates to an output function division system in applications involved in screen display or output of audio or the like. Particularly, the present disclosure relates to a Web browsing system which displays a Web page on a user terminal.

2. Discussion of the Background Art

With the spread of the Internet, users can use various services via a network. Mails, browsing of home pages, search, online transaction, IP phones, video on-demand and the like are the examples thereof. These network services may be provided in various formats, but in recent years, a Web browser is mainly used as an interface to users.

Initially, a page (hereinafter, referred to as a Web page) which is browsed to be acquired from a Web server by the Web browser was only to display light-weighted, static documents described by only HTML (Hyper Text Markup Language). However, in recent years, by executing Flash provided by Adobe or script language JavaScript (registered trademark) on the Web browser, a flexible, dynamic user interface has been provided. The Web page is called a Rich Internet Application. Furthermore, in HTML5 (the latest revision of HTML) of which standardization is promoted by standardization organizations of WHATWG (Web Hypertext Application Technology Working Group) and W3C (World Wide Web Consortium), advanced multimedia functions are supported, and the Rich Internet Application is expected to be developed in the future.

With the development of the Rich Internet Application, a higher processing performance is required for the Web browser. On the other hand, user terminals executing the Web browser have been diversified. In the related art, the Web page was mainly browsed by using a Web browser on a PC (Personal Computer). However, today, due to miniaturization, low power consumption, and low cost of computers, the Web browsers are installed in various forms of the user terminals. Smart phones, smart TVs, home game machines and the like are representative user terminals. Therefore, according to a place or a situation where the user is located, the user accesses the Web page by using various types of the user terminals.

The processing performance of the user terminal greatly differs depending on the shape, use, or the like thereof. Therefore, even when the same Web page is browsed, particularly, in the case where the Rich Internet Application is browsed, a large difference occurs in a quality of user experience which the user obtains by the user terminal used to access the Web page. Therefore, a Web page provider is forced to prepare multiple Web pages customized for each type of the user terminals or to provide large cost in order to provide a uniform quality of user experience regardless of the type of the user terminal.

Herein, a basic structure of a Web browser will be described. As illustrated in FIG. 1, a Web browser 97 of a user terminal transmits an HTTP request to a Web server 96 via a network or the Internet and acquires resources (indicating individual files used for displaying the Web page such as HTML files, style sheets, images and the like) necessary for displaying the Web page as an HTTP response from the Web server 96.

Herein, for the description, a simple Web browser 97 is configured to include two units of a URL entry unit 971 and a Webview display unit 972 is assumed (FIG. 2). The URL entry unit 971 receives input of a URL (Uniform Resource Locator) of a Web page which a user desires to browse. In addition, in a case where the Web page is transitioned due to link clicking or the like, the URL entry unit 971 displays the URL of the Web page of the transition destination. On the other hand, the Webview display unit 972 displays the screen of the Web page. In addition, the Webview display unit receives manipulation (mouse manipulation, touch panel manipulation, keyboard input, or the like) from the user.

FIG. 3 illustrates a flow of a basic process of the Web browser in a case where the Web browser of FIG. 2 is assumed. First, the user inputs a URL of a Web page which the user desires to browse in a URL entry unit 971 of the Web browser. Herein, as an example, the URL input by the user is assumed to be http://www.example.com/index.html. In addition, as illustrated in FIG. 4, in the Web page, three small images are arranged in the upper portion, and one enlarged image is arranged in the lower portion. Next, if the user touches the small image in the upper portion by moving the mouse cursor, the enlarged image in the lower portion is switched to the image touched with the mouse cursor.

If the Web browser 97 receives the URL from the URL entry unit 971, the Web browser transfers the URL to the request transmission unit 14. The request transmission unit 14 transmits an HTTP request to a Web server 96 (in this example, www.example.com) designated with the URL in order to acquire the resources associated with the URL.

If the Web server 96 receives the HTTP request, the Web server sends a reply with the resources indicated by the URL of the HTTP request as an HTTP response to the Web browser 97 which is the transmission source. In general, in the case of being transitioned to a new Web page, first, an HTML file is returned from the Web server 96. Herein, as an HTML file corresponding to the Web page of FIG. 4, a reply with the HTML file illustrated in FIG. 5 is sent.

If the Web browser 97 acquires the HTTP response from the Web server 96, the Web browser transfers the HTTP response to the response reception unit 15. The response reception unit 15 extracts resources from the HTTP response. Next, the response reception unit 15 stores the extracted resources in the resources storage unit 21. Herein, first, as the resources, an HTML file of FIG. 5 is obtained.

Next, the HTML analysis unit 13 analyzes the acquired HTML file or the acquired style sheet. Next, in general, a data structure (DOM tree) having an API called a DOM (Document Object Model) is constructed. A specific example of the DOM tree constructed from the HTML file of FIG. 5 is illustrated in FIG. 6. As illustrated in FIG. 6, the DOM tree basically becomes a tree structure where elements of the HTML file are used as nodes. In addition, each node is set to an attribute value according to description of the HTML file. The HTML analysis unit 13 stores the constructed DOM tree in the DOM tree storage unit 22. In addition, as a result of the analysis of the HTML file, in a case where resources which need to be additionally acquired from the Web server 96 are found, the HTML analysis unit notifies a URL of the resources to the request transmission unit 14 to request the request transmission unit to transmit an HTTP request. In the example, as the resources necessary for displaying a page, the followings are newly acquired from the Web server.

http://www.example.com/1.jpg
http://www.example.com/2.jpg
http://www.example.com/3.jpg In addition, if the HTML file has a script and the execution condition of the script is satisfied, the HTML analysis unit 13 requests the script evaluation unit 12 to execute the script in the HTML file. At this time, the HTML analysis unit 13 transfers the script (functions and arguments to be given to the functions) which is to be executed to the script evaluation unit 12. Next, the script evaluation unit 12 executes the script with reference to the DOM tree in the DOM tree storage unit 22. In the case of updating the DOM tree according to the execution of the script, the HTML analysis unit 13 is requested to update the DOM tree. In addition, the HTML file of FIG. 5 has a setPicture function in JavaScript (registered trademark) as a script, and the execution condition thereof is "a case where the mouse touches the designated image (onmouseover event handler)". Therefore, at this time, since the execution condition of the script is not satisfied, the HTML analysis unit 13 does not request the script evaluation unit 12 to execute the script. The operation in a case where the execution condition of the script is satisfied will be described later.

In addition, although not exemplified in this example, the Web page provider can control the screen configuration (layout) displayed on the Webview by supplying a style sheet as the resources. In a case where a description method of a style sheet and the style sheet are designated, as to how the Web browser configures the screen, CSS (Cascading Style Sheets) is standardized by the W3C. Similarly to the HTML file, the style sheet is converted into the DOM tree in the HTML analysis unit 13 and is stored in the DOM tree storage unit 22.

If the resources necessary for displaying the page and the DOM tree are prepared, the HTML analysis unit 13 requests the layout unit 16 to make layout. The layout unit 16 decides the layout of the screen based on the DOM tree. The layout unit 16 specifically decides what to be drawn at which coordinate of the Webview display unit 972 with reference to the style sheet in the DOM tree storage unit 22. Next, the result is stored as the layout data in the layout data storage unit 23. FIG. 7 illustrates a specific example of the layout data. As illustrated in FIG. 7, the layout data indicate what to be drawn with which size at which coordinate on the Webview. If the layout is decided, the layout unit 16 requests the drawing unit 17 to perform the drawing. The drawing unit 17 draws the Web page on the Webview display unit 972 based on the layout data stored in the layout data storage unit 23.

If the screen of the Webview display unit 972 is updated, the user recognizes and analyzes the content thereof and preforms the next manipulation (mouse manipulation, touch panel manipulation, keyboard input, or the like) to the Webview display unit 972. The manipulation to the Webview display unit 972 is notified as a manipulation event to the manipulation event evaluation unit 11.

The manipulation event evaluation unit 11 evaluates the type of the notified event or the position on the Webview display unit 972 where the event occurs and selects the to-be-performed process according to the event. For example, in a case where the user clicks on a link on the Webview display unit 972 with the mouse, the transition to the next Web page is started by notifying the URL associated with the link to the request transmission unit 14. In addition, in a case where the user instructs scrolling by rotating the mouse wheel, the manipulation event evaluation unit 11 notifies the scroll width to the layout unit 16 and requests the layout unit to update the layout.

In addition, in the example of the HTML file of FIG. 5, as described above, the onmouseover event handler is set to the three small images in the middle portion. Therefore, when the mouse cursor moves on the Webview display unit 972, the manipulation event evaluation unit 11 evaluates the position thereof. Therefore, in a case where the mouse cursor touches the small image in the higher portion, the script evaluation unit 12 is requested to execute a JavaScript (registered trademark) function setPicture ( ) in the HTML file as the URL of the image as an argument. The script evaluation unit 12 executes the setPicture ( ) and instructs the HTML analysis unit 13 to rewrite an src attribute of the large image in the lower portion in the URL of the image touched with the mouse cursor. The HTML file analysis unit updates the DOM tree according to the instruction from the script evaluation unit 12. FIG. 8 illustrates a result of the updating of the DOM tree in a case where the mouse cursor touches the image (./2.jpg) in the central portion. As illustrated in FIG. 8, the src attribute of the image in the lower portion is rewritten in the URL "./2.jpg" of the touched image. The updating of the DOM tree can be transferred to the layout unit 16 to be reflected on the layout data (namely, in this example, the "image=./1.jpg" of the enlarged image in the lower portion of FIG. 7 is rewritten in the "image=./2.jpg"). Next, the layout unit requests the drawing unit 17 to perform drawing, so that the enlarged image of the touched image (in this example, /2.jpg) is displayed in the lower portion of the Webview display unit 972.

With respect to the manipulation of the Web browser, in order to improve the quality of user experience, a reduction of the response time (flow indicated by a broken arrow of FIG. 9) from the occurrence of the manipulation event to the screen drawing corresponding to the Web screen display is required. For example, in order to remove a frame delay due to the process of the Web browser, in a user terminal drawing 60 frames per second, the response time needs to be suppressed down to 17 milliseconds or less. In addition, according to Jakob Nielsen, if a feeling "directly manipulating" is to be provided to the user, the upper limit of the response time needs to be 100 milliseconds, and if a feeling "controlling" is to be provided to the user, the upper limit of the response time needs to be 1 second (for example, refer to Non-Patent Literature 6). However, in a case where the Rich Internet Application is assumed, since the script or the screen configuration is complicated, in the above-described flow, high load is exerted particularly on the script evaluation unit 12 and the layout unit 16. Furthermore, since the event continuously occurs, the script evaluation unit 12 and the layout unit 16 need to be repeatedly executed. As a result, in a low-spec user terminal, these processing units are bottlenecks in terms of processing performance, so that process-pending events are accumulated. Therefore, there occurs a problem in that the response time is remarkably worsened or the manipulation is ignored.

As a technique for improving the quality of user experience of the Web browsing by utilizing the resources on the network, there is a cache technique typified by CDN (Content Delivery Network) (for example, refer to Patent Literature 1). In the cache technique, the resources which are originally located in the Web server are arranged to be distributed to a cache server on the network. Therefore, by using a DNS (Domain Name Server) or the like, the access of the Web browser 97 to the Web server 96 is guided to a near cache server, so that the cache server is allowed to send a proxy reply with the resources. The cache technique has an effect of reducing the response time from the input of URL to the screen display (flow indicated by a broken arrow of FIG. 10). However, the cache technique does not contribute to reduction of the response time (flow indicated by a broken arrow of FIG. 9) from the occurrence of the manipulation event to the screen display, which is required in a case where the Rich Internet Application is assumed.

In addition, there is a technique of converting a Web page into a light-weighted format in accordance with the type of a user terminal in a network. For example, as a protocol for browsing a Web page from a mobile terminal, there is a WAP (Wireless Application Protocol) (for example, refer to Non-Patent Literature 1). The mobile terminal has a low processing performance of CPU and a small memory capacity, and the connection to the Internet is also unstable. Therefore, in the WAP, first, the Web page is written by using a unique markup language called WML (Wireless Markup Language). In order to reduce process load and a communication amount of the mobile terminal, in a gateway located between a Web server 96 and the mobile terminal, the Web page written by the WML is converted into a binary format and is transmitted to the mobile terminal. In addition, there is Opera Mini of Opera Software ASA as a Web browser for the purpose of more comfortably browsing a normal Web page written by HTML with a less powerful mobile terminal. The Opera Mini re-formats/compresses the Web page in a proxy server on the Internet into a Web page for the mobile terminal and transmits the Web page to the Web browser 97 by using a markup language called OBML (Opera Binary Markup Language).

This format conversion technique reduces a download time due to a reduction in communication amount or reduces process load of the "HTML analysis unit 13" and the "layout unit 16" in a new page transition period. However, according to the occurrence of a manipulation event which is a bottleneck of the Rich Internet Application, re-evaluation of the layout in the script evaluation unit 12 or the layout unit 16 needs to be still performed on the user terminal, and thus, the technique does not contribute to the reduction of the process load.

In addition, as illustrated in FIG. 11, a method of remotely executing a script evaluation unit 12 on a Web server 96 was proposed by Orito (for example, refer to Non-Patent Literature 2). In the proposal by Orito, first, when an HTML file is returned from the Web server 96 to a Web browser 97, a JavaScript (registered trademark) function written in the HTML file is registered in the script evaluation unit 12 installed in the Web server 96. Next, an event handler written in each element in the HTML file is rewritten in a script which remotely executes a JavaScript (registered trademark) function registered in the script evaluation unit 12 on the Web server 96. Accordingly, if the user manipulates the Web browser 97, the rewritten script is executed, and the JavaScript (registered trademark) function constituting a pair on the Web server 96 is evaluated by the script evaluation unit 12 of the Web server 96. The result of script evaluation is returned as an HTML file to the user terminal. The Web browser 97 of the user terminal analyzes the received HTML file and draws the resulting screen.

In the proposal by Orito, there is an advantage in that, in the Web browser 97 of the user terminal, load necessary for script evaluation is reduced. On the other hand, when an event occurs, in the user terminal, a series of processes such as "remote call using a JavaScript (registered trademark), reception of a resulting HTML file, reconstruction of the DOM tree, re-layout and drawing" need to be executed, and thus, the load of the whole user terminal is not necessarily reduced. In addition, due to delay of communication between the user terminal and the Web server, the response time from the occurrence of event to the screen drawing is also increased. As a result, there is a problem in that the technique is difficult to be applied to, particularly, the Rich Internet Application where the manipulation event continuously occurs.

CITATION LIST

Patent Literature

[Patent Literature 1] U.S. Pat. No. 6,108,703

Non-Patent Literature

[Non-Patent Literature 1] http://www.openmobilealliance.org/Technical/wapindex.aspx
[Non-Patent Literature 2] Takahiro Orito and Hideya Iwasaki, "Hiding Source Code of Web Application on Client Browser," Information Processing Society of Japan Transactions on Programming, vol. 3, No. 4, September 2010
[Non-Patent Literature 3] http://www.cairographics.org/
[Non-Patent Literature 4] http://docs.oracle.com/javase/jp/6/api/java/awt/Graphics.html
[Non-Patent Literature 5] http://www.w3.org/TR/CSS2/visuren.html#propdef-position
[Non-Patent Literature 6] http://www.useit.com/papers/responsetime.html
[Non-Patent Literature 7] http://asatani.cc.kogakuin.ac.jp/achievement/2008/NSyokou_tak ita_090209.pdf
[Non-Patent Literature 8] http://www.cisco.com/cisco/web/support/JP/100/1008/1008129_tt cp-j.html

SUMMARY

In order to solve the above-described problems, the present disclosure is to implement a Web browser capable of providing an equivalent quality of user experience to a user even with respect to access of devices differing in processing performance.

A feature of the present disclosure is that, in a network system which is connected via a network to an application content server storing application content, an application content output function of a user terminal is divided between an application execution client unit and an application execution server unit.

The present disclosure implements a Web browser capable of providing an equivalent quality of user experience to a user even with respect to access of user terminals differing in processing performance by utilizing computation resources on a network to a browser engine in browsing of a Rich Internet Application by the Web browser.

Specifically, according to the present disclosure, there is provided an output function division system where an output function of application content of a user terminal connected via a network to an application content server storing the application content is divided between an application execution client unit and an application execution server unit, wherein the application execution client unit is installed in the user terminal and notifies a content input to the user terminal to the application execution server unit and performs output according to information supplied from the application execution server unit in the user terminal, and wherein the application execution server unit supplies information necessary for performing the output according to the application content from the user terminal to the application execution client unit according to the content input to the user terminal notified from the application execution client unit.

In the output function division system according to the present disclosure, the application execution client unit may include a manipulation event filter function of notifying a manipulation event requiring an application execution process of the application execution server unit in order to perform output according to the application content to the application execution server unit, and the application execution server unit may supply the information necessary for performing the output according to the application content from the user terminal to the application execution client unit according to the manipulation event received from the application execution client unit.

In the output function division system according to the present disclosure, the application execution server unit may supply a file requiring a decompression process among the information necessary for performing the output according to the application content from the user terminal without decompression to the application execution client unit, and the application execution client unit may perform the decompression process of the file requiring the decompression process.

In the output function division system according to the present disclosure, the output function division system may include a plurality of the application execution server units, and the output function division system may further include a management server which is connected via the network to the application execution client unit and the application execution server unit and which introduces one set among the plurality of the application execution server units to the user terminal.

In the output function division system according to the present disclosure, the output function division system may include a plurality of user terminals including the application execution client unit, the application execution server unit may supply the information necessary for performing the output according to the application content to the application execution client unit included in each of the user terminals which is defined in advance, and the application execution client unit may perform the output according to information supplied from the application execution server unit in each of the user terminals.

Specifically, according to the present disclosure, there is provided an application content output method in an output function division system where an output function of application content of a user terminal connected via a network to an application content server storing the application content is divided between an application execution client unit and an application execution server unit, sequentially including: a notification procedure where the application execution client unit notifies a content input to the user terminal to the application execution server unit; a supplying procedure where the application execution server unit supplies information necessary for performing the output according to the application content from the user terminal to the application execution client unit according to the content input to the user terminal notified from the application execution client unit; and an output procedure where the application execution client unit performs output according to information supplied from the application execution server unit in the user terminal.

In the application content output method according to the present disclosure, in the notification procedure, the application execution client unit may notify a manipulation event requiring an application execution process of the application execution server unit in order to perform output according to the application content to the application execution server unit, and in the supplying procedure, the application execution server unit may supply the information necessary for performing the output according to the application content from the user terminal to the application execution client unit according to the manipulation event received from the application execution client unit.

In the application content output method according to the present disclosure, in the supplying procedure, the application execution server unit may supply a file requiring a decompression process among the information necessary for performing the output according to the application content from the user terminal without decompression to the application execution client unit, and in the output procedure, the application execution client unit may perform the decompression process of the file requiring the decompression process.

In the application content output method according to the present disclosure, the output function division system may include a plurality of the application execution server units and further may include a management server which is connected to the application execution client unit and the application execution server unit, and the application content output method may further include, before the notification procedure, a server unit selection procedure of introducing one set among the plurality of the application execution server units to the user terminal.

In the application content output method according to the present disclosure, the output function division system may include a plurality of the user terminals including the application execution client unit, in the supplying procedure, the application execution server unit may supply the information necessary for performing the output according to the application content to the application execution client unit included in each of the user terminals which is defined in advance, and in the output procedure, the application execution client unit may perform the output according to information supplied from the application execution server unit in each of the user terminals.

In the application content output method according to the present disclosure, the application content output method may further include, before the notification procedure, a process decision procedure of observing at least any one of communication environment, load and performance of the application execution client unit and deciding a process which is performed by the application execution server unit in order to perform the output according to the application content for each element of the application content based on at least any one of communication environment, load and performance of the application execution client unit, in the supplying procedure, the application execution server unit may perform the process decided in the process decision procedure among information necessary for outputting the application content from the user terminal for each element of the application content and may supply information necessary for outputting the application content to the user terminal to the application execution client unit, and in the output procedure, the application execution client unit may output the application content from the user terminal by using the information supplied from the application execution server unit.

In the application content output method according to the present disclosure, the output function division system may include a plurality of the user terminals including the application execution client unit, in the notification procedure, the application execution client unit may notify a new user terminal outputting application content to the application execution server unit, in the supplying procedure, the application execution server unit may supply common information necessary for outputting the application content to the application execution client unit, and in the output procedure, the application execution client unit may output the same application content to the user terminal by using the information supplied from the application execution server unit.

Specifically, according to the present disclosure, there is provided an application execution client unit of an output function division system where an output function of application content of a user terminal connected via a network to an application content server storing the application content is divided between the application execution client unit and an application execution server unit, wherein the application execution client unit is installed in the user terminal and notifies a content input to the user terminal to the application execution server unit and performs output according to information supplied from the application execution server unit in the user terminal.

Specifically, according to the present disclosure, there is provided an application content output method in an application execution client unit of an output function division system where an output function of application content of a user terminal connected via a network to an application content server storing the application content is divided between the application execution client unit and an application execution server unit, sequentially including: a notification procedure of notifying a content input to the user terminal to the application execution server unit; and an output procedure of performing output according to information supplied from the application execution server unit in the user terminal.

Specifically, according to the present disclosure, there is provided a server used as an application execution server unit of an output function division system where an output function of application content of a user terminal connected via a network to an application content server storing the application content is divided between an application execution client unit and the application execution server unit, wherein the server supplies information necessary for performing the output according to the application content from the user terminal to the application execution client unit according to the content input to the user terminal notified from the application execution client unit.

In the server according to the present disclosure, the server may further include: an observation unit which transmit an observation request indicating a message of observing at least any one of communication environment, load and performance of the application execution client unit and acquires at least any one of communication environment, load and performance of the application execution client unit from the application execution client unit; and a process decision unit which decides a process which is performed by the application execution server unit in order to output the application content for each element of the application content based on at least any one of communication environment, load and performance of the application execution client unit, and the server may perform the process decided by the process decision unit among information necessary for outputting the application content from the user terminal for each element of the application content and may supply information necessary for outputting the application content to the user terminal to the application execution client unit.

Specifically, according to the present disclosure, there is provided an application content output method in an application execution server unit of an output function division system where an output function of application content of a user terminal connected via a network to an application content server storing the application content is divided between an application execution client unit and the application execution server unit, including a supplying procedure where the application execution server unit supplies information necessary for performing the output according to the application content from the user terminal to the application execution client unit according to the content input to the user terminal notified from the application execution client unit.

Specifically, according to the present disclosure, there is provided a management server which is included in an output function division system where an output function of application content of a user terminal connected via a network to an application content server storing the application content is divided between an application execution client unit and an application execution server unit and which is connected via the network to the application execution client unit and the application execution server unit, wherein the output function division system includes a plurality of the application execution server units, and wherein the management server introduces one set among the plurality of the application execution server units to the user terminal.

Specifically, according to the present disclosure, there is provided an application content output method in a management server which is included in an output function division system where an output function of application content of a user terminal connected via a network to an application content server storing the application content is divided between an application execution client unit and an application execution server unit and which is connected via the network to the application execution client unit and the application execution server unit, wherein the output function division system includes a plurality of the application execution server units, and wherein the application content output method includes, before a notification procedure where the application execution client unit notifies a content input to the user terminal to the application execution server unit, a server unit selection procedure where the management server introduces one set among the plurality of the application execution server units to the user terminal.

Specifically, according to the present disclosure, there is provided a Web browsing system where a Web browser function of displaying a Web page stored in a Web server on a user terminal connected via the Internet to the Web server is divided into a browsing client unit and a browsing server unit, wherein the browsing client unit and the browsing server unit are connected to each other via a network, wherein the browsing client unit is installed in the user terminal and notifies a content input to the user terminal to the browsing server unit and display the Web page on the user terminal by using information supplied from the browsing server unit, and wherein the browsing server unit supplies information necessary for displaying the Web page on the user terminal to the browsing client unit according to the content input to the user terminal notified from the browsing client unit.

In the Web browsing system according to the present disclosure, the browsing client unit may include a manipulation event filter function of notifying a manipulation event which is not completed in the browsing client unit to the browsing server unit, the browsing server unit may supply the information necessary for displaying the Web page on the user terminal to the browsing client unit according to the manipulation event notified from the browsing client unit.

In the Web browsing system according to the present disclosure, the browsing server unit may supply an image file requiring a decompression process without decompression to the browsing client unit, and the browsing client unit may perform the decompression process of the image file.

In the Web browsing system according to the present disclosure, the Web browsing system may include a plurality of the browsing server units, and the Web browsing system may further include a management server which is connected to via the network to the browsing client unit and the browsing server unit and which introduces the browsing server unit nearest to the user terminal among the plurality of the browsing server units to the user terminal.

In the Web browsing system according to the present disclosure, the browsing server unit may include: an observation unit which transmits an observation request indicating a message of observing at least any one of communication environment, load and performance of the browsing client unit and acquires at least any one of communication environment, load and performance of the browsing client unit from the browsing client unit; and a process decision unit which decides a process which is performed by the browsing server unit in order to display the Web page for each element of the Web page based on at least any one of communication environment, load and performance of the browsing client unit, the browsing server unit may perform the process decided by the process decision unit among information necessary for displaying the Web page on the user terminal for each element of the Web page and may supply information necessary for displaying the Web page on the user terminal to the browsing client unit and the browsing client unit may transport an observation result according to the observation request from the browsing server unit and display the Web page on the user terminal by using the information supplied from the browsing server unit.

In the Web browsing system according to the present disclosure, the Web browsing system may include a plurality of the user terminals including the browsing client unit, the browsing server unit may supply common information necessary for displaying the Web page to the browsing client unit included in each of the user terminals which is defined in advance, and the browsing client unit may display the same Web page.

Specifically, according to the present disclosure, there is provided a Web browsing method in a Web browsing system where a Web browser function of displaying a Web page stored in a Web server on a user terminal connected via the Internet to the Web server is divided into a browsing client unit and a browsing server unit, wherein the browsing client unit and the browsing server unit are connected to each other via a network, and wherein the Web browsing method sequentially includes: a notification procedure where the browsing client unit notifies a content input to the user terminal to the browsing server unit; a supplying procedure where the browsing server unit supplies information necessary for displaying the Web page on the user terminal to the browsing client unit according to the content input to the user terminal notified from the browsing client unit; and a display procedure where the browsing client unit displays the Web page on the user terminal by using the information supplied from the browsing server unit.

In the Web browsing method according to the present disclosure, in the notification procedure, the browsing client unit may notify a manipulation event which is not completed in the browsing client unit to the browsing server unit, and in the supplying procedure, the browsing server unit may supply information necessary for displaying the Web page on the user terminal to the browsing client unit according to the manipulation event notified from the browsing client unit.

In the Web browsing method according to the present disclosure, in the supplying procedure, the browsing server unit may supply an image file requiring a decompression process without decompression to the browsing client unit, and in the display procedure, the browsing client unit may perform the decompression process of the image file.

In the Web browsing method according to the present disclosure, the Web browsing system may include a plurality of the browsing server units and further may include a management server which is connected to the browsing client unit and the browsing server unit via the network, and the Web browsing method may further include, before the notification procedure, a browsing server unit selection procedure of introducing the browsing server unit nearest to the user terminal among the plurality of the browsing server units to the user terminal.

In the Web browsing system according to the present disclosure, the Web browsing method may include, before the notification procedure, observing at least any one of communication environment, load and performance of the browsing client unit and deciding a process which is performed by the browsing server unit in order to display the Web page for each element of the Web page based on at least any one of communication environment, load and performance of the browsing client unit, in the supplying procedure, the browsing server unit may perform the process decided in the process decision procedure among information necessary for displaying the Web page on the user terminal for each element of the Web page and may supply information necessary for displaying the Web page on the user terminal to the browsing client unit, and in the display procedure, the browsing client unit may display the Web page on the user terminal by using the information supplied from the browsing server unit.

In the Web browsing system according to the present disclosure, the Web browsing system may include a plurality of the user terminals including the browsing client unit, the browsing server unit may supply common information necessary for displaying the Web page to the browsing client unit included in each of the user terminals which is defined in advance, and the browsing client unit may display the same Web page.

Specifically, according to the present disclosure, there is provided a browsing client unit of a Web browsing system where a Web browser function of displaying a Web page stored in a Web server on a user terminal connected via the Internet to the Web server is divided into the browsing client unit and a browsing server unit, wherein the browsing client unit and the browsing server unit are connected to each other via a network, and wherein the browsing client unit is installed in the user terminal and notifies a content input to the user terminal to the browsing server unit and displays the Web page on the user terminal by using information supplied from the browsing server unit.

Specifically, according to the present disclosure, there is provided a Web browsing method in a browsing client unit of a Web browsing system where a Web browser function of displaying a Web page stored in a Web server on a user terminal connected via the Internet to the Web server is divided into the browsing client unit and a browsing server unit, wherein the browsing client unit and the browsing server unit are connected to each other via a network, and wherein the Web browsing method sequentially includes: a notification procedure where the browsing client unit notifies a content input to the user terminal to the browsing server unit; an acquisition procedure where the browsing client unit acquires information necessary for displaying the Web page on the user terminal from the browsing server unit; and a display procedure where the browsing client unit displays the Web page on the user terminal by using information supplied from the browsing server unit.

Specifically, according to the present disclosure, there is provided a browsing server unit of a Web browsing system where a Web browser function of displaying a Web page stored in a Web server on a user terminal connected via the Internet to the Web server is divided into a browsing client unit and a browsing server unit, wherein the browsing client unit and the browsing server unit are connected to each other via a network, and wherein the browsing server unit supplies information necessary for displaying the Web page on the user terminal to the browsing client unit according to a content input to the user terminal notified from the browsing client unit.

In the browsing server unit according to the present disclosure, the browsing server unit may further include: an observation unit which transmits an observation request indicating a message of observing at least any one of communication environment, load and performance of the browsing client unit and acquires at least any one of communication environment, load and performance of the browsing client unit from the browsing client unit; and a process decision unit which decides a process which is performed by the browsing server unit in order to display the Web page for each element of the Web page based on at least any one of communication environment, load and performance of the browsing client unit, and the browsing server unit may perform the process decided by the process decision unit among information necessary for displaying the Web page on the user terminal for each element of the Web page and may supply information necessary for displaying the Web page on the user terminal to the browsing client unit.

Specifically, according to the present disclosure, there is provided a Web browsing method in a browsing server unit of a Web browsing system where a Web browser function of displaying a Web page stored in a Web server on a user terminal connected via the Internet to the Web server is divided into a browsing client unit and the browsing server unit, wherein the browsing client unit and the browsing server unit are connected to each other via a network, and wherein the Web browsing method sequentially includes: a notification procedure where the browsing server unit is notified with a content input to the user terminal from the browsing client unit; and a supplying procedure where the browsing server unit supplies information necessary for displaying the Web page on the user terminal to the browsing client unit according to the content input to the user terminal notified from the browsing client unit.

In the Web browsing method in a browsing server unit according to the present disclosure, the Web browsing method may include, before the notification procedure, observing at least any one of communication environment, load and performance of the browsing client unit and deciding a process which is performed by the browsing server unit in order to display the Web page for each element of the Web page based on at least any one of communication environment, load and performance of the browsing client unit, and in the supplying procedure, the browsing server unit may perform the process decided in the process decision procedure among information necessary for displaying the Web page on the user terminal for each element of the Web page and may supply information necessary for displaying the Web page on the user terminal to the browsing client unit.

Specifically, according to the present disclosure, there is provided a management server which is included in a Web browsing system where a Web browser function of displaying a Web page stored in a Web server on a user terminal connected via the Internet to the Web server is divided into a browsing client unit and a browsing server unit and which is connected via a network to the browsing client unit and the browsing server unit, wherein the Web browsing system includes a plurality of the browsing server units, and wherein the management server introduces the browsing server unit nearest to the user terminal among the plurality of the browsing server units to the user terminal.

Specifically, according to the present disclosure, there is provided a Web browsing method in a management server which is included in a Web browsing system where a Web browser function of displaying a Web page stored in a Web server on a user terminal connected via the Internet to the Web server is divided into a browsing client unit and a browsing server unit and which is connected via a network to the browsing client unit and the browsing server unit, wherein the Web browsing system includes a plurality of the browsing server units, and wherein the Web browsing method includes, before a notification procedure where the browsing client unit notifies a content input to the user terminal to the browsing server unit, a browsing server unit selection procedure of introducing the browsing server unit nearest to the user terminal among the plurality of the browsing server units to the user terminal.

In addition, the disclosures described above may be combined if possible.

Advantageous Effects of Disclosure

According to the present disclosure, a Web browser capable of providing an equivalent quality of user experience to a user even with respect to access of user terminals differing in processing performance in order to allow a browsing server unit to substantially function as a browser engine can be implemented.

BRIEF DESCRIPTION OF THE DRAWINGS

FIG. 5 illustrates an example of an HTML file.

FIG. 27 illustrates an example of a correspondence between a Web browsing system and each of an output function division system and an online game system.

FIG. 28 illustrates an example of a correspondence between processes of an output function division system and an online game system and processes of a Web browsing system.

FIG. 29 illustrates an example of a correspondence between each of an e-book system, a screen display system, and an audio output system and a Web browsing system.

FIG. 30 illustrates an example of a correspondence between processes of an e-book system, a screen display system, an audio output system and processes of a Web browsing system.

DETAILED DESCRIPTION OF THE PREFERRED EMBODIMENT

Figure 1:
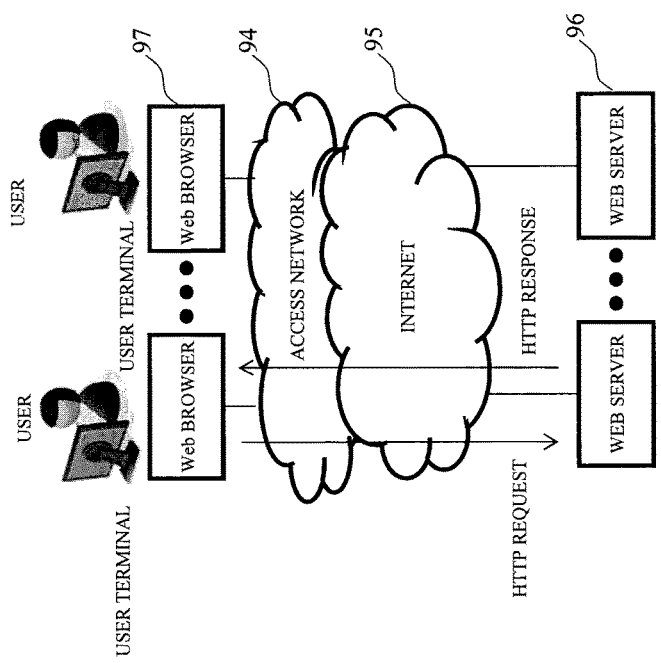
FIG. 1 illustrates an example of a Web browsing system using a Web browser.

Hereinafter, embodiments of the present disclosure will be described in detail with reference to the drawings. In addition, the present disclosure is not limited to the following embodiments. The embodiments are merely exemplary ones, and the present disclosure can be embodied in various changed and reformed forms based on knowledge of the ordinarily skilled in the related art. In addition, in the specification and the drawings, the same components are denoted by the same reference numerals.

(First Embodiment)

The present disclosure is to implement a Web browser capable of providing an equivalent quality of user experience to a user even with respect to access of devices differing in processing performance by utilizing computation resources on a network in browsing of a Rich Internet Application by the Web browser.

Figure 3:
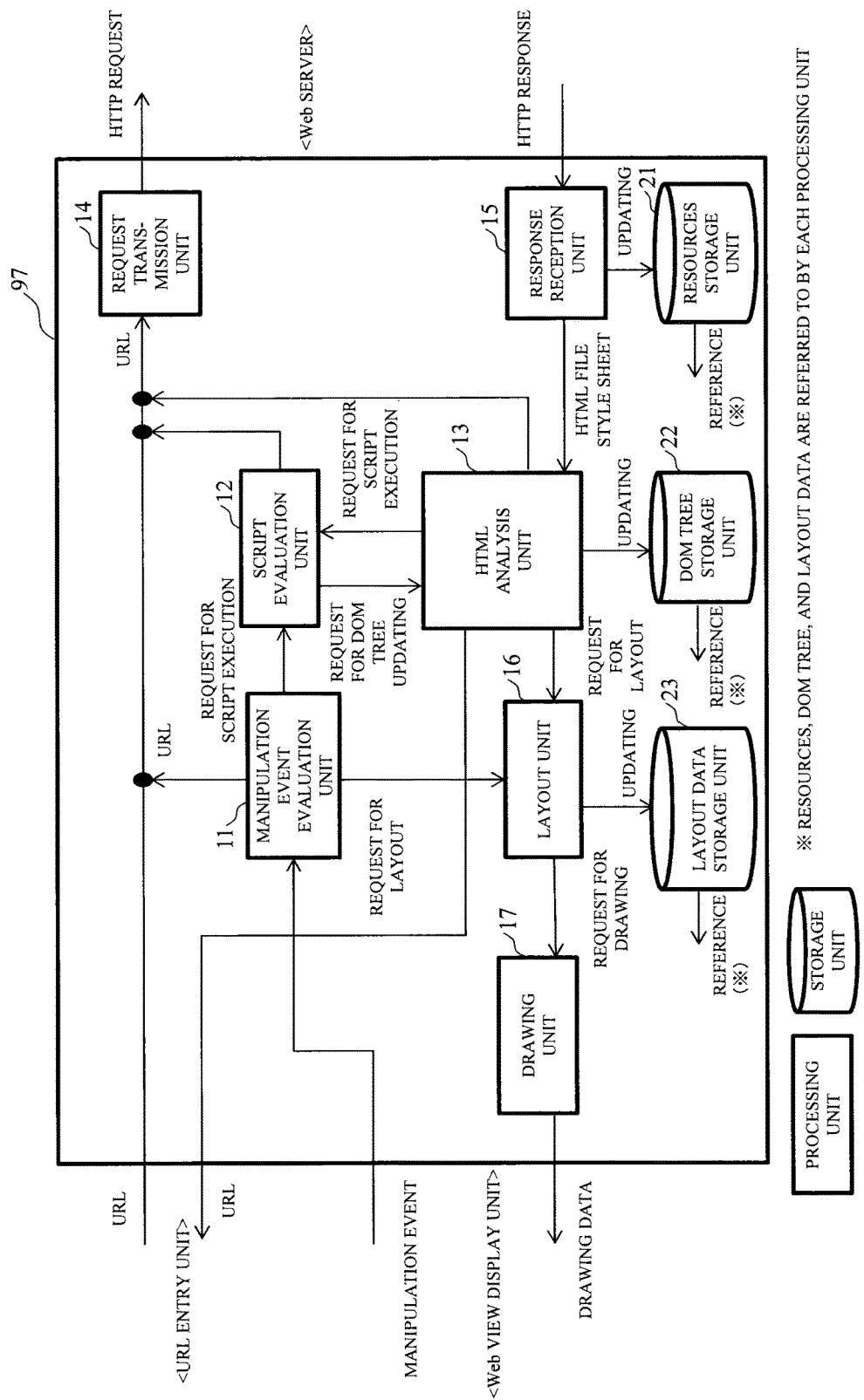
FIG. 3 illustrates a functional block diagram illustrating an example of a Web browser.

A Web browsing system according to the present disclosure divides a Web browser of FIG. 3 into two units of a browsing client unit and a browsing server unit. A Web browsing method according to the present disclosure sequentially includes a notification procedure, a supplying procedure and a display procedure.

In the notification procedure, the browsing client unit notifies a content input to a user terminal to the browsing server unit.

In the supplying procedure, the browsing server unit supplies information necessary for displaying a Web page on the user terminal to the browsing client unit according to the content input to the user terminal notified from the browsing client unit.

In the display procedure, the browsing client unit displays a Web page on the user terminal by using the information provided from the browsing server unit.

In a case where the Web browsing system according to the present disclosure includes a plurality of the browsing server units, the Web browsing method according to the present disclosure may further include a browsing server unit selection procedure before the notification procedure. In the browsing server unit selection procedure, a browsing server unit selection procedure of introducing any one of the browsing server units to the user terminal is further included.

In addition, in the browsing server unit selection procedure, in addition to the browsing server unit nearest to the user terminal, the browsing server unit of which load state is lowest, the browsing server unit which is connected to the smallest number of user terminals, the browsing server unit of which network delay is lowest, and the like may be considered.

Figure 2:
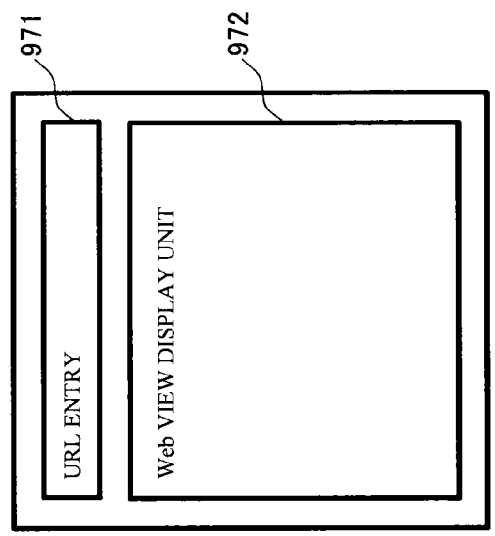
FIG. 2 illustrates an example of a Web page where a URL entry unit is represented.

The browsing client unit basically provides a GUI (in the case of the browser of FIG. 2, a URL entry 971 and Webview display unit 972) of the Web browser to the user terminal and undertakes reception of a URL and a manipulation event from the user terminal and presentation of a Web screen to the user terminal. The browsing server unit undertakes each process of the Web browser 97 illustrated in FIG. 3. Next, by supplying layout data to the browsing client unit, the browsing server unit instructs screen-updating of the Webview display unit 972.

In the present disclosure, the browsing client unit is processed in a device (user terminal) which is owned by the user, and the browsing server unit is processed on a PC server of which processing performance is higher than that on a network. Namely, the process of the user terminal having limited performance is limited to the light-weighted browsing client unit. Unlike the method proposed by Orito, reconstruction of a DOM tree or re-evaluation of layout is also off-loaded at the network side. Namely, since the processes of "remote call using JavaScript (registered trademark), "reception of a resulting HTML file" and "reconstruction of the DOM tree" required by the user terminal in the method proposed by Orito are unnecessary, much more load of the user terminal can be reduced. As a result, even a less powerful user terminal can process the Rich Internet Application without bottleneck in terms of the processing performance.

Figure 9:
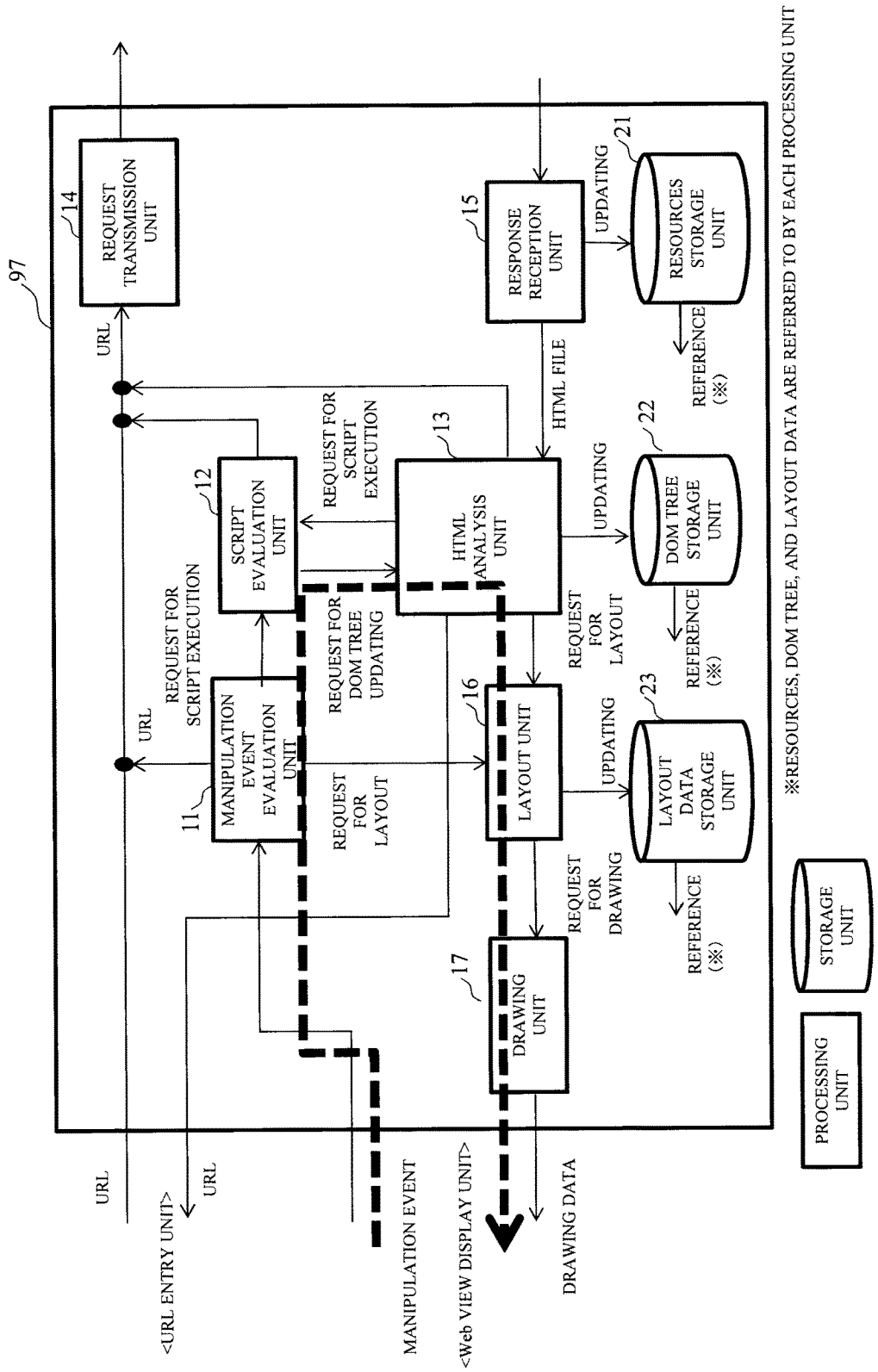
FIG. 9 illustrates an operation example of a Web browser from the occurrence of a manipulation event to the time of screen drawing with respect to Web screen display.
Figure 10:
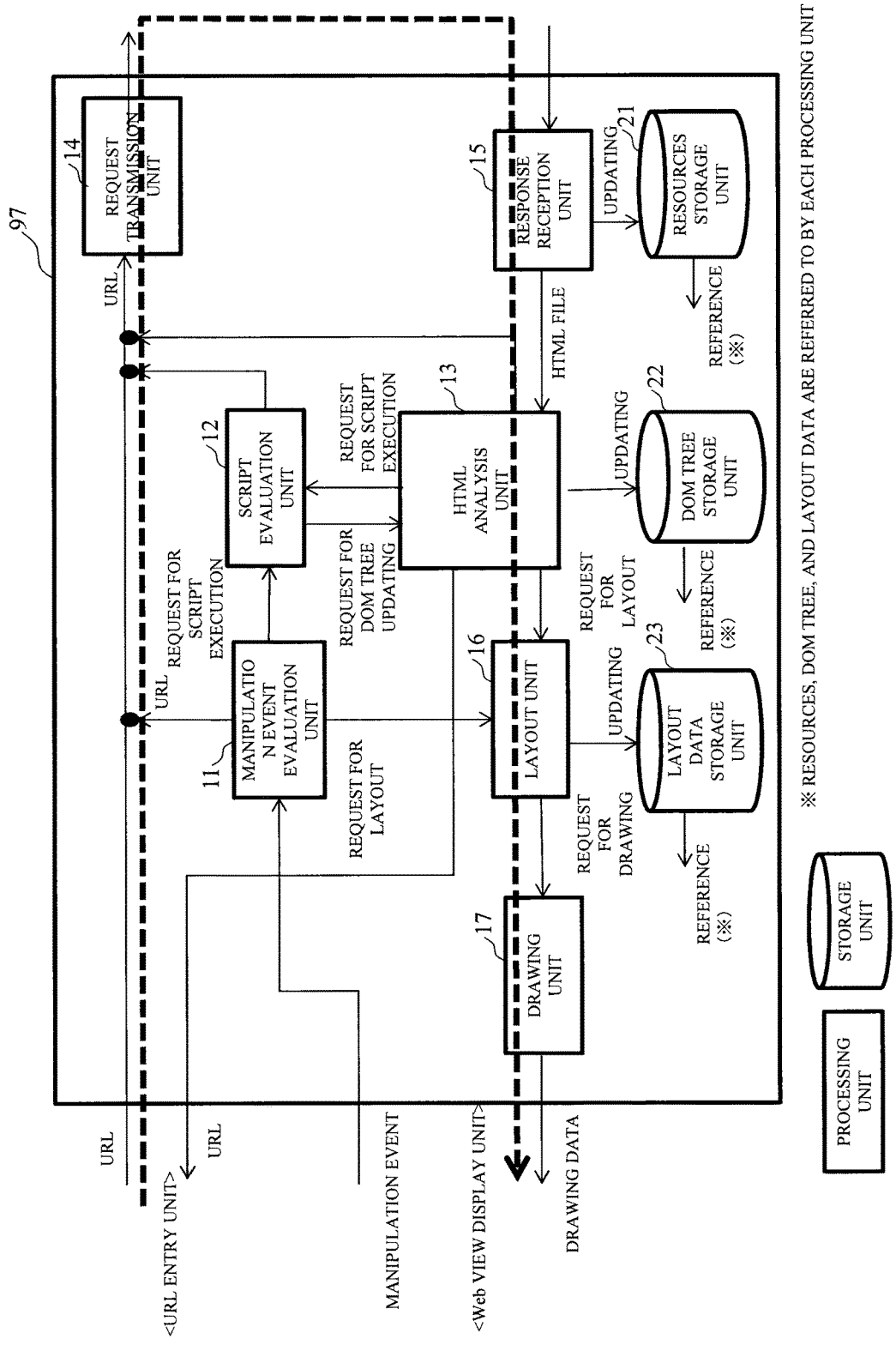
FIG. 10 illustrates an operation example of a Web browser at the time of reducing a response time from the time of inputting a URL to the time of screen display by using a cache technique.
Figure 11:
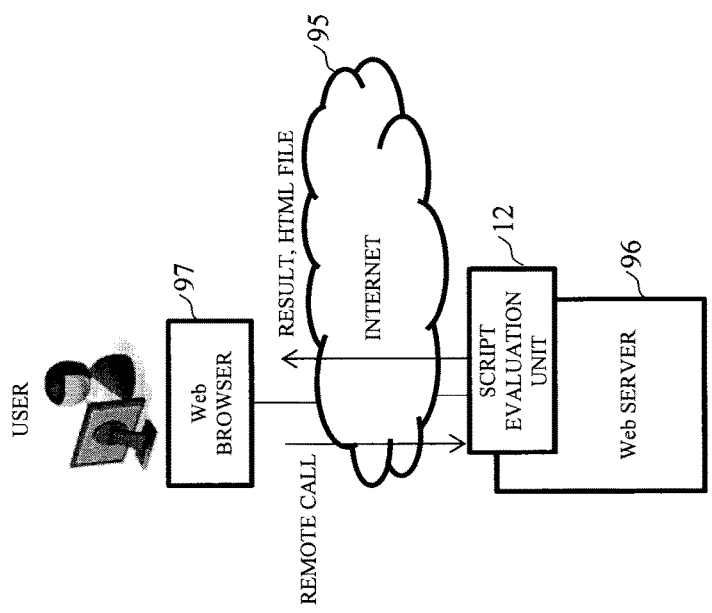
FIG. 11 illustrates a diagram of explaining a method of remotely performing a script evaluation unit on a Web server.

As described above, in order to maintain a high quality of user experience, the response time from the occurrence of the manipulation event to the time of the screen drawing (a flow of a broken arrow in FIG. 9) is required to be reduced. In the present disclosure, by allowing the PC server of which performance is higher than that of the user terminal to process the browsing server unit, the processing time for individual event is reduced. On the contrary, in comparison with a normal Web browser of FIG. 3, delay of communication of the browsing client unit and the browsing server unit newly occurs. Therefore, in order to obtain the effect of reduction of the response time according to the present disclosure, the condition is that the processing time reduced by the off-loading to the browsing server unit is larger than the delay of communication occurring due to the communication with the browsing server unit. Accordingly, in the present disclosure, it is important to suppress the delay of communication with the browsing server unit to a minimum. In a case where Japan is assumed, if a server in Tokyo is accessed from a metropolitan area, a round-trip delay time is about 10 milliseconds; but if the server in Tokyo is accessed from Hokkaido or Okinawa, the round-trip delay time reaches 50 milliseconds to 100 milliseconds or more. Accordingly, in a case where the browsing server unit is arranged at one site inside Japan, whether or not to obtain the effect of the present disclosure and the magnitude of the effect greatly depend on the position of the user terminal.

Therefore, in the present disclosure, the browsing server units are arranged to be distributed within a network. Namely, in general, as illustrated in FIG. 1, the network between the user terminal and the Web server 96 is configured with the Internet 95 to which the Web server 96 is connected and the network 94 which connects the user terminal and the Internet.

Herein, an NGN (Next Generation Network) or a 3G network or an LTE (Long Term Evolution) network of a mobile phone corresponds to the network 94. In the present disclosure, attention is focused on a hierarchical structure of the network, and the browsing server units are arranged to be distributed within the network 94 connecting the user terminal and the Internet 95. Alternatively, the browsing server units are arranged to be distributed to a plurality of connection points of the Internet 95 and the network 94. Next, the browsing client unit on the user terminal is connected to the neighboring browsing server unit according to the position thereof. Accordingly, the delay of communication with the browsing server unit can be minimized regardless of the position of the browsing client unit.

Moreover, in the present disclosure, a single browsing server unit is configured to handle multiple users in a multiplexing manner. Generally, a process load of the Web browser 97 is temporarily increased at the time of page transition or at the time of occurrence of manipulation event, but the process load is very small at the time when the user does not perform any manipulation. In addition, with respect to the Rich Internet Application, the load is relatively increased in comparison with other pages, but the time taken by an individual user to browse the Rich Application is also limited. Therefore, it is expected that the timings when the load of the browsing server unit is increased (the user manipulates the Web browser 97 or browses the Rich Application) are stochastically distributed. Accordingly, in comparison with a conventional model where all the processes of the Web browser 97 of one user are intermittently processed with a single terminal, high economic efficiency can be secured.

Figure 12:
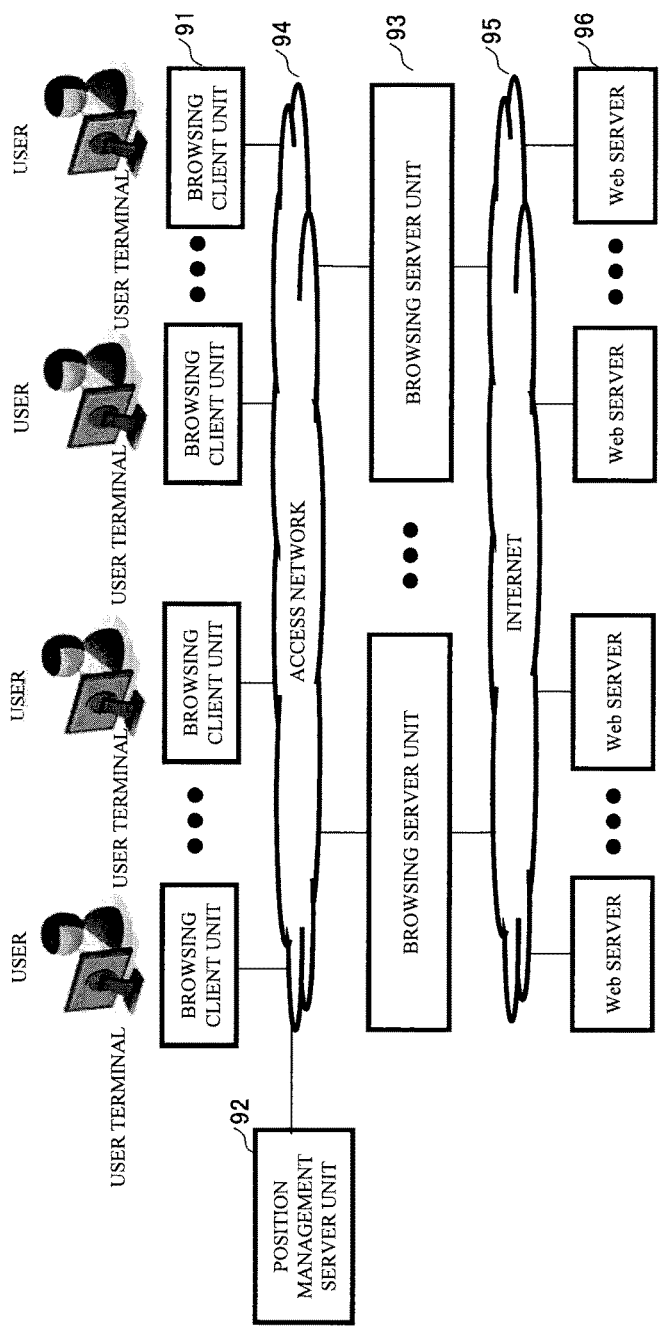
FIG. 12 illustrates a configuration diagram of a Web browsing system according to the embodiment.

FIG. 12 illustrates an overall diagram of the Web browsing system according to the embodiment.

In the present disclosure, one or more browsing client units 91, a management server 92 and one or more browsing server units 93 are connected to the network 94. In addition, herein, it is illustrated that the browsing server units 93 are arranged to be distributed to a plurality of connection points between the Internet 95 and the network 94, but the browsing server units 93 may be arranged to be distributed within the network 94. Therefore, the browsing server units 93 are connected to one or more web servers 96 through the Internet 95.

Herein, the browsing client unit 91 is executed on the user terminal which is browsed and manipulated by the user. in addition, among the functions of the Web browser 97, the browsing client unit mainly undertakes presentation of a screen as a Web browser and reception of user manipulation. Herein, for the description, it is assumed that the browsing client unit 91 supplies the Web browser screen of FIG. 2.

When the browsing client unit 91 is connected to the browsing server unit 93, the management server 92 introduces the browsing server unit 93 nearest to the browsing client unit 91 to the browsing client unit 91.

Herein, the setting of the browsing server unit 93 introduced by the management server 92 is arbitrary. For example, the browsing server unit may be selected based on the network state or the load or communication environment of the browsing server unit 93, not by the position from the browsing client unit 91, or the browsing server unit may be selected based on the position from the browsing client unit 91, the network state and the load or communication environment of the browsing server unit 93. For example, among a plurality of the browsing server units 93, the browsing server unit of which load is small at the present time or in the future is selected; among a plurality of the browsing server units 93, the browsing server unit of which number of connections is small at the present time or in the future is selected; and a specific browsing server unit 93 which is designated in advance is selected as to be intensively driven.

The browsing server unit 93 provides basic functions (browser engine) as the Web browser of a manipulation event evaluation unit 11, a script evaluation unit 12, a request transmission unit 14, a response reception unit 15, an HTML analysis unit 13 and a layout unit 16 in the Web browser 97 to the browsing client unit 91. The browsing server unit 93 is executed on a PC server of which performance is higher than the user terminal. In addition, simultaneously, the browsing server unit 93 provides functions as the browsing engine to a plurality of the browsing client units 91.

The Web server 96 returns resources associated with the URL as an HTTP response with respect to the HTTP request received from the browsing server unit 93.

In FIG. 12, an example where sending an inquiry of the browsing server unit 93 to the management server 92 is fixed first once is illustrated, but in the case of a notebook PC or a mobile terminal of which installation location can be changed, the sending an inquiry may be performed for every new HTTP request after the change of the position information, and the sending an inquiry to the browsing client unit 91 may be performed again from the congested state of the process of the browsing server unit 93, and a reply with the browsing server unit 93 considering load balance may be sent. In addition, in a case where there is a WEB page which is continuously maintained before the sending a request again, the browsing server unit 93 of the WEB page may be connected to a plurality of the browsing server units 93 without change.

Figure 13:
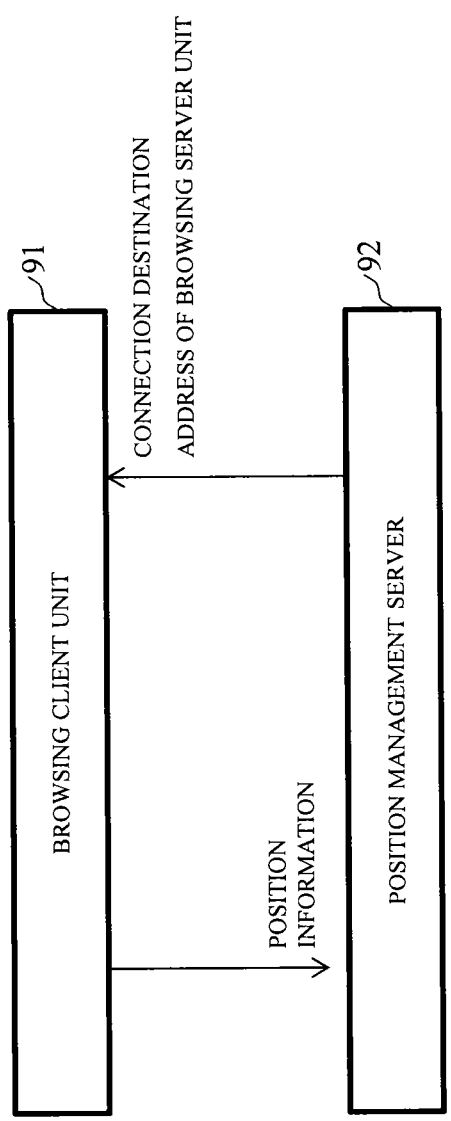
FIG. 13 illustrates data flow of a browsing client unit 91 and a management server 92.

FIG. 13 illustrates a data flow between the browsing client unit 91 and the management server 92. If browsing of the Web page is requested from the user, the browsing client unit 91 sends an inquiry about the neighboring browsing server unit 93 to the management server 92. At this time, the browsing client unit 91 transmits key information (position information) for identifying its own position to the management server 92. The management server 92 specifies the neighboring browsing server unit 93 based on the position information and sends a reply to the browsing server unit 93 of the connection destination. Accordingly, the network delay between the browsing client unit 91 and the browsing server unit 93 is reduced, so that the influence of the position of the user terminal on the effect of reduction of the response time according to the present disclosure is decreased.

As a communication protocol between the browsing client unit 91 and the management server 92, a DNS (Domain Name System) can be used. In this case, the browsing client unit 91 is given by a host name of the browsing server unit 93 of the connection destination in advance. In addition, the management server 92 functions as a DNS server which manages a domain of the browsing client unit 91. As a specific procedure, first, at the time of being connected to the browsing server unit 93, the browsing client unit 91 sends to a DNS resolver an inquiry about an address associated with the host name. The DNS resolver finally requests the management server 92 to perform address resolution of the browsing server unit 93 according to a protocol defined in an RFC 1035. The address of the neighboring browsing server unit 93 corresponding to the address of the DNS resolver is registered in advance in the database of the management server 92. With respect to the request for solving of address from the DNS resolver, the management server 92 sends a reply with the address of the neighboring browsing server unit with reference to the database. Accordingly, the browsing client unit 91 can be connected to just neighboring browsing server unit 93.

In addition, besides the DNS, other protocols such as HTTP may be used. In addition, as the position information, position information (latitude and longitude) acquired from a GPS (Global Positioning System) on the user terminal can be transmitted. In addition, at the time of access line contract or at the time of installation of the browsing client unit 91, when the user ID (for example, an ID at the time of user authentication in PPP (Point to Point Protocol)) is issued, the address may be registered. In this case, at the time of sending an inquiry to the management server 92, the user ID (or registered address itself) is transmitted as the position information to the management server 92. In addition, in cooperation with an HLR (Home Location Register) in the 3G network of a mobile phone or a position registration function of an MME (Mobility Management Entity) in the LTE network, the position of the user terminal may be specified, and the neighboring browsing server unit 93 may be introduced.

Figure 4:
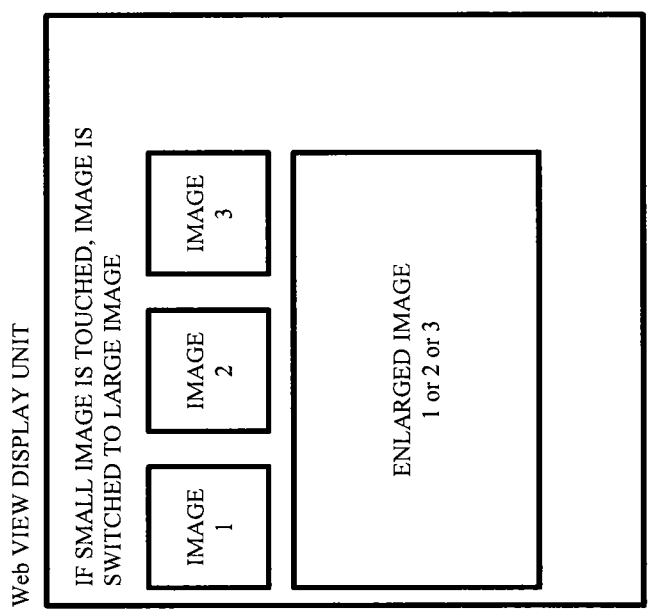
FIG. 4 illustrates an example of a Web page after transition to a URL which is input by a user.
Figure 6:
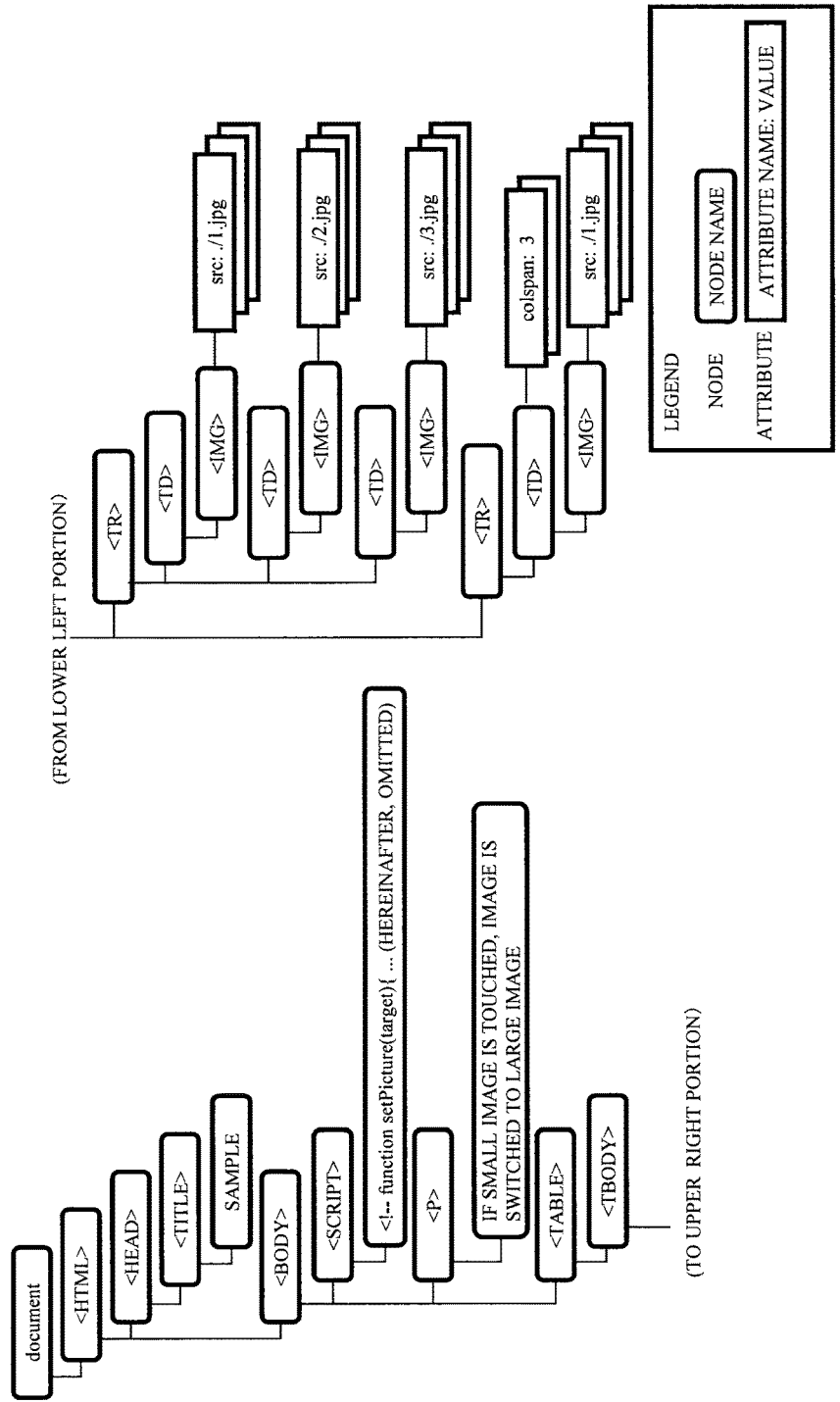
FIG. 6 illustrates an example of a DOM tree.
Figure 7:
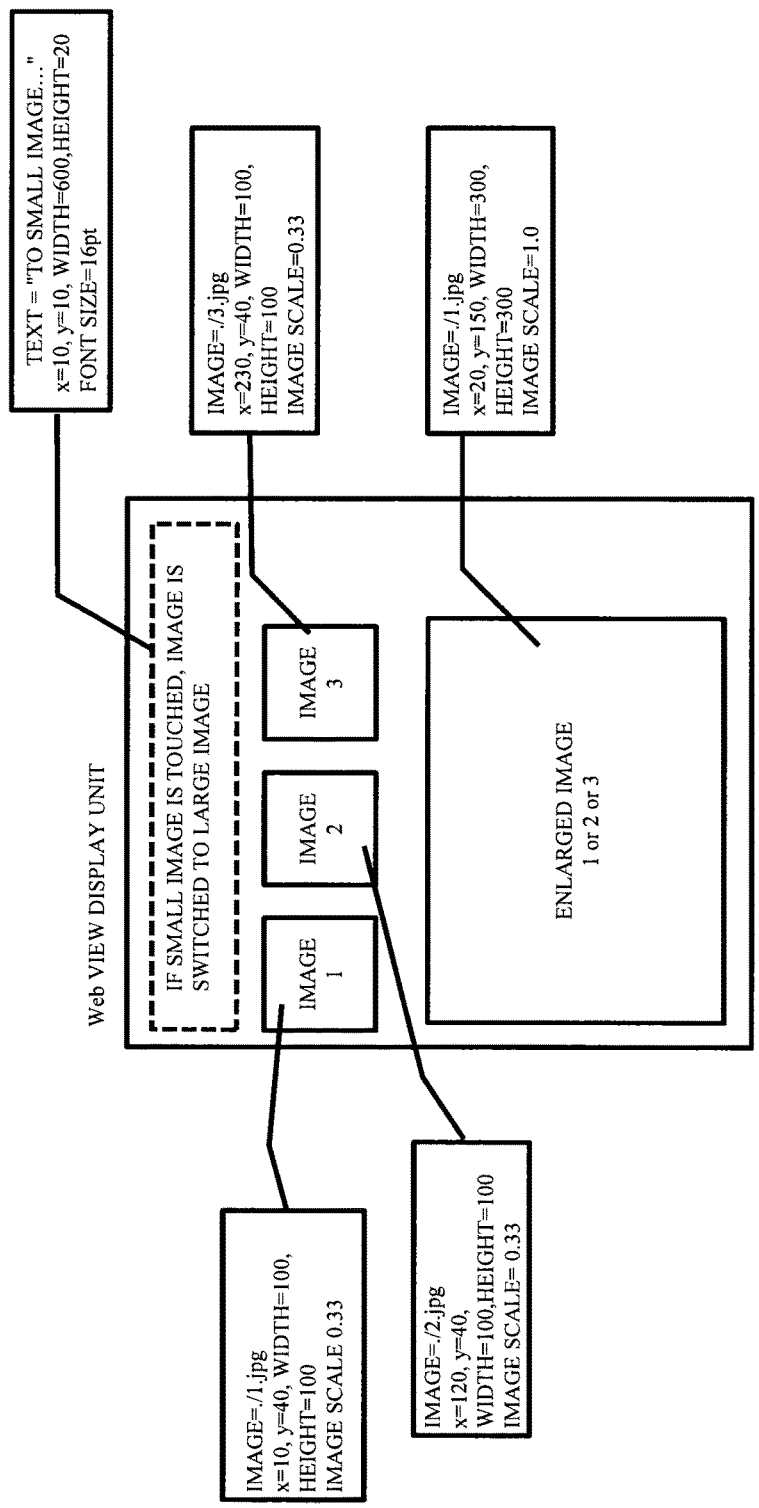
FIG. 7 illustrates a result example of layout data.
Figure 8:
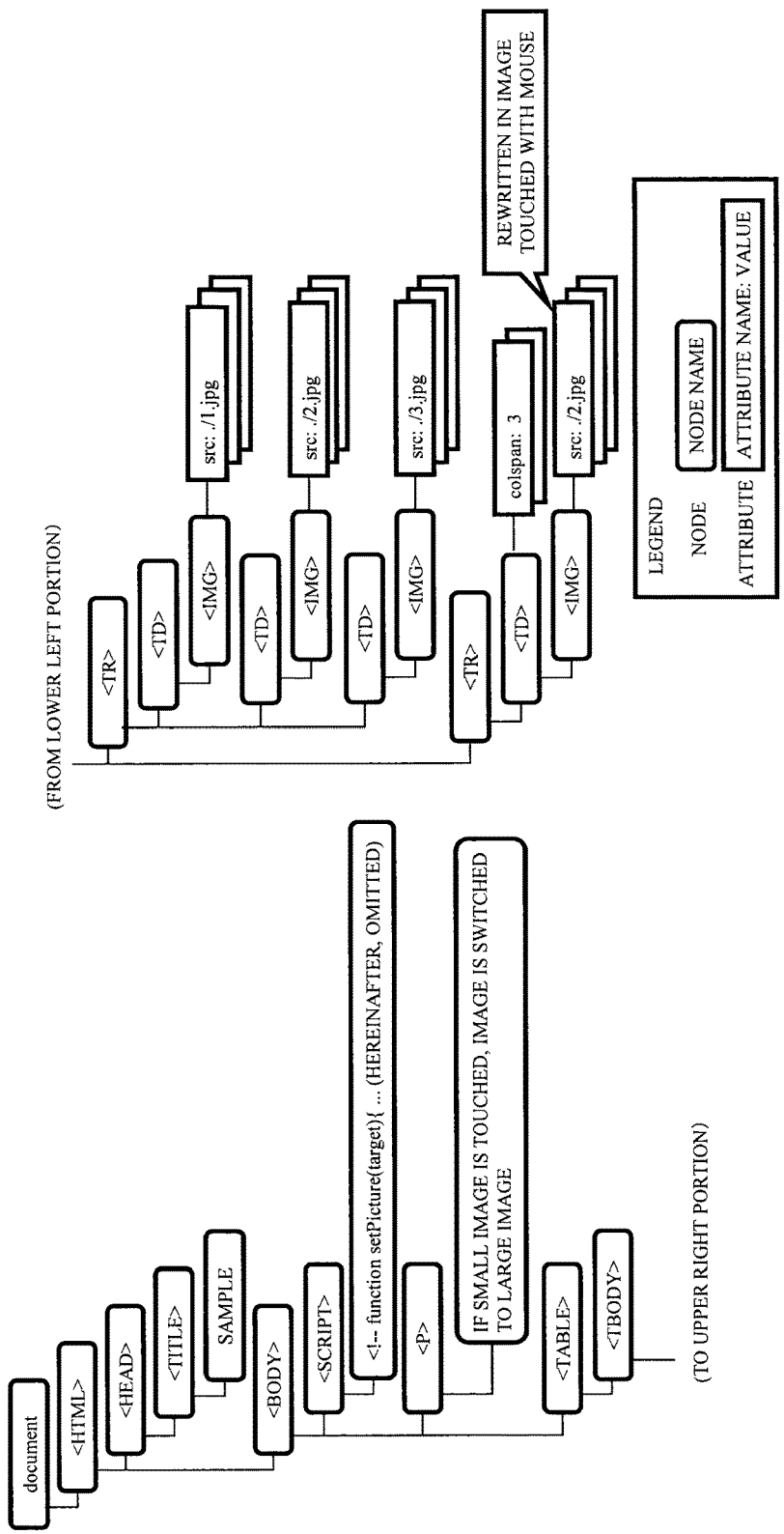
FIG. 8 illustrates an example of a DOM tree which is rewritten based on instructions of an evaluation unit of a script.

If the browsing client unit 91 acquires the address of the browsing server unit 93 of the connection destination from the management server 92, the browsing client unit 91 is connected to the browsing server unit 93 having a designated address, and the process as the Web browser 97 is started. In this specification, first, the components of each of the browsing client unit 91 and the browsing server unit 93 and basic operations thereof will be described. Next, a flow of a process in the case of browsing the Web page of FIG. 4 is illustrated. Finally, an extended unit of each component will be described.

Figure 14:
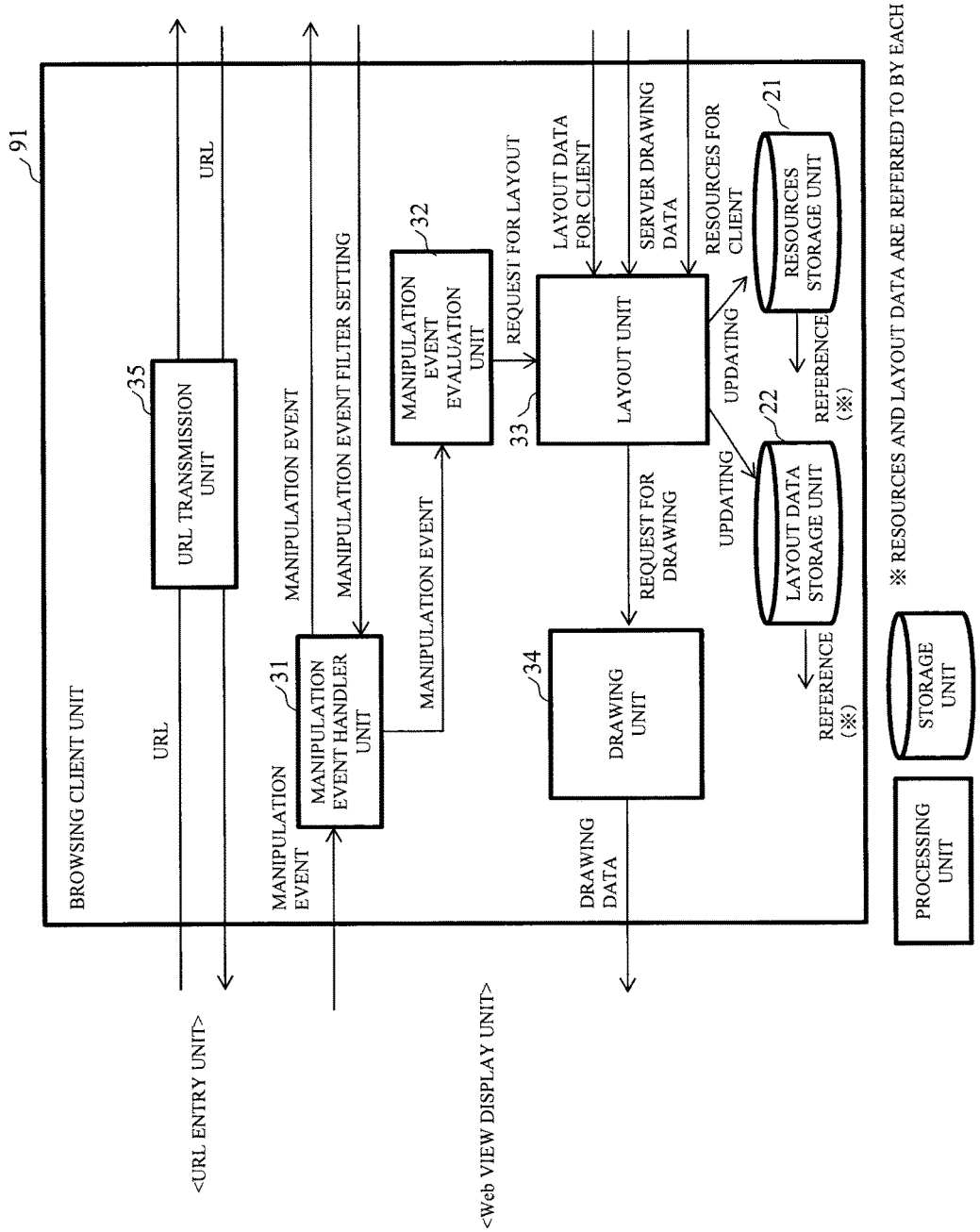
FIG. 14 illustrates an example of a configuration of a browsing client unit 91.

FIG. 14 illustrates an example of a configuration of the browsing client unit 91. The browsing client unit 91 is configured to include a manipulation event handler unit 31, a manipulation event evaluation unit 32, a layout unit 33, a drawing unit 34 and a URL transmission unit 35.

The manipulation event handler unit 31 determines whether or not to notify the manipulation event received from the user to the browsing server unit 93. The determination is based on the manipulation event filter setting notified from the browsing server unit 93. If any manipulation event occurs in any area of the Webview, whether the notification to the browsing server unit 93 is necessary (or not necessary) is indicated in the manipulation event filter setting. Mainly, the manipulation event used for the process (for example, clicking on a link) based on the DOM tree or for the evaluation in the script evaluation unit of the browsing server unit 93 is notified to the browsing server unit 93. On the other hand, the script evaluation unit does not need to evaluate the browsing server unit 93, and the manipulation event which can be locally processed in the browsing client unit 91 is notified to the manipulation event evaluation unit 32 in the browsing client unit 91. In addition, in some cases, the manipulation event handler unit 31 copies the manipulation event to notify the manipulation event to the browsing server unit 93 and, at the same time, to notify the manipulation event to the manipulation event evaluation unit 32 of the browsing client unit 91.

In the manipulation event filter function, for example, among the manipulation events, the manipulation event (manipulation event which is not completed in the client unit) requiring the process (script evaluation, production of the layout data in the layout unit, or the like)) of the browsing server unit 93 is notified to the browsing server unit 93. As the manipulation event which is not completed in the client unit, there is, for example, an event of displaying a screen which is not yet displayed by scrolling, an event requiring new screen drawing by calling an execution event of JavaScript by mouse manipulation, or an event requiring script execution.

Herein, as the manipulation event, rotation of the mouse wheel (mouse wheel event) is focused. In general, if the mouse wheel is rotated, the scrolling of the Webview screen is performed. However, in some case, according to the Web page, the mouse wheel event may be script-evaluated by JavaScript (registered trademark) or the like, so that a specific operation is performed. In addition, with respect to the scrolling, in a case where the browsing client unit 91 receives the entire drawing data of the Web page from the browsing server unit 93, the scrolling can be locally completed, but in a case where the browsing client unit receives a portion of the drawing data, the drawing data of an area newly displayed on the Webview by scrolling need to be acquired from the browsing server unit 93.

Therefore, first, if a new Web page is loaded, the browsing server unit 93 analyzes the HTML file to determine whether or not script evaluation of the mouse wheel event in the newly loaded Web page is performed (in the case of JavaScript (registered trademark), whether or not a listener to the on-mouse wheel event is set). Next, in a case where the script evaluation of the mouse wheel event is performed, a message indicating that the notification of the mouse wheel event is necessary is notified as the manipulation event filter setting to the browsing client unit 91. In addition, in a case where the script evaluation is not performed, if the entire screen data of the Web page are not transmitted to the browsing client unit 91, a message indicating that the notification of the mouse wheel event is necessary in order to transmit new screen data is set to the manipulation event filter setting. In the other cases, as a default operation, the notification of the mouse wheel event is unnecessary. In this case, closed scrolling is performed in the browsing client unit 91.

According to the manipulation event, the manipulation event evaluation unit 32 notifies to the layout unit 33 how to update the screen of the Webview. For example, in a case where the mouse wheel event occurs, the manipulation event evaluation unit instructs a scroll direction and a scroll width of the Webview according to a rotation direction and a rotation amount of the mouse wheel.

The layout unit 33 receives server drawing data and resources for client from the browsing server unit 93. The server drawing data are drawing data of the Web page screen configured in the browsing server unit 93. The server drawing data may receive a compressed bitmap image. In addition, the server drawing data may be transmitted as a drawing instruction list (as the drawing instruction, for example, "Draw a black bold line having a width of 2 pt from the coordinate (10, 20) to the coordinate (30, 50)" or "Draw a square with a width of 100 and a height of 150 from the coordinate (20, 40) by using a red line having a width of 4 pt" is considered, or the like) and may be converted into instruction of the drawing library (for example, Cairo (refer to, for example, Non-Patent Literature 3), java's Graphics class (refer to, for example, Non-Patent Literature 4) or the like) on the user terminal in the user terminal to be drawn. On the other hand, the resources for client are resources which are not included in the server drawing data but are necessary for drawing a screen in the browsing client unit 91 among the resources acquired from the Web server 96 by the browsing server unit 93. Furthermore, the browsing client unit 91 receives the layout data for client from the browsing server unit 93, and the layout data for client indicates in which these the server drawing data and the resources for client to be arranged in the Web page. In addition, the screen which is to be displayed on the Webview is configured based on the evaluation result (scroll direction, scroll width, or the like) from the manipulation event evaluation unit 32. This is notified as the layout data to the drawing unit 34.

In the present disclosure, which resources among the resources constituting the screen of the Web page are to be drawn in the browsing server unit 93 (in this case, the resources are transmitted as a part of the server drawing data to the browsing client unit 91) and which resources are to be drawn in the browsing client unit 91 (in this case, the resources acquired from the Web server are transmitted as the resources for client without change to the browsing client unit 91) can be smoothly selected. For example, the case of displaying an image file on the Web page is considered. The image used in the Web page is compressed in formats of JPG and PNG. On the other hand, the drawing data which are screens configured at the browsing server unit 93 side are too large in size if the drawing data are transmitted as a bitmap image as they are, so that the drawing data also need to be transmitted in the state where the drawing data are compressed by some units. Accordingly, in the case of drawing an image file in the browsing server unit 93 or in the case of drawing an image file in the browsing client unit 91 side, an image decompression process needs to be performed on the user terminal, so that there occurs no large difference in load of the user terminal. Therefore, in the present disclosure, any image file is configured not to be included in the screen configured on the browsing server unit 93, and the drawing of the image file is performed in the browsing client unit 91. Accordingly, extra decompression process and recompression process do not occur in the browsing server unit 93, so that an accommodation efficiency of the browsing server unit 93 is improved.

The drawing unit 34 draws the screen based on the layout data. The drawing result is notified as the drawing data to the Webview display unit 972 and is displayed on the display. In addition, if the URL is input from the URL entry unit 971, the URL transmission unit 35 of the browsing client unit 91 transmits the URL to the browsing server unit 93. On the contrary, if the URL transmission unit 35 receives the URL from the browsing server unit 93, the URL transmission unit 35 notifies the URL to the URL entry unit 971 and displays the URL on the screen of the Web browser.

Figure 15:
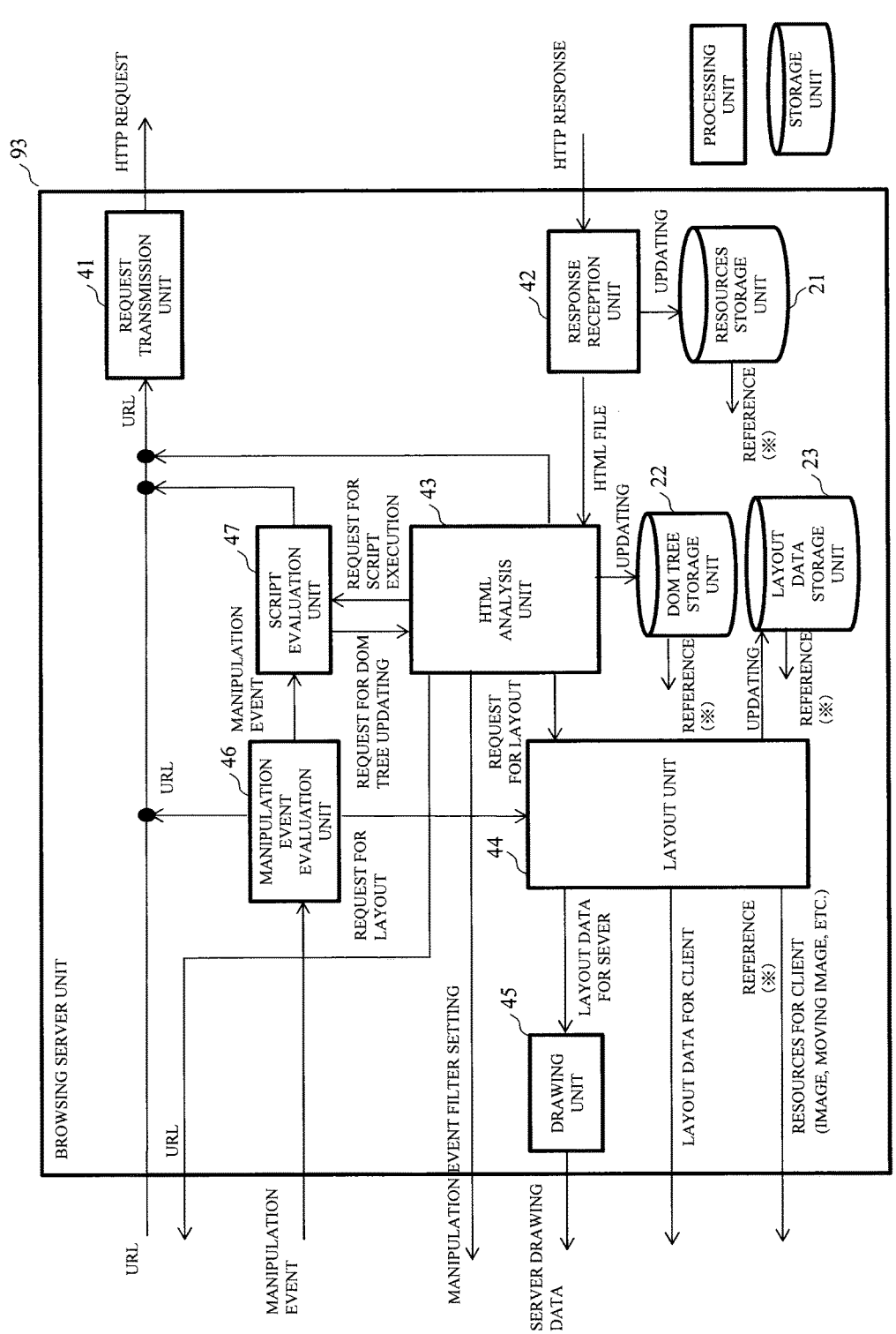
FIG. 15 illustrates a configuration of a browsing server unit 93.

Next, FIG. 15 illustrates a configuration of the browsing server unit 93. The browsing server unit 93 is configured to include a request transmission unit 41, a response reception unit 42, an HTML analysis unit 43, a layout unit 44, a drawing unit 45, a manipulation event evaluation unit 46 and a script evaluation unit 47. Among these components, the request transmission unit 41, the response reception unit 42, the manipulation event evaluation unit 46 and the script evaluation unit 47 are operated similarly to those of the normal Web browser 97 of FIG. 3.

The HTML analysis unit 43 according to the present disclosure is configured to add a new process of transmission of manipulation event filter setting to the browsing client unit 91 to the process of the HTML analysis unit 13 of the normal Web browser 97 illustrated in FIG. 3. Namely, every time a new Web page is loaded, the HTML analysis unit analyzes the DOM tree and, if a manipulation event occurs in an area of the Webview, the HTML analysis unit extracts whether or not the notification to the browsing server unit 93 is needed. Next, the extraction result is transmitted as the manipulation event filter setting to the browsing client unit 91.

As described above in the description of the browsing client unit 91, the layout unit 44 decides which areas of the screen of the Web page is to be applied with drawing in the browsing server unit 93 and which areas of the screen of the Web page is to be applied with drawing in the browsing client unit 91. Next, with respect to the portion which is to be applied with the drawing in the browsing server unit 93, the layout unit configures a layout and notifies the layout as the layout data for server to the drawing unit 45 of the browsing server unit 93. In addition, with respect to the portion which is to be applied with the drawing in the browsing client unit 91, the layout unit transmits the resources which are not applied with the drawing in the server as the resources for client to the browsing client unit 91, and the layout unit transmits the screen (server drawing data) which is to be applied with the drawing in the server and which position of the Web page the resources of client are arranged as the layout data for client to the browsing client unit 91.

The drawing unit 45 draws the screen which is to be configured in the server based on the layout data for server. Next, the result is transmitted as the server drawing data to the browsing client unit 91.

Next, a flow of a specific example of the present disclosure will be described while exemplifying the case of browsing the Web page illustrated in FIG. 4.

First, the user inputs a URL (in the example, http://www.example.com/index.html) to the URL entry unit of the Web browser on the browsing client unit 91. The input URL is notified to the URL transmission unit 35 of the browsing client unit 91, and the URL transmission unit 35 transmits the URL to the browsing server unit 93. The request transmission unit of the browsing server unit 93 produces the HTTP request and transmits the HTTP request to the Web server 96 in order to acquire the resources associated with the received URL. The Web server 96 returns the HTML file illustrated in FIG. 5 as the HTTP response to the browsing server unit 93.

Figure 16:
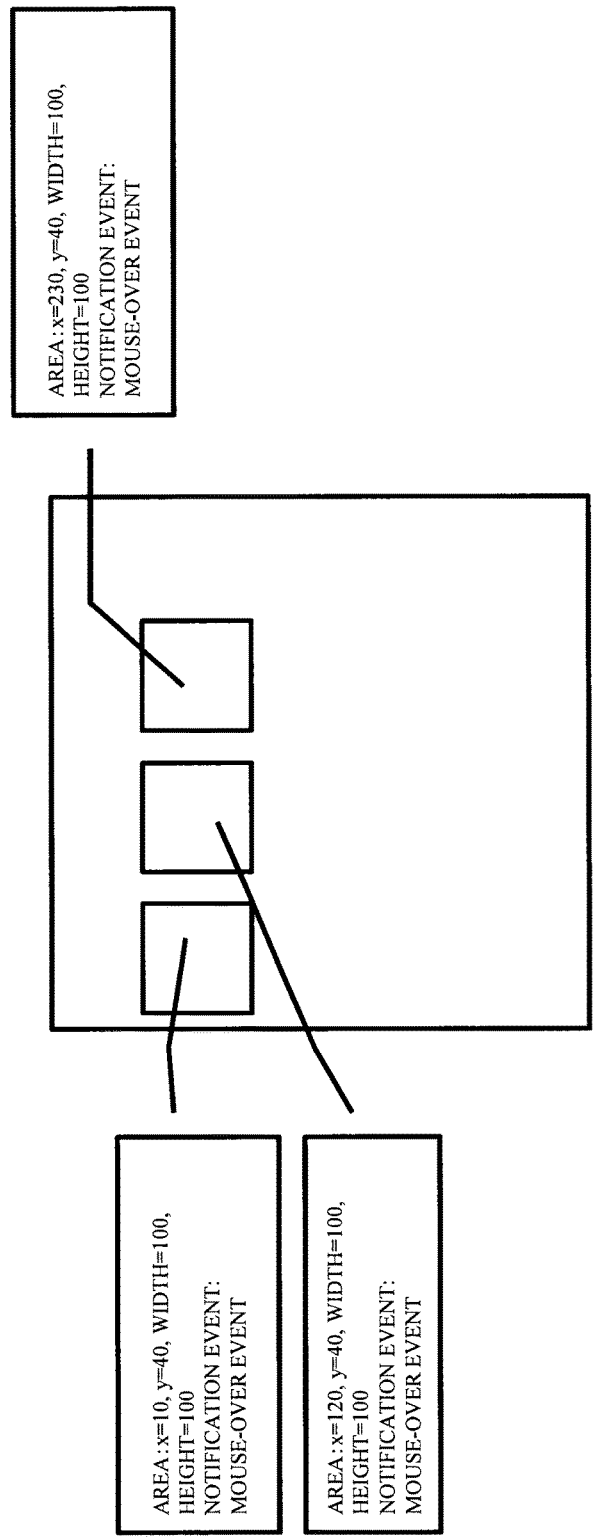
FIG. 16 illustrates a setting example of manipulation event filter setting.

The response reception unit 42 of the browsing server unit 93 extracts the HTML file from the HTTP response received from the Web server 96, stores the HTML file in the resources storage unit 21, and transmits the HTML file to the HTML analysis unit 43. The HTML analysis unit 43 analyzes the received HTML file. Next, the HTML analysis unit configures the DOM tree and stores the DOM tree in the DOM tree storage unit 22. In addition, the HTML analysis unit requests the request transmission unit 41 to additionally acquire the http://www.example.com/1.jpg-3.jpg. In addition, the HTML analysis unit 43 extracts the to-be-notified manipulation event from the browsing client unit 91 and transmits the manipulation event as the manipulation event filter setting to the browsing client unit 91. In the example, if the mouse cursor touches the small image, the large image is switched to the touched image. Therefore, the manipulation event filter setting is illustrated as FIG. 16.

Figure 17:
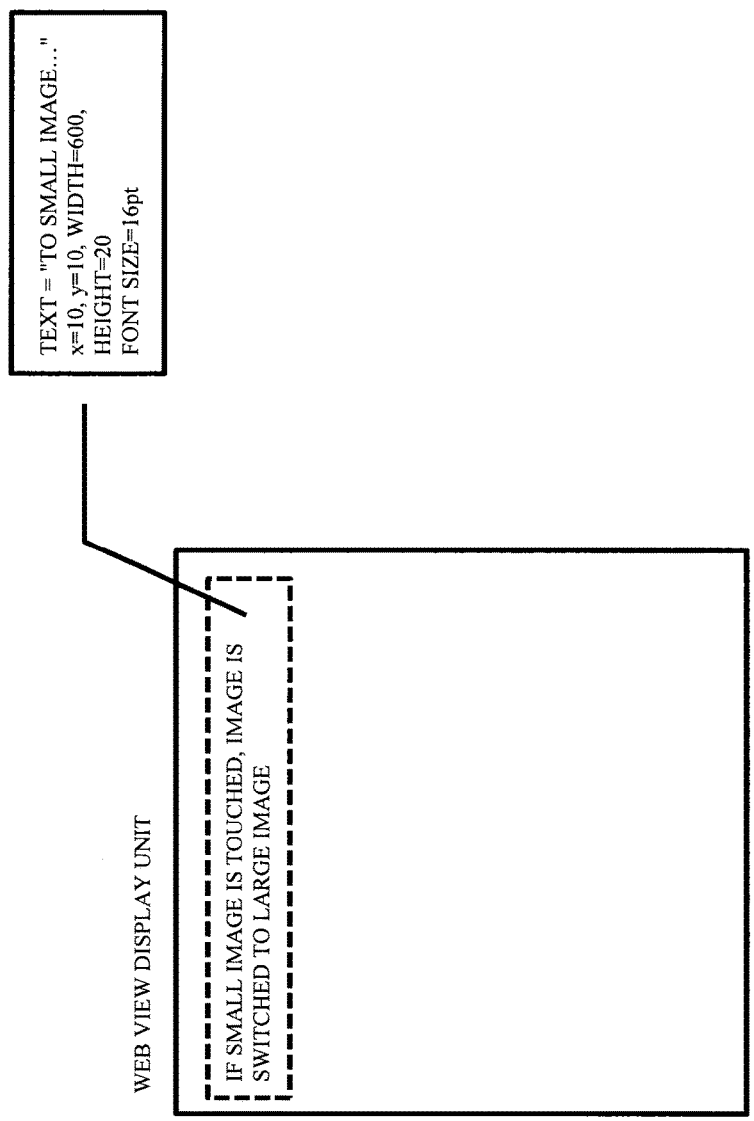
FIG. 17 illustrates an example of layout data which are output to a drawing unit of the browsing server unit 93.
Figure 18:
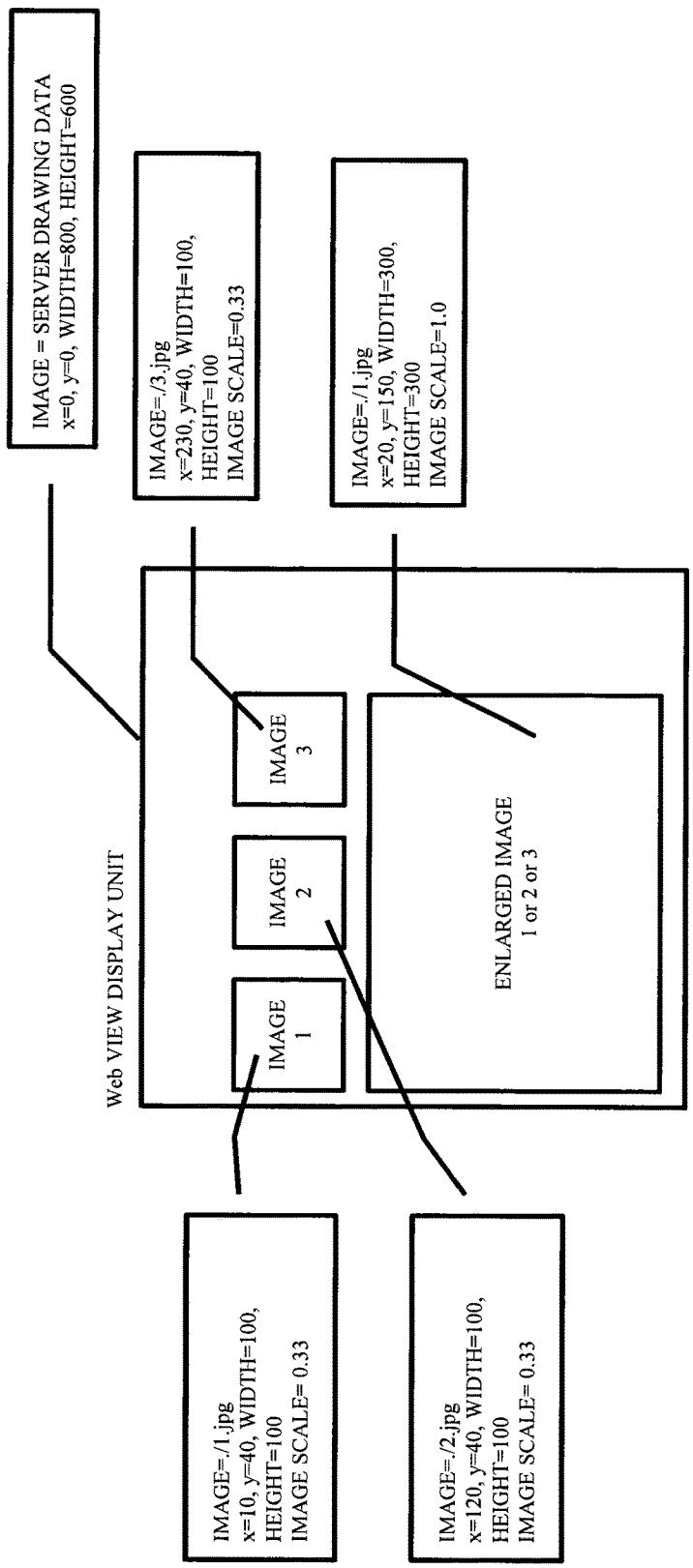
FIG. 18 illustrates layout data for client which are transmitted to the browsing client unit 91.

If the resources necessary for drawing the Web page are prepared, the layout unit 44 configures the screen of the Web page. Herein, the layout unit 44 decides which area is applied with the drawing in the browsing server unit 93 and which area is applied with the drawing in the browsing client unit 91. In the example, it is assumed that the drawing of the image file is performed in the browsing client unit 91, and the drawing of files other than the image file is performed in the browsing server unit 93. In the example, FIG. 17 illustrates the layout data output to the drawing unit 45 of the browsing server unit 93. In addition, FIG. 18 illustrates the layout data for client transmitted to the browsing client unit 91. In addition, the layout unit 44 transmits the image files of 1.jpg, 2.jpg and 3.jpg representing images 1, 2 and 3 as the resources for client to the browsing client unit 91. The layout data for server and the layout data for client are stored in the layout storage unit.

The drawing data of the browsing server unit 93 draws the screen based on the layout data of FIG. 17. Next, the obtained drawing data are transmitted as the server drawing data to the browsing client unit 91.

If the layout data for client, the server drawing data and the resources for client are received from the browsing server unit 93, the layout unit 33 of the browsing client unit 91 configures the screen of the Web page based on the layout data for client. Next, the drawing unit 34 of the browsing client unit 91 draws the screen of the Web page on the Webview display unit 972 based on the layout data. As a result, similarly to the normal Web browser 97, the screen of FIG. 18 is displayed on the Web page display unit 972.

After the screen drawing, if the user applies manipulation to the Webview screen, the manipulation event can be transferred to the manipulation event handler unit 31 of the browsing client unit 91. The manipulation event handler unit 31 transmits the manipulation event to the local manipulation event evaluation unit 32 or the manipulation event evaluation unit 46 of the browsing server unit 93 based on the manipulation event filter setting. In the example, according to the setting of FIG. 16, if the mouse cursor touches the small screen, the mouse-over event is transmitted to the browsing server unit 93. Herein, it is assumed that the user touches an area of the image 2 in the central portion.

The manipulation event evaluation unit 46 of the browsing server unit 93 specifies the corresponding HTML element from the coordinates where a mouse-over event occurs with reference to the layout data stored in the layout data storage unit 23. Next, the manipulation event evaluation unit executes the event process associated with the element. In the example, the event evaluation unit 46 specifies an IMG element representing an image 2 as the HTML element corresponding to the manipulation event and requests the script evaluation unit 47 to execute a JavaScript (registered trademark) function setPicture ('./2.jpg'). The script evaluation unit 47 executes the setPicture ('./2.jpg'). Next, the script evaluation unit instructs the HTML analysis unit 43 to rewrite the DOM tree so as to set the URL of the large image in the lower portion to "./2.jpg". The HTML analysis unit 43 updates the DOM tree based on the instruction of the script evaluation unit 47 and requests the layout unit 44 to layout.

Figure 19:
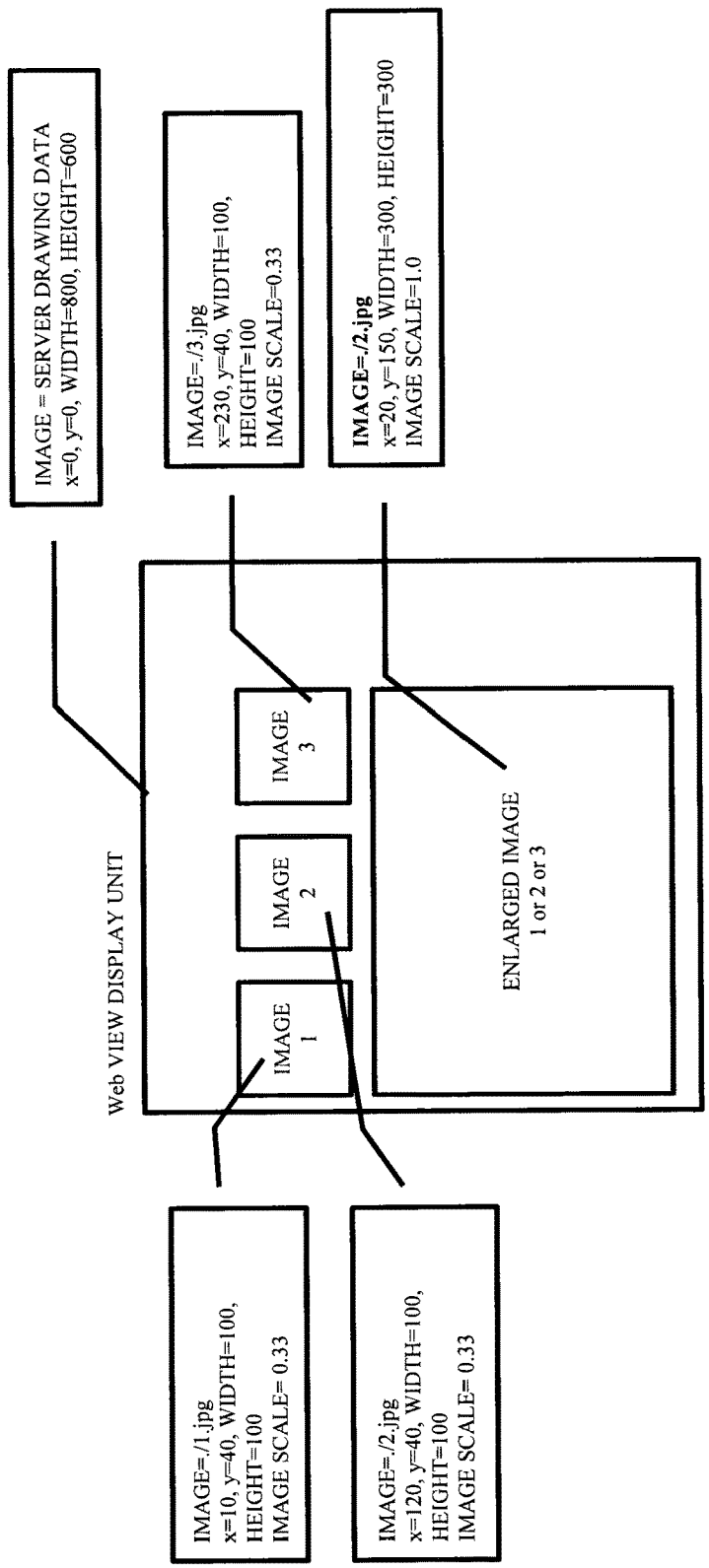
FIG. 19 illustrates a display example of a Web page display unit 972 in a case where a mouse-over event occurs.

The layout unit 44 updates the layout according to the updated DOM tree. In the example, in the layout data for client, a reference URL of an enlarged image in the lower portion is changed (FIG. 19). Next, the updated layout data for client are notified to the browsing client unit 91. At this time, since there is no change in the server drawing data and the resources for client, the server drawing data and the resources for client are not transmitted to the browsing client unit 91 again. In this manner, in the present disclosure, by transmitting only the changed data to the browsing client unit 91, the communication data amount for the screen updating involved in the event manipulation is reduced.

If the browsing client unit 91 receives the updated layout data for client, the layout unit 33 produces the layout data with reference to the server drawing data and the resources for client which are already received. Next, as illustrated in FIG. 19, the drawing unit 34 draws the screen where the enlarged image in the lower portion of the Webview screen is changed into "./2.jpg".

The method of extension of the components according to the present disclosure will be individually described.

In the above-described embodiment, at the time of starting the browsing in the user terminal, the user terminal sends an inquiry about the neighboring browsing server unit 93 to the management server 92. However, it is considered that during the browsing of the browser, the user terminal moves, and the neighboring browsing server unit 93 is changed. Therefore, in the present disclosure, a function of changing the browsing server unit 93 according to the movement of the user terminal during the browsing of the browser may be provided.

For example, the browsing client unit 91 of the user terminal periodically acquires the current position from the GPS and transmits the position information (longitude and latitude) to the management server 92 to send an inquiry about the current neighboring browsing server unit 93. As a result of the inquiry to the management server 92, if a browsing server unit 93 other than the current connected browsing server unit 93 is introduced, the browsing client unit 91 switches the connection destination to the newly introduced browsing server unit 93. As the method of switching the connection destination at this time, any one of the following methods can be performed.

Method 1 of Switching Connection Destination: Browsing from a current page in the browsing server unit 93 of the switching destination. Namely, the browsing client unit 91 instructs the current connected browsing server unit 93 to transmit the browsing state (DOM tree, layout data, resources and the like) of the browsing page to the browsing server unit 93 of the switching destination. If the transmission of the page browsing state from the browsing server unit 93 of the current connection destination to the browsing server unit 93 of the switching destination is finished, the browsing client unit 91 ends connection to the browsing server unit 93 of the current connection destination. Next, the browsing client unit is connected to the browsing server unit 93 of the switching destination.

Method 2 of Switching Connection Destination: Browsing from a new page in the browsing server unit 93 of the switching destination. Namely, the browsing client unit notifies a message indicating a desire to switch the browsing server unit 93 to the server of the current connection destination. After that, if the browsing server unit 93 of the current connection destination senses a trigger event of transition to a new page such as reception of a URL or clicking on a link from the browsing client unit 91, the browsing server unit notifies starting of the transition to the new page or the URL of the page to the browsing client unit 91. If the browsing client unit 91 receives the notification, the browsing client unit ends the connection to the browsing server unit 93 of the current connection destination. Next, the browsing client unit is connected to the browsing server unit 93 of the switching destination. Next, the browsing client unit transmits the notified URL of the new page to the browsing server unit 93 of the switching destination.

In the latter method of switching connection destination, since a smaller amount of information is transmitted and received between the browsing server units 93 than that in the former method, there is an advantage in that switching can be performed at a high speed.

In the above-described embodiment, it is configured that, if the browsing client unit 91 sends an inquiry to the management server 92, the management server 92 sends a reply with the neighboring browsing server unit 93 as the result thereof. At this time, the method of selecting the browsing server unit 93 in the management server 92 can be extended so as to achieve load balance between the browsing server units 93. For example, the following units may be provided. In addition, the number of simultaneously connected browsing client units 91, the CPU use rate and memory use amount of the browsing server unit 93 and the like are considered to be as indicators of measurement of the load of the browsing server unit 93.

Method 1 of Selecting Browsing Server Unit 93: Setting an upper limit of the load of the browsing server unit 93. If the management server 92 receives the inquiry from the browsing client unit 91, first, the management server sends an inquiry about the current loads to the browsing server units 93 in the order from the browsing server unit 93 nearest to the browsing client unit 91. If the load of a browsing server unit 93 is equal to or larger than the upper limit, the management server sends an inquiry about the current load to the next nearest browsing server unit 93. The process is repeated until the browsing server unit 93 of which load is smaller than the upper limit setting value is found. Next, if the browsing server unit 93 of which load is smaller than the upper limit setting value is found, the management server sends a reply with the value to the browsing client unit 91.

Method 2 of Selecting Browsing Server Unit 93: Setting an upper limit of nearness between the browsing client unit 91 and the browsing server unit 93. Herein, as indicators of measurement of nearness, there is a physical distance or an expected transmission delay time. If the management server 92 receives the inquiry from the browsing client unit 91, the management server sends an inquiry about the current loads to the browsing server units 93 of which nearness to the browsing client unit 91 is smaller than the upper limit. Next, the management server sends a reply with the browsing server unit 93 of which the load is lowest as the result of the inquiry to the browsing client unit 91.

In the above-described example, the management server 92 sends an inquiry about the load of each browsing server units 93 by taking the reception of the inquiry about the browsing server unit 93 of the connection destination from the browsing client unit 91 as a trigger (on-demand load inquiry). In contrast, the management server 92 periodically sends an inquiry about the load of the browsing server unit 93 in advance, and when the management server receives the inquiry from the browsing client unit 91, the management server can select the browsing server unit 93 by using the latest result among the periodical load inquiries up to now (periodical load inquiries). The accuracy of load of the case of the periodical load inquiry is lower than that of the case of the on-demand load inquiry. On the other hand, since the connection destination can be immediately selected without inquiring to the browsing server unit 93 with respect to the inquiry from the browsing client unit 91, the time taken to send the replay with the browsing server unit 93 of the connection destination to the browsing client unit 91 can be reduced.

In the present disclosure, as described above, the resources which are drawn in the browsing server unit 93 and the resources which are drawn in the browsing client unit 91 can be smoothly selected. The selection can be performed based on the hardware configuration of the user terminal.

For example, the drawing of the moving image file is exemplified. Nowadays, due to the increasing demands for moving image browsing, in many cases, a hardware decoder for moving image files is installed in even a relatively inexpensive user terminal. In these cases, although the moving image file in an encoded format is transmitted to the browsing client unit 91, bottleneck does not occur in the decoding process on the user terminal. Therefore, as extension of the present disclosure, a hardware configuration checking unit may be added to the browsing client unit 91 of FIG. 14. For example, at the time of starting the browsing client unit, the hardware configuration checking unit checks CPU performance of the user terminal or the presence or absence of a hardware decoder. Next, when the browsing client unit 91 newly accesses the browsing server unit 93 to start browsing, the hardware configuration checking unit notifies the checked hardware configuration of the user terminal to the layout unit 44 of the browsing server unit 93. Next, in a case where the layout unit 44 of the browsing server unit 93 transmits the Web page including the moving image to the layout data storage unit 22 of the browsing client unit 91 which is equipped with a hardware decoder or of which CPU performance is high, the layout unit performs the followings. Namely, the following data are transmitted to the layout data storage unit 23 of the browsing client unit 91.

Server drawing data where the drawing area of the moving image is emptied,

Un-decoded moving image file as the resources for client, and

Layout data for client instructing the drawing area of the moving image decoded on the user terminal.

Then, the drawing unit 34 of the browsing client unit 91 decodes the moving image file received as the resources for client and inserts the image obtained as the result of the decoding into the drawing area of the moving image instructed in the layout for client.

On the contrary, in a case where a hardware decoder is not installed in the user terminal and the CPU performance is low, the browsing server unit 93 decodes the moving image. Next, the browsing server unit reduces the resolution or the frame rate accordance the CPU performance of the user terminal and transmits the decoded screen as the server drawing data to the layout unit 33 of the browsing client unit 91.

Figure 20:
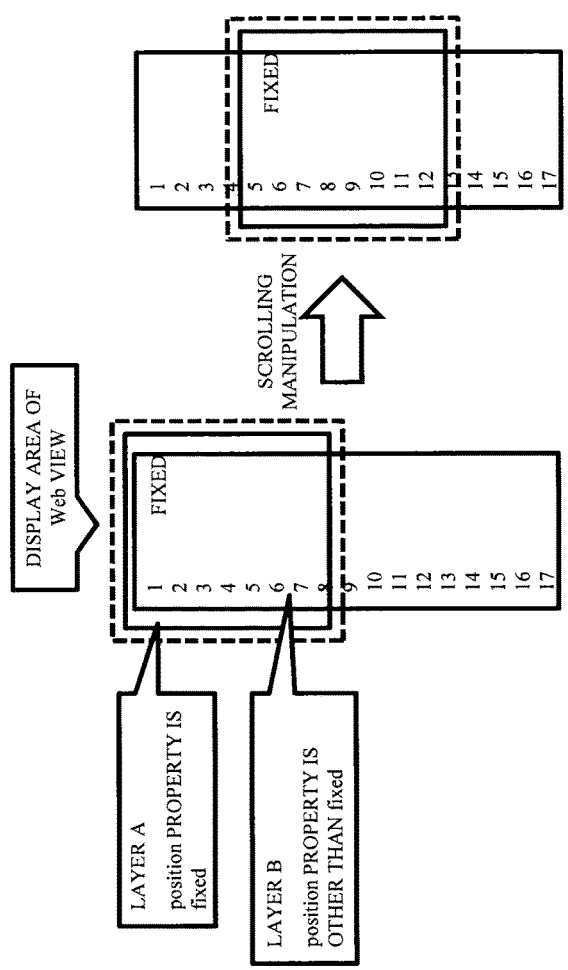
FIG. 20 illustrates an example of a display area of a Webview in a case where a screen of a Web page configured by the browsing server unit 93 is divided into a plurality of layers.

The server drawing data output from the browsing server unit 93 are not necessarily transmitted as one image, but as illustrated in FIG. 20, the browsing server unit 93 may divide the screen of the constituting Web page into multiple layers and transmit server drawing data for each layer. For example, in CSS which is the specification of an HTML style sheet, there is a position property (for example, refer to Non-Patent Literature 5) as a property about arrangement of HTML components. Therefore, as a value of the position property, "fixed" can be designated so to fix the display position on the Webview although the Webview screen scrolls. FIG. 20 illustrates a display example of the Webview in a case where the position property is designated with "fixed". As illustrated in FIG. 20, if the Webview scrolls in the downward direction, in the layer B where the position property is other than "fixed", the lower content is displayed in accordance with the scrolling. However, in the layer A where the position is "fixed", the same content (in the example of FIG. 20, character line "fixed" in the upper right portion) is constantly displayed without depending on the scroll position.

Figure 21:
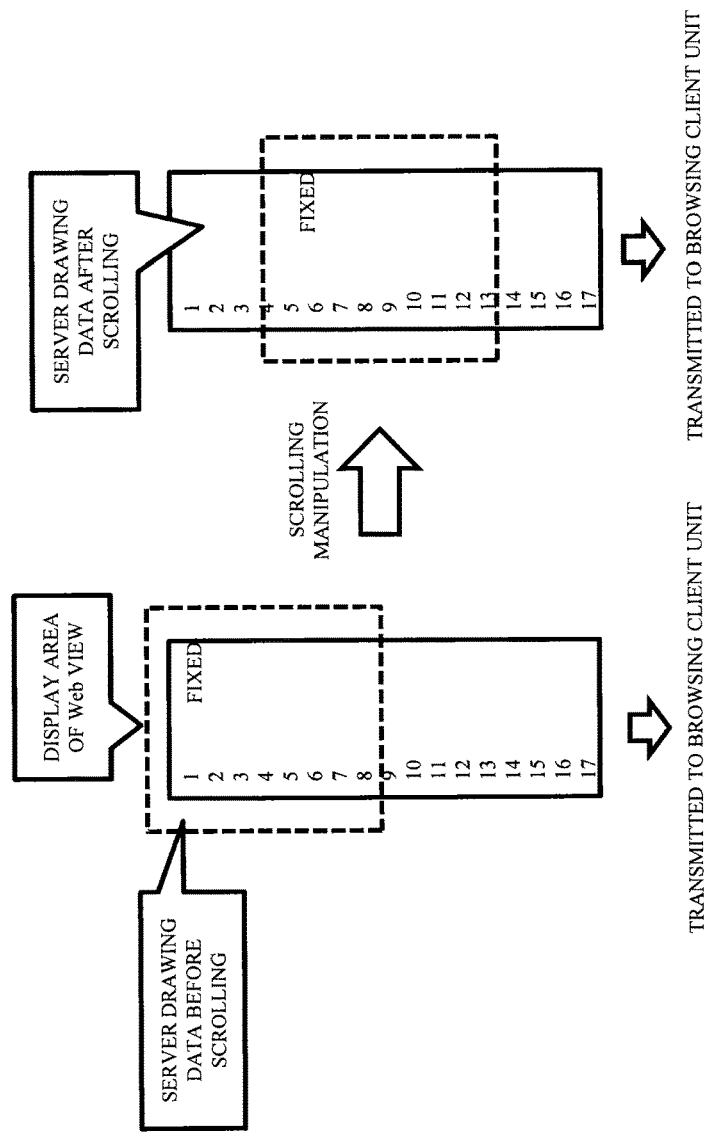
FIG. 21 illustrates an example of a change of a display area of a Webview at the time of scrolling.
Figure 22:
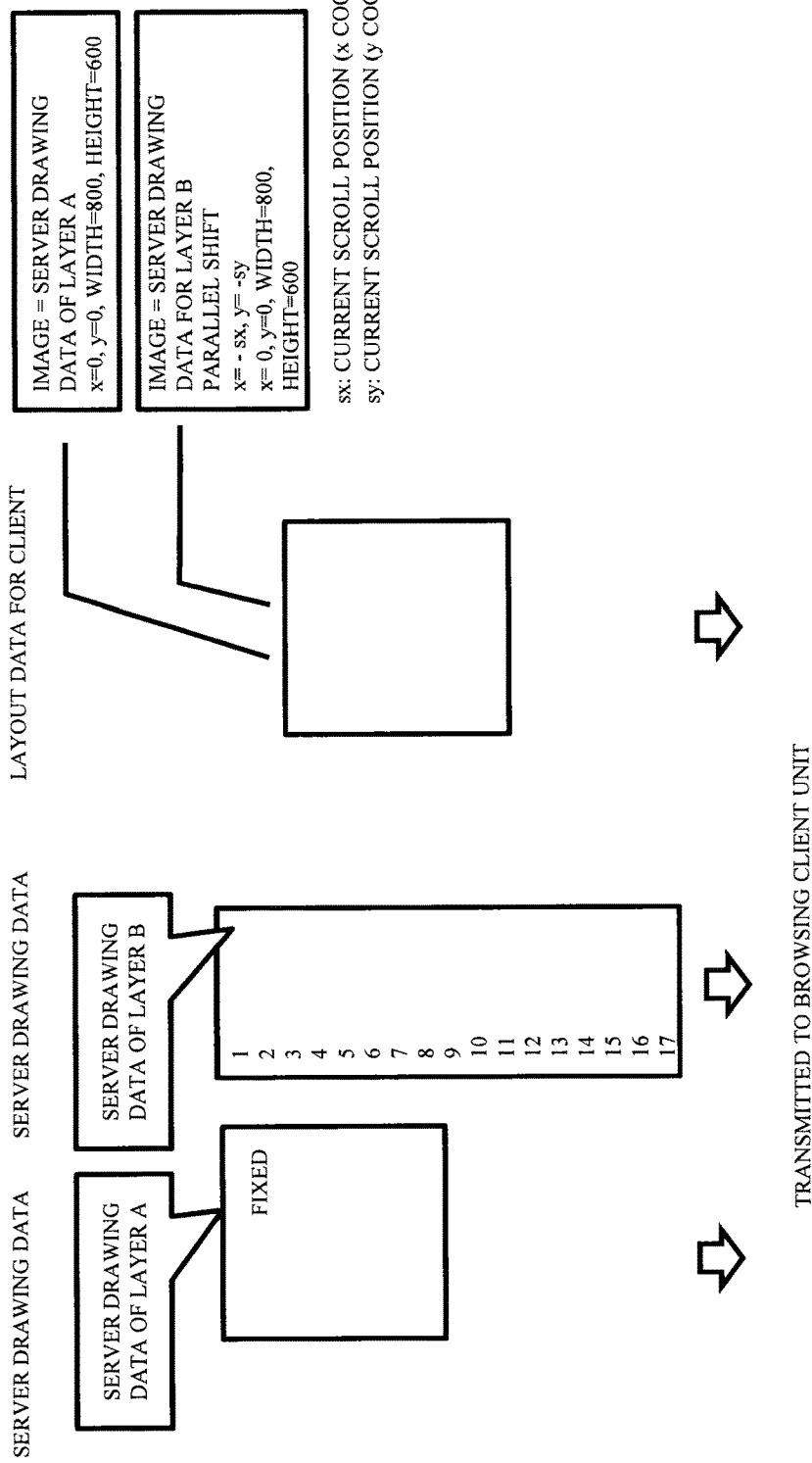
FIG. 22 illustrates an example of layer division of a component designated with "fixed" and the other components.

It is assumed that, in the example of FIG. 20, the HTML component (layer A) of which position property is designated with "fixed" and other components (layer B) are drawn as one image and the image is transmitted as the server drawing data to the browsing client unit 91. In this case, every time scrolling manipulation occurs, as illustrated in FIG. 21, since the position of the character line "fixed" in the server drawing data is changed, in the layout unit 44/drawing unit 45 of the browsing server unit 93, there is a need to produce the server drawing data again and transmit the server drawing data to the browsing client unit 91. Therefore, in the present disclosure, as illustrated in FIG. 22, the layout unit 44 of the browsing server unit 93 produces the layout data for server by dividing the components designated with "fixed" and other components by layer, and in the drawing unit 45 draws the image for each layer and sends the drawing result of each layer as server drawing data to the browsing client unit 91. In addition, the layout unit 44 of the browsing server unit 93 sends the layout data for client representing the position relationship of the layers to the browsing client unit 91. In the example of FIG. 20, FIG. 22 illustrates server drawing data and layout data for client in the case of separately transmitting the server drawing data for each layer. As illustrated in FIG. 22, with respect to the layer A and the layer B, server drawing data are produced as different images. In addition, by the layout data for client, the layer B is allowed to be parallel shifted in accordance with a scroll position so that the display content of the layer B is changed in accordance with the scroll position (in FIG. 22, parallel shift x=−sx, y=−sy), and therefore, although scrolling occurs due to the user manipulation, without receiving data newly from the browsing server unit 93, it is possible to cope with the scrolling by using only the layout data for client and the server drawing data which are already received in the browsing client unit 91. As a result, the communication amount between the browsing client unit 91 and the browsing server unit 93 can be reduced, and the response time during the scrolling can be shortened.

In addition, the management server 92 can be applied to a thin client which transmits a screen configured in a server with respect to the manipulation event to the user terminal side, a technique of converting a Web page into a lightweighted format and a method proposed by Orito in the related art.

(Second Embodiment)

There is a case where one user desires to simultaneously utilize a Web browser service by using multiple terminals or a case where multiple users desire to simultaneously utilize a common Web browser service. For example, this is a case where a Web site is displayed on a large screen, a case where a screen for display and a screen for manipulation are displayed on individual terminal, or a case where a user together with remote friends or family is viewing a Web site. In the embodiment, for coping with these cases, one browsing server unit 93 and multiple browsing client units 91 are allowed to cooperate with each other.

With the content, in an aspect where a function of a Web browsing program (generally, a Web browser) is divided between a server program and a client program and a Web browsing service is implemented by allowing a browser process generated by executing the server program in units of a user or a terminal on a server and a client program operating on the terminal to cooperate with each other, when the user utilizes the Web browser service, the browsing or the manipulation of the Web browser service is shared by allowing the browser process on the browsing server unit 93 and the browsing client unit 91 operating on the other user terminal to cooperate with each other.

Figure 23:
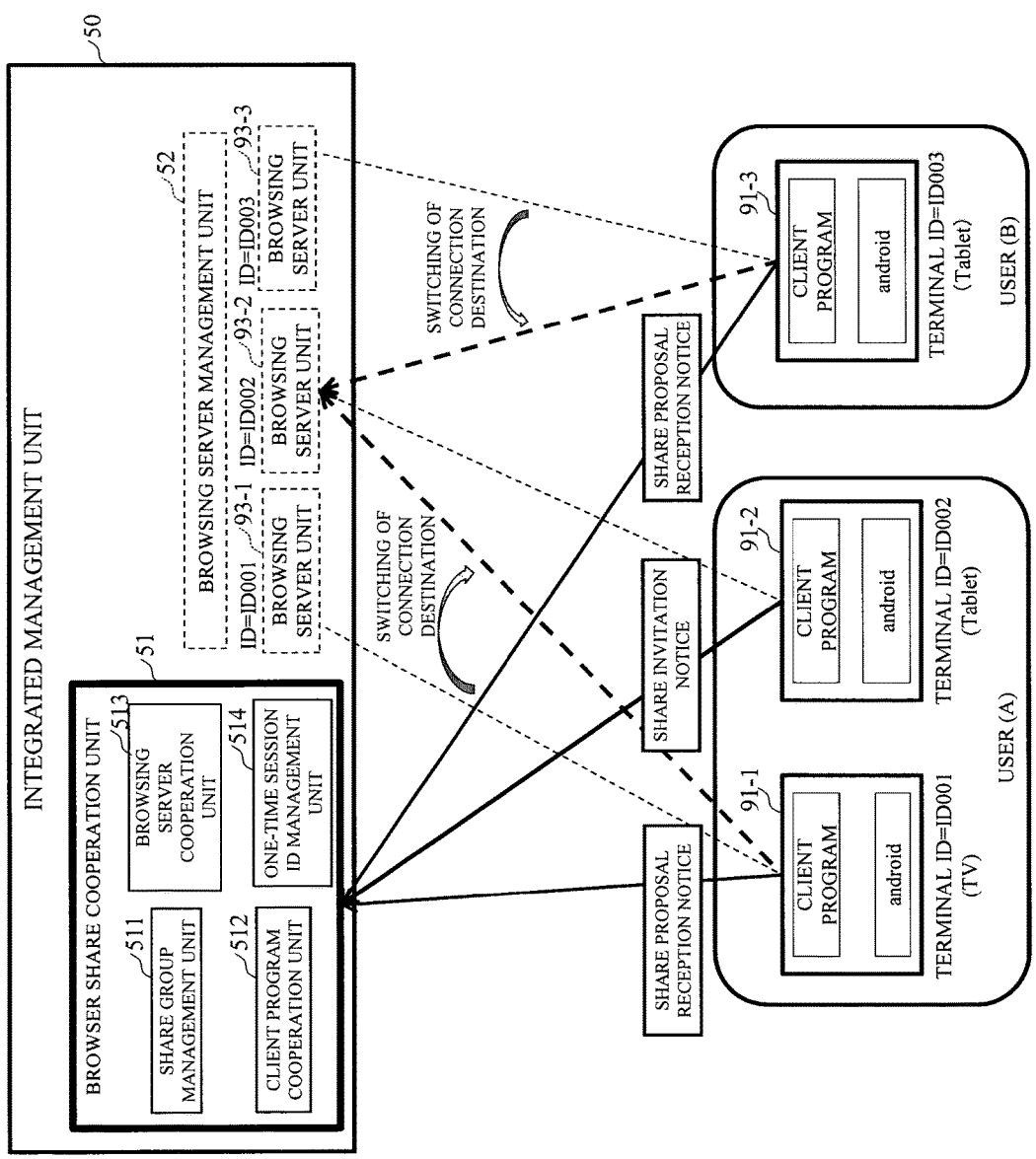
FIG. 23 illustrates an example of a configuration of a Web browsing system according to a second embodiment.

FIG. 23 illustrates an example of a Web browsing system according to the embodiment. In the Web browsing system according to the embodiment, an integrated management unit 50 is configured to include multiple browsing server units 93-1, 93-2 and 93-3, a browsing server management unit 52 and a browser share cooperation unit 51. Each of the browsing server units 93-1, 93-2 and 93-3 executes each function of the browsing server unit 93 described in the first embodiment. The browsing server management unit 52 manages each of the browsing server units 93-1, 93-2 and 93-3. The browser share cooperation unit 51 manages information of share invitation notice or share proposal reception notice from the user terminal and associates the browsing server units 93-1, 93-2 and 93-3 with multiple client programs.

Accordingly, the Web browsing system according to the embodiment allows the browsing or the manipulation of the Web browser to be shared in the multiple browsing client units 91. The manipulation of which sharing is allowed is, for example, scrolling manipulation, pointing within a Web site or a conversion of the Web site. For example, if the user terminal 91-2 scrolls, the screens of the user terminals 91-1 and 91-3 also move in interlock with the scrolling.

In the Web browser service which is applied to the disclosure according to the embodiment, the browser share cooperation unit 51 is configured to include a share group management unit 511, a client program cooperation unit 512, a browsing server cooperation unit 513 and a one-time session ID management unit 514. The browsing server management unit 52 manages the user and the browsing client unit 91 in a correspondence manner on the premise of some user authentication or terminal authentication. As the information managed as user, any information which can uniquely specify the browsing client unit 91 may be used, and thus, a user ID by user authentication, a serial number or a MAC address of a terminal device by terminal authentication, and the like may be used. In the cooperation process of the browser process of the browsing server unit 93 and the client program of the browsing client unit 91, it is checked by using a session ID temporarily extracted by the browsing server unit 93 or the browsing client unit 91 whether or not the using user is coincident with the browsing client unit 91 which is managed in the browsing server unit 93. Accordingly, unauthorized access from other users is excluded. Therefore, in the client program and the browser process, the session ID is maintained. Hereinafter, with respect to the user's operation, it is intended to process the client program which is executed by the browsing client unit 91 on the user terminal.

The share group management unit 511 manages multiple users which can be selected as share counterparts for each user registered in advance as a share group. Herein, the registration of the share counterpart list of each user may be stored by registration manipulation of the user or may be stored by cooperating with other systems. Next, the share inviting user terminal 91-2 which invites share acquires the share group from the integrated management unit 50, sets the share counterpart, the share manipulation authority, and the associated information, and notifies a share invitation request to the server.

The share inviting user terminal 91-2 can limit the manipulation content which is given to the share proposal receiving user terminals 91-1 and 91-3 by setting the share manipulation authority at the time of inviting share. As a specific example of the manipulation authority, all manipulation contents of a general Web browser such as no manipulation (only browsing), scroll, click, Web page transition (reload, return back), character input, bookmark registration, all manipulations are used as an object, and the authority may be set in a combination of the manipulation contents. In addition, by setting different share manipulation authorities to the share proposal receiving user terminals 91-1 and 91-3, finer share can be set. In addition, in a case where the same user performs sharing by using different user terminals 91-1 and 91-2, the setting of the share manipulation authority can be simplified by performing the setting such as allowing all manipulations in advance by the share proposal receiving user or terminal.

Figure 24:
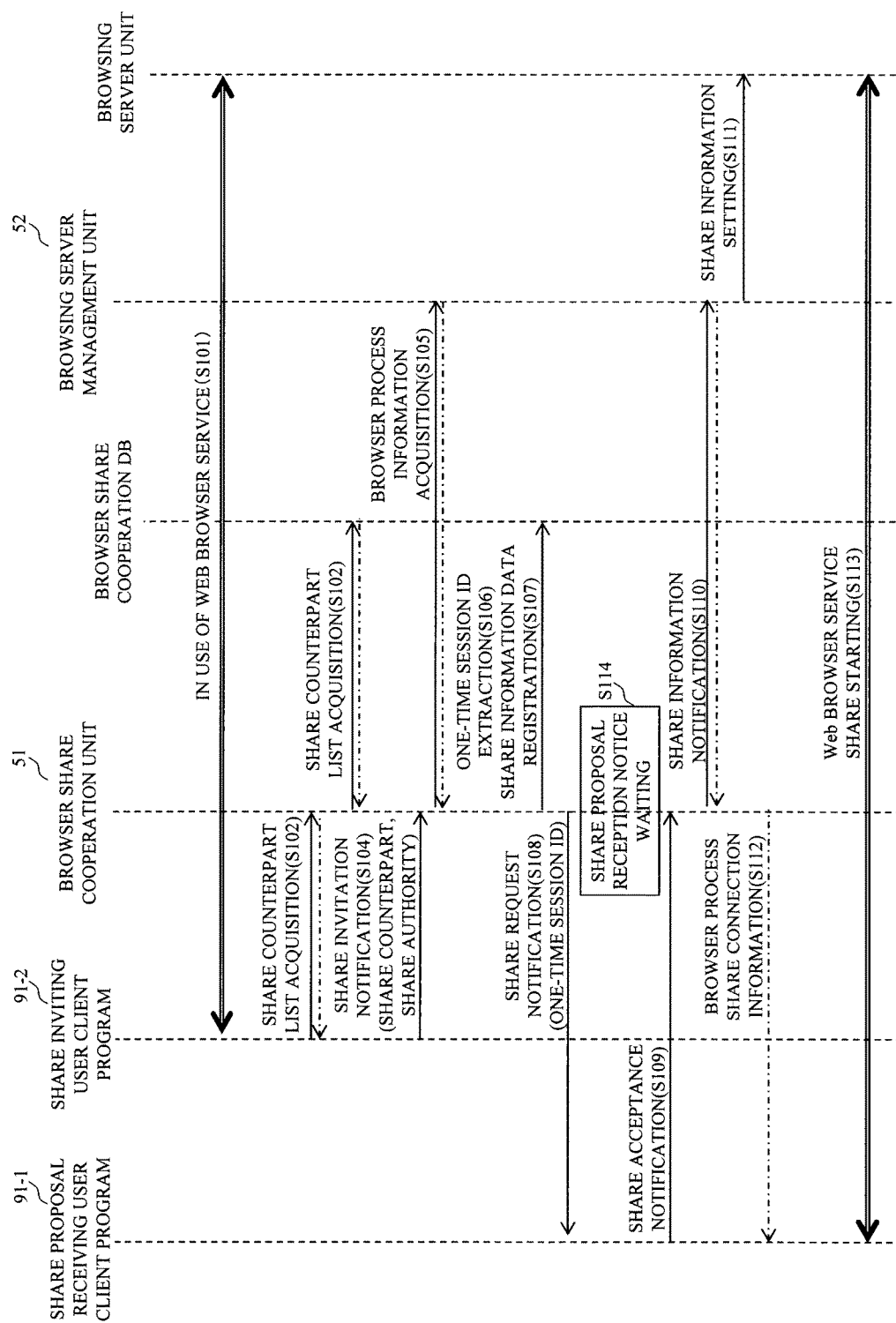
FIG. 24 illustrates a sequence diagram of a Web browsing method according to the second embodiment.

FIG. 24 is a sequence diagram of a Web browsing method according to the embodiment.

Step S101 is an in-use period (session ID) for a Web browser service. The share inviting user terminal 91-2 used by the user (A) uses a Web browser program of which function is divided between a server program and a client program. At this time, the session ID which is extracted in advance is maintained in the browsing client units 91-1, 91-2 and 91-3 and the browsing servers 93-1, 93-2 and 93-3.

Step S102 is a share counterpart list acquisition procedure. In a case where the user (A) which uses the user terminal 91-2 increases the user terminal, the share inviting user terminal 91-2 acquires the share counterpart list from the browser share cooperation unit 51. The share counterpart list for each user is indicated by an example of a case where the share counterpart list is stored in the browser share cooperation DB in advance.

Step S104 is a share invitation notification procedure. The share inviting user terminal 91-2 selects the share counterpart and the share authority from the acquired share counterpart list and sends a share invitation notice to the browser share cooperation unit 51. At this time, the acquired share counterpart list is displayed on the screen of the share inviting user terminal 91-2. For example, "TV" indicating the user terminal 91-1 and "B" indicating the user terminal 91-3 are displayed. If the user (A) selects "TV", the share inviting user terminal 91-2 transmits the share invitation notice instructing the share counterpart and the share authority to the browser share cooperation unit 51.

Step S105 is a browser process information acquisition procedure. The browser share cooperation unit 51 acquires the browser process information of the share inviting user terminal 91-2 from the browsing server management unit 52.

The browser process information is information of the browsing client unit 91 utilizing the browsing server unit 93 and is, for example, the ID=ID002 of the share inviting user terminal 91-2.

Steps S106 and S107 are a share information notification procedure. When the browser share cooperation unit 51 receives the share invitation notice, the browser share cooperation unit extracts the one-time session ID from the one-time session ID management unit 514 (S106) and the browser share cooperation unit 51 registers corresponded the share inviting user terminal 91-2 and the share proposal receiving user terminal 91-1 in the browser share cooperation DB by using the browser process information and the share proposal receiving user ID associated with the share inviting user terminal 91-2, the one-time session ID and the like (S107). Herein, the browser process information is, for example, a share inviting user ID and a session ID. The browser process information is not limited to an ID, but a state of a browsing server unit, a server address, or a port number may be the browser process information. Herein, as the one-time session ID, any unique ID which does not overlap the others may be used, and a random value having a certain length, a hash value which is output in the state where the current time is added to a user ID or terminal information, and the like are considered.

Step S108 is a share request notification procedure. The browser share cooperation unit 51 sends a share request notice to the share proposal receiving user terminal 91-1 to notify the share inviting user and the one-time session ID. In addition, the one-time session ID may be acquired from the share proposal receiving user by sending an inquiry to the browser share cooperation unit 51. At the time of share request notification, without notifying the one-time session ID, the one-time session ID may be acquired from the share proposal receiving user terminal 91-1 by sending an inquiry to the browser share cooperation unit 51. The acceptance/rejection of the share proposal reception may include acceptance/rejection about a specific user or the scope of the share authority.

Step S114 is a share proposal reception notice waiting procedure. The browser share cooperation unit 51 waits for the share acceptance notice from the share proposal receiving user terminal 91-1 for a certain time interval. In a case where there is no share acceptance notice for a certain time interval, the browser share cooperation unit determines that the share is invalid and removes the share information data associated with the one-time session ID registered in the browser share cooperation DB to nullify the share.

Step S109 is a share acceptance notification procedure. If the share proposal receiving user terminal 91-1 which receives share proposal receives information of a share request by a periodical inquiry to the integrated management unit 50 or by the share request notice from the browser share cooperation unit 51, the share proposal receiving user terminal checks the share inviting user or the share authority, sets the acceptance/rejection of the share proposal reception, and notifies the share acceptance to the browser share cooperation unit 51 (S109). The information on the share request is, for example, a share inviting user name or a one-time session ID.

Step S110 is a share information notification procedure. The browser share cooperation unit 51 notifies share information (one-time session ID, share authority, and the like) to the browsing server management unit 52. At this time, when the browsing server cooperation unit 513 receives a share proposal reception notice, the browser share cooperation unit specifies the browsing server unit 93 of the share inviting user from the registration information associated with the one-time session ID and notifies the share manipulation authority, the one-time session ID and the like to the browsing server management unit 52.

Step S111 is a share information setting procedure. The browsing server management unit 52 sets the one-time session ID and the share authority with respect to the browsing server unit 93-2.

Step S112 is a browsing server share connection information transmission procedure. The browser share cooperation unit 51 notifies connection information of the browsing server unit 93-2 of the share inviting user terminal 91-2 to the share proposal receiving user terminal 91-1.

Step S113 is a Web browser service share starting procedure. The share proposal receiving user terminal 91-1 performs share connection to the browsing server unit 93-2 of the share inviting user terminal 91-2 by using the one-time session ID based on the notified connection information (server address, port number).

Accordingly, in the cooperation process of the share proposal receiving user terminal 91-1 cooperating with the client program operating on the terminal, the one-time session ID is allowed to be used, so that the share inviting user terminal 91-2 can share the in-use browsing server unit 93-2 with the share proposal receiving user 91-1.

After share is started, the share inviting user terminal 91-2 selects the share proposal receiving user terminal 91-1, so that the share can be ended or the authority can be changed. In addition, the share inviting user terminal 91-2 selects the share proposal receiving user, so that the share can be individually ended or the share to all the share proposal receiving users can be ended once. In addition, in a case where the share inviting user terminal 91-2 ends the use of the Web browser service, the share to all the share proposal receiving users is ended. Alternatively, the share proposal receiving user terminal 91-1 may be allowed to continuously use the Web browser service.

The functions of components included in the browser share cooperation unit 51 will be described again. However, if the same processes can be performed, the components are not necessarily limited to the following components.

Share group management unit 511: The share group management unit manages a sharable user list (authentication information, nickname, or the like) on a browser share cooperation DB based on the user authentication information. Therefore, the share group management unit sends a replay with the sharable user list of the share inviting user terminal 91-2 according to the request from the share inviting user terminal (client program) 91-2.

Browsing server cooperation unit 513: In cooperation with the browsing server management unit 52, the browsing server cooperation unit acquires browser process information (state, server address, port number and the like of the browsing server unit 93) and notifies share information (one-time session ID and share authority).

One-time session ID management unit 514: the one-time session ID management unit receives the share invitation notice and extracts the one-time session ID. The one-time session ID management unit registers the session ID of the share inviting user terminal 91-2 and the session IDs of the share proposal receiving user terminals 91-1 and 91-3 in the browser share cooperation DB in a correspondence manner.

Client program cooperation unit 512: the client program cooperation unit, in cooperation with the client program, receives the share invitation notice (share counterpart, share authority) from the share inviting user terminal 91-2. Next, the client program cooperation unit sends a share request notice to the share proposal receiving user terminals 91-1 and 91-3. After that, the client program cooperation unit waits for a share acceptance notice from a share proposal receiving user for a certain time interval. In a case where there is no share acceptance notice, the client program cooperation unit removes the share information data registered in the browser share cooperation DB and nullifies share. The client program cooperation unit receives the share acceptance notice from the share proposal receiving user terminal 91-1. Next, the client program cooperation unit notifies connection information (server address, port number and the like) of the browsing server unit 93 which is to be in share connection to the share proposal receiving user.

According to the disclosure relevant to the embodiment, in an aspect of the Web browser which is implemented by dividing the functions between the server program and the client program, multiple client programs are connected to the same browsing server unit 93 based on the set manipulation authority, so that the browsing or manipulation of the Web browser can be shared by multiple user terminals. Therefore, any one user can share the browsing or manipulation of the Web browser by using multiple terminals at the same position, or multiple users can share the browsing or manipulation of the Web browser at different positions.

In addition, by setting the share manipulation authority, the browsing or manipulation which is to be shared can be finely set. By associating the client program, the browser process of which function is divided between the server process and the client can be simultaneously connected by multiple users or terminals. By associating the users by using the one-time session IDs and by notifying the connection destination information without publishing the session IDs of the two sharing users, the connection destination information of the server process which becomes share destination can be safely notified with respect to the client program.

In addition, in the embodiment, an example where the browsing server unit 93 operates as one device is described, but the browsing server unit 93 may be configured by using a plurality of devices.

(Third Embodiment)

An overall diagram of the Web browsing system according to the embodiment is illustrated in FIG. 12. Similarly to the Web browsing systems according to the first and second embodiments, in the disclosure according to the embodiment, one or more browsing client units 91, a management server unit 92 and one or more browsing server units 93 are connected to a network 94. Next, the browsing server unit 93 is connected to one or more web servers 96 via the Internet 95. Herein, the browsing client unit 91 is executed on the user terminal where the user performs browsing or manipulation. In addition, among the functions of the Web browser, the browsing client unit 91 mainly undertakes presentation of a screen as a Web browser and reception of user manipulation. Herein, for the description, it is assumed that the browsing client unit 91 supplies the Web browser screen of FIG. 2.

Figure 25:
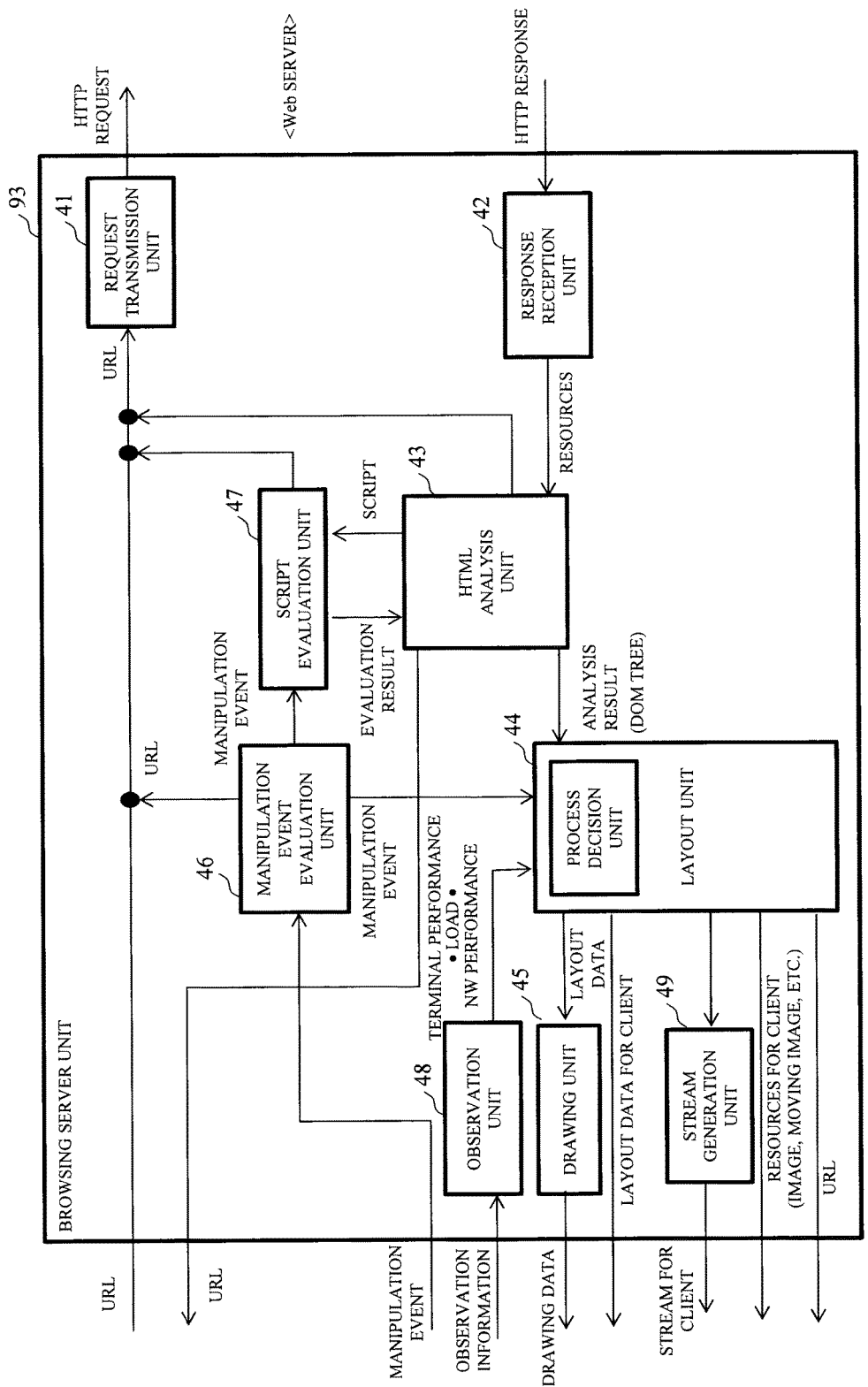
FIG. 25 illustrates an example of a configuration of a browsing server unit 93 according to a third embodiment.
Figure 26:
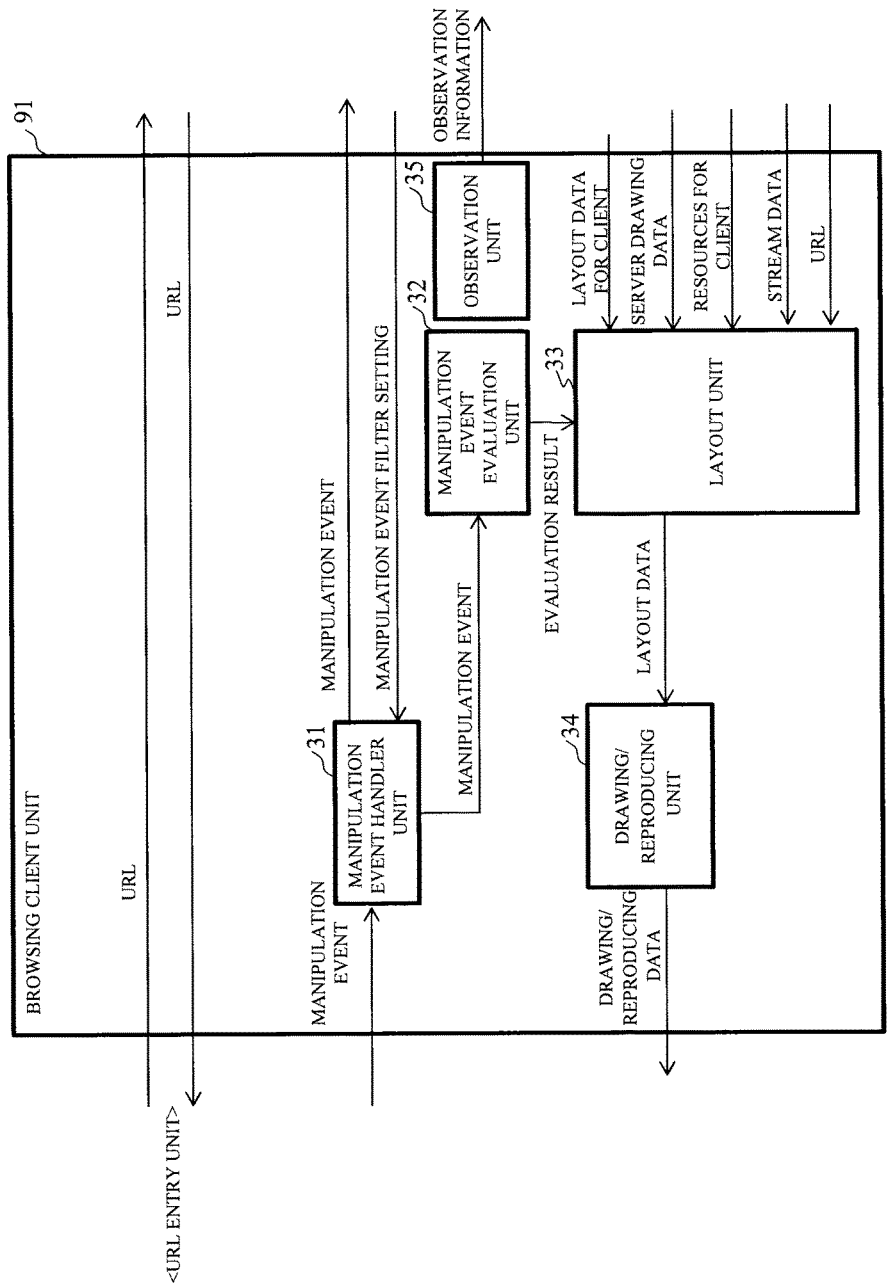
FIG. 26 illustrates an example of a configuration of a browsing client unit 91 according to the third embodiment.

FIGS. 25 and 26 illustrate examples of the browsing server unit 93 and the browsing client unit 91 according tothe embodiment. The browsing server unit 93 according to the embodiment includes an observation unit 48, a process decision unit (not illustrated) and a stream generation unit 49. The layout unit 44 includes a process decision unit (not illustrated). In the embodiment, in the browsing server unit selection procedure existing before the notification procedure, the observation unit 48, the process decision unit (not illustrated) and the stream generation unit 49 are executed. The browsing client unit includes an observation unit 35.

The observation unit 48 transmits an observation request to the observation unit 35 of the browsing client unit 91. The observation unit 35 of the browsing client unit 91 reads out information of the browsing client unit 91 and the user terminal according to the observation request from the observation unit 48 and returns the read-out observation result to the observation unit 48 of the browsing server unit 93.

Herein, the observation request is a signal indicating a request for information required to calculate at least one of the communication environment, the load, and the performance of the browsing client unit 91. The communication environment of the browsing client unit 91 is, for example, an available network band of the browsing client unit 91, information of communication performance of the user terminal and an analysis result of the HTML structure. In the measurement of the information of the available network band and the communication performance of the user terminal, for example, an available band estimation technique (Non-Patent Literature 7) is used for the former, and a throughput measurement technique (Non-Patent Literature 8) is used for the latter. The load of the browsing client unit 91 is, for example, a CPU use rate and a memory use amount associated with a specific process and a CPU use rate and a memory use amount at a measurement time. The performance of the browsing client unit 91 is, for example, CPU specifications of the user terminal where the browsing client unit 91 is installed and information of an amount of an installed memory.

In addition, the information such as the terminal performance or the network band may estimate an event of a predetermined processing amount from a response time or an arrival delay time processed by the browsing client unit 91. In addition, in the figure, the observation unit 48 acquires the information of the performance of the user terminal or the network band as the observation information from the browsing client unit 91, but it may not be limited to the observation information of the browsing client unit 91. For example, at least a portion thereof may be acquired from the contract information. In this case, the information is acquired from a portion (not illustrated) which stores the contract information. In addition, at least a portion of the information of the performance of the user terminal or the network band may be acquired from a MAC address, VID, or the like. In this case, at least a portion of the information is acquired by acquiring the MAC address, the VID, or the like from a site (not illustrated) which processes the MAC address, the VID, or the like and comparing the MAC address, the VID, or the like with information from a portion (not illustrated) storing the information corresponding to information such as terminal performance or network band. In addition, the observation unit 48 may observe the processing amount of the browsing server unit 93.

An example of the operations of the Web browsing system according to the embodiment will be described.

Step S201: The layout unit 44 transmits only the URL to the user terminal and decides whether or not the browsing client unit 91 performs all of the drawing process, the stream reproducing process, and the file downloading process and the procedure proceeds to step S202 or S203.

Step S202: In a case where the browsing client unit 91 performs all the processes, the layout unit 44 transmits the URL to the browsing client unit 91. In this case, the layout unit 33 of the browsing client unit 91 performs the generation of the drawing data from the received URL, the stream reproducing process and the file downloading process.

Step S203: In a case where the browsing client unit 91 does not perform all the processes, the layout unit 44 divides the screen of the Web page into elements. The elements include, for example, elements which are to be processed as the stream data, elements which are to be in the drawing data, elements which are to transmit the layout data to the terminal, and elements which are to transmit the resource data to the browsing client unit 91. The layout unit 44 performs generation of stream data, generation of drawing data, generation of layout data, acquisition of resource data based on the decision of the layout unit 44 in step S201 and transmits these data to the browsing client unit 91. At this time, the stream generation unit 49 transmits the stream data. Next, the layout unit 33 of the browsing client unit 91 performs processes on each element of the screen of the Web page received from the browsing server unit 93. For example, the layout unit 33 performs reproducing of stream, display of drawing data, generation of drawing data from layout data and generation of drawing data from resource data. The drawing/reproducing unit 34 integrally displays these process results on the same screen.

In step S201, the layout unit 44 decides the process of the browsing server unit 93 based on at least some of the communication environment, the load and the performance of the browsing client unit 91 output by the observation unit 48. The layout unit 44 decides whether to transmit the URL without a change to the browsing client unit 91 or to allow a portion of the process associated with the display of the HTML content to be performed in the browsing server unit 93. In a case where a portion of the process associated with the display of the HTML content is performed by the browsing server unit 93, the content of the process of the browsing server unit 93 for each element of the HTML content can be selected. Herein, the element of the HTML content means each object such as images, moving images and sentences included in the Web page. The same process may be performed on the elements of a plurality of the HTML content.

During the decision of the process in the browsing server unit 93, the layout unit 44 estimates the processing time of the browsing client unit 91 based on at least one of the load and the performance of the browsing client unit 91. In a case where the processing time of the browsing client unit 91 is short, the layout unit 44 performs the process in the browsing server unit 93, and in a case where the load of the browsing client unit 91 is small, the layout unit does not perform the process in the browsing server unit 93. At this time, it is preferable that the load or the communication environment of the browsing server unit 93 be considered. More specifically, in a case where the load of the browsing server unit 93 reaches the threshold value, if the available band or the throughput reaches the threshold value, the process in the browsing server unit is not performed.

The decision of the process in the browsing server unit 93 may be performed, for example, by using the following indicators.

Whether or not the currently in-use network state exceeds or reaches a predetermined threshold value. The network state is, for example, a use rate among available communication amounts of the browsing client unit 91 and may be an average value or a peak value. Namely, it is whether or not the network state exceeds or reaches a threshold value, for example, whether or not the use rate exceeds or reaches 80%.

Whether or not the network state exceeds or reaches a predetermined threshold value in an average value or a peak value in a case where the browsing server unit 93 performs a portion of the process.

Whether or not the process load of the browsing server unit 93 exceeds or reaches a predetermined threshold value (for example, a load rate of 80%) in an average value or a peak value.

Whether or not the process load of the browsing server unit 93 exceeds or reaches a predetermined threshold value in an average value or a peak value in a case where browsing server unit 93 performs a portion of the process.

Whether or not the performance of the browsing client unit 91 is equal to or lower than a predetermined threshold value.

Whether or not the process load of the browsing client unit 91 exceeds or reaches a predetermined threshold value (for example, a load rate of 80%) in an average value or a peak value.

Whether or not the process load of the browsing client unit 91 exceeds or reaches a predetermined threshold value in an average value or a peak value in a case where the browsing server unit 93 does not perform a portion of the process.

Whether or not an amount of consumption of network band or a processing amount of the browsing server unit 93 is larger than a predetermined threshold value in a case where the browsing server unit 93 performs a portion of the process.

Whether or not the amount of consumption of network band or the processing amount of the browsing server unit 93 is larger than other content in a case where the browsing server unit 93 performs a portion of the process.

The decision of the process in the browsing server unit 93 may be performed based on any one of the indicators, several indicators, or statistical processes of a weighted average of all the indicators and the like. In addition, similarly to the related art, the layout unit 44 may decide the process in the browsing server unit 93 based on only the element of the HTML content.

The selection of the content of the process in the browsing server unit 93 is performed through one or more of generating the drawing data, generating the layout data, acquiring and providing the resource data and generating the stream data. With respect to an element of which the amount of consumption of the network band is smaller than a predetermined threshold value, of which the processing amount of the browsing server is larger than a predetermined threshold value, or which is larger than other elements of the Web page, the element other than the "drawing process and the stream reproducing process" may also be performed in the browsing client unit 91.

The stream generation unit 49 generates a stream according to the process in the browsing server unit 93 decided by the layout unit 44 and transmits the stream to the browsing client unit 91. The browsing client unit 91 appropriately performs drawing and reproducing of the stream data according to the data output by the browsing server unit.

In addition, the observation unit 48 may observe a load of a specific process performed by the browsing client unit 91 among the processes associated with the display of the HTML content or may observe the performance of the browsing client unit. The specific process is a process exerting the load to the browsing client unit 91 and is, for example, a drawing process or a stream reproducing process. The load observed by the observation unit 48 is, for example, a rate to the number of times of performing a specific process or the number of times of display of the HTML content, and an observed current value may be used, a statistical value such as an average may be used, and a predicted value based on the rate of increase or decrease or the like may be used.

In this case, it is preferable that the layout unit 44 decide based on the load of the browsing client unit 91 whether or not the browsing server unit 93 performs a portion of the process. For example, the layout unit 44 increases the process of the browsing server unit 93 with respect to the HTML content displayed on the browsing client unit 91 having a large load and decreases the process of the browsing server unit 93 with respect to the HTML content displayed on the browsing client unit 91 having a small load.

In this manner, in the disclosure according to the embodiment, the process in the browsing server unit 93 is decided based on the load or performance of the browsing client unit 91. Accordingly, in the disclosure according to the embodiment, since the balance between the load of the browsing server unit 93 and the load of the browsing client unit 91 can be preserved, the efficiency of the entire system can be improved.

In addition, the example where the function of deciding whether or not the browsing server unit 93 performs a portion of the process is included in the browsing server unit 93 is exemplified, but the function may be included in other components such as the management server 92 or the browsing client unit 91 of the Web browsing system. For example, the management server 92 may be configured to include the observation unit 48, and the browsing server unit 93 may decide a process decision unit (not illustrated).

For example, the management server 92 may be configured to include the observation unit 48 and the process decision unit (not illustrated) and may decide the browsing server unit 93 or decide the process of the browsing server unit 93 based on the information of the communication environment of the browsing client unit 91 observed by the observation unit 48. In this case, the management server 92 notifies the address of the browsing server unit 93 of the connection destination to the browsing client unit 91 and notifies the process which is to be processed in the browsing server unit 93 to the browsing server unit 93 of the connection destination. The notification of the process which is to be processed in the browsing server unit 93 may be performed from the browsing client unit 91 to the browsing server unit 93.

(Fourth Embodiment)

In addition, in the above-described embodiments, the Web browser is assumed as a specific application, but the application of the present disclosure is not necessarily limited to the Web browser. The present disclosure may be applied commonly to the applications having the following features like the Web browser. Namely, the present disclosure can be applied to the application which acquires and analyzes resources (information including a script necessary for displaying a screen) from a remote server, screen-displays the result thereof on the user terminal, evaluates the script or the like acquired from the server according to an input content of a user, and updates the screen on the user terminal based on the result thereof. As the application, for example, there are an online game and an e-book reader. An example of the configuration in a case where the present disclosure is applied to the application is illustrated in FIGS. 27 to 30.

For example, the Web browsing system according to the above-described embodiment may be an output function division system. Correspondence of components in this case is illustrated in FIGS. 27 and 28. The output function division system is configured to include an application content server 96 which stores the application content instead of the Web server 96. A function of outputting the application content to the user terminal is divided between the application execution client unit 91 and the application execution server unit 93.

For example, the Web browsing system according to the above-described embodiments may be an online game system. Correspondence of components in this case is illustrated in FIG. 27 and FIG. 28. The online game system is configured to include a game server 96 which stores game content instead of the Web server 96. A function of outputting the game content to the user terminal is divided between a game client unit 91 and a game server unit 93. Accordingly, the game is displayed on a dedicated application screen on the user terminal or a screen on a game dedicated terminal.

For example, the Web browsing system according to the above-described embodiment may be an e-book system. Correspondence of components in this case is illustrated in FIGS. 29 and 30. The e-book system is configured to include an e-book sever 96 which stores e-book content instead of the Web server 96. A function of outputting the e-book content to the user terminal is divided between an e-book client unit 91 and the e-book server unit 93. Accordingly, an e-book is displayed on a dedicated application screen of the user terminal or a screen on an e-book dedicated terminal.

For example, the Web browsing system according to the above-described embodiments may be a screen display system. Correspondence of components in this case is illustrated in FIGS. 29 and 30. The screen display system is configured to include an application content server 96 which stores the resources associated with the position (URI or the like) on the network instead of the Web server 96. A function of outputting the resources to the user terminal is divided between the application execution client unit 91 and the application execution server unit 93. Accordingly, the resources are displayed on a dedicated application screen on the user terminal or a screen on a specific application dedicated terminal.

For example, the Web browsing system according to the above-described embodiments may be an audio output system. Correspondence of components in this case is illustrated in FIGS. 29 and 30. The audio output system is configured to include an e-book server 96 which stores audio content instead of the Web server 96. A function of outputting the audio content to the user terminal is divided between the application execution client unit 91 and the application execution server unit 93. Accordingly, audio reproducing on the user terminal application or audio reproducing on a specific application dedicated terminal is performed.

INDUSTRIAL APPLICABILITY

The present disclosure can be applied to information communication industries.

REFERENCE SIGNS LIST

11: Manipulation event evaluation unit
12: Script evaluation unit
13: HTML analysis unit
14: Request transmission unit
15: Response reception unit
16: Layout unit
17: Drawing unit
21: Resources storage unit
22: DOM tree storage unit
23: Layout data storage unit
31: Manipulation event handler unit
32: Manipulation event evaluation unit
33: Layout unit
34: Drawing unit
35: URL transmission unit
41: Request transmission unit
42: Response reception unit
43: HTML analysis unit
44: Layout unit
45: Drawing unit
46: Manipulation event evaluation unit
47: Script evaluation unit
48: Observation unit
49: Stream generation unit
50: Integrated management unit
51: Browser share cooperation unit
511: Share group management unit
512: Client program cooperation unit
513: Browsing server cooperation unit
514: One-time session ID management unit
52: Browsing server management unit
91: Browsing client unit
91-1 91-2 91-3: User terminal
92: Management server
93: Browsing server unit
94: Network
95: The Internet
96: Web server
97: Web browser
971: URL entry unit
972: Webview display unit

What is claimed is:

1. A computer-implemented Web browsing system where a Web browser function of displaying a Web page stored in a Web server on a user terminal connected via the Internet to the Web server is divided into a browsing client unit and a browsing server unit, wherein the browsing client unit and the browsing server unit are connected to each other via a network, wherein the browsing client unit is installed in the user terminal and notifies a content input to the user terminal to the browsing server unit and display the Web page on the user terminal by using information supplied from the browsing server unit, wherein the browsing server unit supplies information necessary for displaying the Web page on the user terminal to the browsing client unit according to the content input to the user terminal notified from the browsing client unit, wherein the browsing server unit includes:
    a layout unit for dividing a screen of the Web page for each element that uses a resource constituting a screen of the Web page, and generating layout data for a server and layout data for a client; and
    a drawing unit for drawing a screen of each element of the screen of the Web page using the layout data for the server, and transmitting the screen as server drawing data to a browser client terminal, wherein the browsing client unit includes:
    a layout unit for constituting the screen of the Web page with the server drawing data based on the layout data for the client, and wherein the Web browsing system comprises:
    a plurality of the browsing server units; and
    a management server which is connected via the network to the browsing client unit and the browsing server unit and which introduces one set based on a position of the browsing client unit, among the plurality of the browsing server units to the user terminal.

2. The Web browsing system according to claim 1,
wherein the browsing client unit includes a manipulation event filter function of notifying a manipulation event which is not completed in the browsing client unit to the browsing server unit, and
wherein the browsing server unit supplies the information necessary for displaying the Web page on the user terminal to the browsing client unit according to the manipulation event notified from the browsing client unit.

3. The Web browsing system according to claim 1,
wherein the browsing server unit supplies an image file requiring a decompression process without decompression to the browsing client unit, and
wherein the browsing client unit performs the decompression process of the image file.

4. The Web browsing system according to claim 1, further comprising:
a plurality of the user terminals including the browsing client unit,
wherein the browsing server unit supplies common information necessary for displaying the Web page to the browsing client unit included in each of the user terminals which is defined in advance, and
wherein the browsing client unit displays the same Web page.

5. A computer-implemented Web browsing system where a Web browser function of displaying a Web page stored in a Web server on a user terminal connected via the Internet to the Web server is divided into a browsing client unit and a browsing server unit,
wherein the browsing client unit and the browsing server unit are connected to each other via a network,
wherein the browsing client unit is installed in the user terminal and notifies a content input to the user terminal to the browsing server unit and display the Web page on the user terminal by using information supplied from the browsing server unit,
wherein the browsing server unit supplies information necessary for displaying the Web page on the user terminal to the browsing client unit according to the content input to the user terminal notified from the browsing client unit,
wherein the browsing server unit includes:
an observation unit which transmits an observation request indicating a message of observing the communication environment, load and performance of the browsing client unit and acquires the communication environment, load and performance of the browsing client unit from the browsing client unit;
a layout unit with a process decision unit which decides a process which is performed by the browsing server unit in order to display the Web page for each element of the Web page based on the communication environment, load and performance of the browsing client unit, wherein the layout unit divides a screen of the Web page for each element that uses a resource constituting a screen of the Web page, and generates layout data for a server and layout data for a client; and
a drawing unit for drawing a screen of each element of the screen of the Web page using the layout data for the server, and transmitting the screen as server drawing data to a browser client terminal,
wherein in a case where the processing time of the browsing client unit is short, the layout unit performs the process in the browsing server unit, and in a case where the load of the browsing client unit is small, the layout unit does not perform the process in the browsing server unit,
wherein the decision of the process in the browsing server unit is performed by using one of the following indicators a) or b):
a) whether or not the process load of the browsing client unit exceeds or reaches a predetermined threshold value in an average value or a peak value,
b) whether or not the process load of the browsing server unit exceeds or reaches a predetermined threshold value in an average value or a peak value in a case where browsing server unit performs a portion of the process,
wherein the browsing server unit performs the process decided by the process decision unit among information necessary for displaying the Web page on the user terminal for each element of the Web page and supplies information necessary for displaying the Web page on the user terminal to the browsing client unit,
wherein the browsing client unit returns an observation result according to the observation request from the browsing server unit and displays the Web page on the user terminal by using the information supplied from the browsing server unit, and
wherein the browsing client unit includes:
a layout unit for constituting the screen of the Web page with the server drawing data based on the layout data for the client.

6. The Web browsing system according to claim 5,
wherein the browsing client unit includes a manipulation event filter function of notifying a manipulation event which is not completed in the browsing client unit to the browsing server unit, and
wherein the browsing server unit supplies the information necessary for displaying the Web page on the user terminal to the browsing client unit according to the manipulation event notified from the browsing client unit.

7. The Web browsing system according to claim 5,
wherein the browsing server unit supplies an image file requiring a decompression process without decompression to the browsing client unit, and
wherein the browsing client unit performs the decompression process of the image file.

8. The Web browsing system according to claim 5, further comprising:
a plurality of the user terminals including the browsing client unit,
wherein the browsing server unit supplies common information necessary for displaying the Web page to the browsing client unit included in each of the user terminals which is defined in advance, and
wherein the browsing client unit displays the same Web page.

9. A Web browsing method in a Web browsing system where a Web browser function of displaying a Web page stored in a Web server on a user terminal connected via the Internet to the Web server is divided into a browsing client unit and a browsing server unit,
wherein the browsing client unit and the browsing server unit are connected to each other via a network, wherein the browsing server unit includes:
    a layout unit for dividing a screen of the Web page for each element that uses a resource constituting a screen of the Web page, and generating layout data for a server and layout data for a client; and
    a drawing unit for drawing a screen of each element of the screen of the Web page using the layout data for the server, and transmitting the screen as server drawing data to a browser client terminal,
wherein the browsing client unit includes:
    a layout unit for constituting the screen of the Web page with the server drawing data based on the layout data for the client, and
wherein the Web browsing method sequentially comprises:
    a notification procedure where the browsing client unit notifies a content input to the user terminal to the browsing server unit;
    a supplying procedure where the browsing server unit supplies information necessary for displaying the Web page on the user terminal to the browsing client unit according to the content input to the user terminal notified from the browsing client unit; and
    a display procedure where the browsing client unit displays the Web page on the user terminal by using the information supplied from the browsing server unit,
wherein the Web browsing system includes a plurality of the browsing server units and further includes a management server which is connected to the browsing client unit and the browsing server unit via the network, and
wherein the Web browsing method further comprises, before the notification procedure, a browsing server unit selection procedure of introducing one set based on a position of the browsing client unit, among the plurality of the browsing server units to the user terminal.

10. The Web browsing method according to claim 9,
wherein in the notification procedure, the browsing client unit notifies a manipulation event which is not completed in the browsing client unit to the browsing server unit, and
wherein in the supplying procedure, the browsing server unit supplies information necessary for displaying the Web page on the user terminal to the browsing client unit according to the manipulation event notified from the browsing client unit.

11. The Web browsing method according to claim 9,
wherein in the supplying procedure, the browsing server unit supplies an image file requiring a decompression process without decompression to the browsing client unit, and
wherein in the display procedure, the browsing client unit performs the decompression process of the image file.

12. The Web browsing method according to claim 9,
wherein the Web browsing system includes a plurality of the user terminals including the browsing client unit,
wherein in the notification procedure, the browsing client unit notifies a new user terminal displaying a Web page to the browsing server unit,
wherein in the supplying procedure, the browsing server unit supplies common information necessary for displaying the Web page to the browsing client unit, and
wherein in the display procedure, the browsing client unit displays the same Web page on the user terminal by using the information supplied from the browsing server unit.

13. A Web browsing method in a Web browsing system where a Web browser function of displaying a Web page stored in a Web server on a user terminal connected via the Internet to the Web server is divided into a browsing client unit and a browsing server unit,
wherein the browsing client unit and the browsing server unit are connected to each other via a network,
wherein the browsing server unit includes:
    a layout unit for dividing a screen of the Web page for each element that uses a resource constituting a screen of the Web page, and generating layout data for a server and layout data for a client; and
    a drawing unit for drawing a screen of each element of the screen of the Web page using the layout data for the server, and transmitting the screen as server drawing data to a browser client terminal,
wherein the browsing client unit includes:
    a layout unit for constituting the screen of the Web page with the server drawing data based on the layout data for the client, and
wherein the Web browsing method sequentially comprises:
    an observing procedure that includes observing the communication environment, load and performance of the browsing client unit and deciding a process which is performed by the browsing server unit in order to display the Web page for each element of the Web page based on the communication environment, load and performance of the browsing client unit,
    a notification procedure where the browsing client unit notifies a content input to the user terminal to the browsing server unit;
    a supplying procedure where the browsing server unit supplies information necessary for displaying the Web page on the user terminal to the browsing client unit according to the content input to the user terminal notified from the browsing client unit; and
    a display procedure where the browsing client unit displays the Web page on the user terminal by using the information supplied from the browsing server unit,
wherein in the supplying procedure, the browsing server unit performs the process decided in the process decision procedure among information necessary for displaying the Web page on the user terminal for each element of the Web page and supplies information necessary for displaying the Web page on the user terminal to the browsing client unit,
wherein in the display procedure, the browsing client unit displays the Web page on the user terminal by using the information supplied from the browsing server unit,
wherein the Web browsing system includes a plurality of the browsing server units and further includes a management server which is connected to the browsing client unit and the browsing server unit via the network, and
wherein the Web browsing method further comprises, before the notification procedure, a browsing server unit selection procedure of introducing one set based on a position of the browsing client unit, among the plurality of the browsing server units to the user terminal.

14. The Web browsing method according to claim 13,
wherein in the notification procedure, the browsing client unit notifies a manipulation event which is not completed in the browsing client unit to the browsing server unit, and
wherein in the supplying procedure, the browsing server unit supplies information necessary for displaying the Web page on the user terminal to the browsing client unit according to the manipulation event notified from the browsing client unit.

15. The Web browsing method according to claim 13,
wherein in the supplying procedure, the browsing server unit supplies an image file requiring a decompression process without decompression to the browsing client unit, and
wherein in the display procedure, the browsing client unit performs the decompression process of the image file.

16. The Web browsing method according to claim 13,
wherein the Web browsing system includes a plurality of the user terminals including the browsing client unit,
wherein in the notification procedure, the browsing client unit notifies a new user terminal displaying a Web page to the browsing server unit,
wherein in the supplying procedure, the browsing server unit supplies common information necessary for displaying the Web page to the browsing client unit, and
wherein in the display procedure, the browsing client unit displays the same Web page on the user terminal by using the information supplied from the browsing server unit.

17. A computer-implemented browsing server unit of a Web browsing system where a Web browser function of displaying a Web page stored in a Web server on a user terminal connected via the Internet to the Web server is divided into a browsing client unit and a browsing server unit,
wherein the browsing client unit and the browsing server unit are connected to each other via a network,
wherein the browsing server unit supplies information necessary for displaying the Web page on the user terminal to the browsing client unit according to a content input to the user terminal notified from the browsing client unit,
wherein the browsing server unit comprises:
an observation unit which transmits an observation request indicating a message of observing at least any one of communication environment, load and performance of the browsing client unit and acquires at least any one of communication environment, load and performance of the browsing client unit from the browsing client unit;
a layout unit with a process decision unit which decides a process which is performed by the browsing server unit in order to display the Web page for each element of the Web page based on at least any one of communication environment, load and performance of the browsing client unit, wherein the layout unit divides a screen of the Web page for each element that uses a resource constituting a screen of the Web page, and generates layout data for a server and layout data for a client; and
a drawing unit for drawing a screen of each element of the screen of the Web page using the layout data for the server, and transmitting the screen as server drawing data to a browser client terminal,
wherein in a case where the processing time of the browsing client unit is short, the layout unit performs the process in the browsing server unit, and in a case where the load of the browsing client unit is small, the layout unit does not perform the process in the browsing server unit,
wherein the decision of the process in the browsing server unit is performed by using one of the following indicators a) or b):
a) whether or not the process load of the browsing client unit exceeds or reaches a predetermined threshold value in an average value or a peak value,
b) whether or not the process load of the browsing server unit exceeds or reaches a predetermined threshold value in an average value or a peak value in a case where browsing server unit performs a portion of the process, and
wherein the browsing server unit performs the process decided by the process decision unit among information necessary for displaying the Web page on the user terminal for each element of the Web page and supplies information necessary for displaying the Web page on the user terminal to the browsing client unit, and
wherein the browsing client unit includes:
a layout unit for constituting the screen of the Web page with the server drawing data based on the layout data for the client.

18. A Web browsing method in a Web browsing server unit of a Web browsing system where a Web browser function of displaying a Web page stored in a Web server on a user terminal connected via the Internet to the Web server is divided into a browsing client unit and the browsing server unit,
wherein the browsing client unit and the browsing server unit are connected to each other via a network,
wherein the browsing server unit includes:
a layout unit for dividing a screen of the Web page for each element that uses a resource constituting a screen of the Web page, and generating layout data for a server and layout data for a client; and
a drawing unit for drawing a screen of each element of the screen of the Web page using the layout data for the server, and transmitting the screen as server drawing data to a browser client terminal,
wherein the Web browsing method sequentially comprises:
an observing procedure that includes observing the communication environment, load and performance of the browsing client unit and deciding a process which is performed by the browsing server unit in order to display the Web page for each element of the Web page based on the communication environment, load and performance of the browsing client unit;
a notification procedure where the browsing server unit is notified with a content input to the user terminal from the browsing client unit; and
a supplying procedure where the browsing server unit supplies information necessary for displaying the Web page on the user terminal to the browsing client unit according to the content input to the user terminal notified from the browsing client unit,
wherein in a case where the processing time of the browsing client unit is short, the layout unit performs the process in the browsing server unit, and in a case where the load of the browsing client unit is small, the layout unit does not perform the process in the browsing server unit, wherein the decision of the process in the browsing server unit is performed by using one of the following indicators a) or b):
- a) whether or not the process load of the browsing client unit exceeds or reaches a predetermined threshold value in an average value or a peak value,
- b) whether or not the process load of the browsing server unit exceeds or reaches a predetermined threshold value in an average value or a peak value in a case where browsing server unit performs a portion of the process, wherein in the supplying procedure, the browsing server unit performs the process decided in the process decision procedure among information necessary for displaying the Web page on the user terminal for each element of the Web page and supplies information necessary for displaying the Web page on the user terminal to the browsing client unit, and wherein the browsing client unit includes:
- a layout unit for constituting the screen of the Web page with the server drawing data based on the layout data for the client.

19. A computer-implemented management server which is included in a Web browsing system where a Web browser function of displaying a Web page stored in a Web server on a user terminal connected via the Internet to the Web server is divided into a browsing client unit and a browsing server unit and which is connected via a network to the browsing client unit and the browsing server unit, wherein the browsing server unit includes:
- a layout unit for dividing a screen of the Web page for each element that uses a resource constituting a screen of the Web page, and generating layout data for a server and layout data for a client; and
- a drawing unit for drawing a screen of each element of the screen of the Web page using the layout data for the server, and transmitting the screen as server drawing data to a browser client terminal, wherein the browsing client unit includes:
- a layout unit for constituting the screen of the Web page with the server drawing data based on the layout data for the client, wherein the Web browsing system includes a plurality of the browsing server units, and wherein the management server introduces one set based on a position of the browsing client unit, among the plurality of the browsing server units to the user terminal.

20. A Web browsing method in a management server which is included in a Web browsing system where a Web browser function of displaying a Web page stored in a Web server on a user terminal connected via the Internet to the Web server is divided into a browsing client unit and a browsing server unit and which is connected via a network to the browsing client unit and the browsing server unit, wherein the browsing server unit includes:
- a layout unit for dividing a screen of the Web page for each element that uses a resource constituting a screen of the Web page, and generating layout data for a server and layout data for a client; and
- a drawing unit for drawing a screen of each element of the screen of the Web page using the layout data for the server, and transmitting the screen as server drawing data to a browser client terminal, wherein the browsing client unit includes:
- a layout unit for constituting the screen of the Web page with the server drawing data based on the layout data for the client, wherein the Web browsing system includes a plurality of the browsing server units, and wherein the Web browsing method comprises, before a notification procedure where the browsing client unit notifies a content input to the user terminal to the browsing server unit, a browsing server unit selection procedure of introducing one set based on a position of the browsing client unit, among the plurality of the browsing server units to the user terminal.

* * * * *